US012686753B2

(12) United States Patent
DeBruin et al.

(10) Patent No.: US 12,686,753 B2
(45) **Date of Patent: *Jul. 21, 2026**

(54) CHEMICAL RECYCLING OF SOLVOLYSIS TEREPHTHALYL COLUMN BOTTOMS COPRODUCT STREAMS

(71) Applicant: Eastman Chemical Company, Kingsport, TN (US)

(72) Inventors: Bruce Roger DeBruin, Gray, TN (US); Daryl Bitting, Longview, TX (US); David Eugene Slivensky, Tatum, TX (US); Xianchun Wu, Longview, TX (US); Travis Wynn Keever, Jonesborough, TN (US); Michael Paul Ekart, Kingsport, TN (US); Jaclyn Erin Shuman, Kingsport, TN (US); Timothy Glenn Schaefer, Kingsport, TN (US); Justin William Murphy, Kingsport, TN (US); David Milton Lange, Blountville, TN (US); Aaron Nathaniel Edens, Weber City, VA (US)

(73) Assignee: Eastman Chemical Company, Kingsport, TN (US)

( * ) Notice: Subject to any disclaimer, the term of this patent is extended or adjusted under 35 U.S.C. 154(b) by 561 days.

This patent is subject to a terminal disclaimer.

(21) Appl. No.: 17/760,316

(22) PCT Filed: Feb. 10, 2021

(86) PCT No.: PCT/US2021/017366

§ 371 (c)(1),
(2) Date: Aug. 8, 2022

(87) PCT Pub. No.: WO2021/163123

PCT Pub. Date: Aug. 19, 2021

(65) Prior Publication Data

US 2023/0066496 A1 Mar. 2, 2023

Related U.S. Application Data

(60) Provisional application No. 62/972,289, filed on Feb. 10, 2020.

(51) Int. Cl.

| | |
|---|---|
| ***C08J 11/24*** | (2006.01) |
| ***B09B 3/70*** | (2022.01) |
| ***C10B 53/07*** | (2006.01) |
| ***C10J 3/66*** | (2006.01) |

(52) U.S. Cl.

CPC ................ *C08J 11/24* (2013.01); *B09B 3/70* (2022.01); *C10B 53/07* (2013.01); *C10J 3/66* (2013.01); *C08J 2367/02* (2013.01); *C10J 2300/0906* (2013.01); *C10J 2300/0946* (2013.01); *C10J 2300/1846* (2013.01)

(58) Field of Classification Search

USPC ........................ 528/190, 193, 194; 521/48.5

See application file for complete search history.

(56) References Cited

U.S. PATENT DOCUMENTS

| | | | |
|---|---|---|---|
| 1,683,347 | A | 9/1928 | Gray et al. |
| 1,698,049 | A | 1/1929 | Clarke et al. |
| 1,880,808 | A | 10/1932 | Clarke et al. |
| 1,984,147 | A | 12/1934 | Malm |
| 2,129,052 | A | 9/1938 | Fordyce |
| 2,465,319 | A | 3/1949 | Whinfield et al. |
| 2,880,241 | A | 3/1959 | Hughes |
| 3,037,050 | A | 5/1962 | Erwin et al. |
| 3,239,566 | A | 3/1966 | Slaugh et al. |
| 3,257,335 | A | 6/1966 | Whitfield, Jr. et al. |
| 3,321,510 | A | 5/1967 | Lotz et al. |
| 3,448,173 | A | 6/1969 | Ryan et al. |
| 3,527,809 | A | 9/1970 | Pruett et al. |
| 3,544,291 | A | 12/1970 | Schlinger et al. |
| 3,617,201 | A | 11/1971 | Berni et al. |
| 3,655,825 | A | 4/1972 | Souder et al. |
| 3,719,749 | A | 3/1973 | Smith et al. |
| 3,772,405 | A | 11/1973 | Hamb |
| 3,776,945 | A | 12/1973 | Ligorati et al. |

(Continued)

FOREIGN PATENT DOCUMENTS

| | | |
|---|---|---|
| CA | 3 075 433 A1 | 2/2013 |
| CN | 106520176 A | 3/2017 |

(Continued)

OTHER PUBLICATIONS

Co-pending U.S. Appl. No. 17/597,586, filed Jan. 12, 2022; Ekart et al.

Co-pending U.S. Appl. No. 17/760,323, filed Aug. 8, 2022, 2022; Ekart et al.

Co-pending U.S. Appl. No. 17/759,459, filed Jul. 26, 2022; DeBruin et al.

Co-pending U.S. Appl. No. 17/760,321, filed Aug. 8, 2022; DeBruin et al.

Co-pending U.S. Appl. No. 17/760,319, filed Aug. 8, 2022; DeBruin et al.

Co-pending U.S. Appl. No. 17/760,315, filed Aug. 8, 2022; DeBruin et al.

(Continued)

*Primary Examiner* — Terressa Boykin

(74) *Attorney, Agent, or Firm* — Robert C. Morriss

(57) ABSTRACT

Described are methods for processing waste plastic that comprise withdrawing a terephthalyl column bottoms coproduct stream from a solvolysis facility used to process PET-containing waste plastic and introducing at least a portion of the coproduct stream into at least one of the following: (i) a partial oxidation (POX) gasification facility; (ii) a pyrolysis facility; (iii) a cracker facility; and (iv) an energy generation/energy production facility; and solvolysis coproduct compositions formed within a solvolysis facility for processing polyester terephthalate-containing waste plastic.

20 Claims, 9 Drawing Sheets

(56) References Cited

U.S. PATENT DOCUMENTS

| | | | |
|---|---|---|---|
| 3,853,968 | A | 12/1974 | Bortnick et al. |
| 3,857,895 | A | 12/1974 | Booth |
| 3,907,868 | A | 9/1975 | Currie et al. |
| 3,956,414 | A | 5/1976 | Oshima |
| 4,248,802 | A | 2/1981 | Kuntz |
| 4,287,369 | A | 9/1981 | Harris et al. |
| 4,287,370 | A | 9/1981 | Harris et al. |
| 4,322,564 | A | 3/1982 | Tsunoda et al. |
| 4,446,585 | A | 5/1984 | Harding et al. |
| 4,479,012 | A | 10/1984 | Fischer et al. |
| 4,742,178 | A | 5/1988 | Nelson et al. |
| 4,755,624 | A | 7/1988 | Phillips et al. |
| 4,774,362 | A | 9/1988 | Devon et al. |
| 4,808,756 | A | 2/1989 | Tokitoh et al. |
| 4,871,878 | A | 10/1989 | Puckette et al. |
| 4,873,213 | A | 10/1989 | Puckette et al. |
| 4,912,155 | A | 3/1990 | Burton |
| 4,960,949 | A | 10/1990 | Devon et al. |
| 5,051,528 | A | 9/1991 | Naujokas et al. |
| 5,169,994 | A | 12/1992 | Sumner, Jr. et al. |
| 5,288,934 | A | 2/1994 | De Broqueville |
| 5,290,631 | A | 3/1994 | Fleury et al. |
| 5,294,384 | A | 3/1994 | David et al. |
| 5,298,530 | A | 3/1994 | Gamble et al. |
| 5,312,951 | A | 5/1994 | Herrmann et al. |
| 5,347,045 | A | 9/1994 | Herrmann et al. |
| 5,364,985 | A | 11/1994 | Hermanson |
| 5,391,263 | A | 2/1995 | Hepner et al. |
| 5,413,681 | A | 5/1995 | Tustin et al. |
| 5,414,022 | A | 5/1995 | Toot, Jr. et al. |
| 5,432,203 | A | 7/1995 | DeBruin et al. |
| 5,498,749 | A | 3/1996 | Heise et al. |
| 5,534,594 | A | 7/1996 | Troy et al. |
| 5,576,456 | A | 11/1996 | Gamble et al. |
| 5,580,911 | A | 12/1996 | Buchanan et al. |
| 5,654,347 | A | 8/1997 | Khemani et al. |
| 5,696,176 | A | 12/1997 | Khemani et al. |
| 5,710,315 | A | 1/1998 | Gallagher |
| 5,712,410 | A | 1/1998 | Naujokas |
| 5,821,553 | A | 10/1998 | Evans et al. |
| 6,127,436 | A | 10/2000 | Chatterjee et al. |
| 6,150,577 | A | 11/2000 | Miller et al. |
| 6,262,294 | B1 | 7/2001 | Sako et al. |
| 6,331,580 | B1 | 12/2001 | Molnar |
| 6,693,219 | B2 | 2/2004 | Puckette et al. |
| 6,706,843 | B1 | 3/2004 | Ishihara et al. |
| 7,078,440 | B2 | 7/2006 | Ishihara et al. |
| 7,462,649 | B2 | 12/2008 | Nakao et al. |
| 7,737,246 | B2 | 6/2010 | Crawford |
| 7,985,827 | B2 | 7/2011 | Crawford et al. |
| 8,882,991 | B2 | 11/2014 | Kuechler et al. |
| 9,834,728 | B2 | 12/2017 | Fleckner et al. |
| 12,398,328 | B2 | 8/2025 | DeBruin et al. |
| 2006/0287484 | A1 | 12/2006 | Crawford et al. |
| 2008/0191069 | A1 | 8/2008 | Hofmann et al. |
| 2009/0062581 | A1 | 3/2009 | Appel et al. |
| 2009/0275698 | A1 | 11/2009 | Ravi et al. |
| 2010/0038231 | A1 | 2/2010 | Vesely et al. |
| 2010/0133088 | A1 | 6/2010 | Hajek et al. |
| 2011/0224462 | A1 | 9/2011 | Ditzel et al. |
| 2012/0083542 | A1 | 4/2012 | Muller |
| 2012/0149791 | A1 | 6/2012 | Felice et al. |
| 2012/0217149 | A1 | 8/2012 | Ma |
| 2012/0266532 | A1 | 10/2012 | Bergmann et al. |
| 2013/0041053 | A1 | 2/2013 | Pecorini et al. |
| 2013/0324772 | A1 | 12/2013 | Huber et al. |
| 2014/0107306 | A1 | 4/2014 | Mazanec et al. |
| 2015/0290840 | A1 | 10/2015 | Boisart et al. |
| 2017/0114205 | A1 | 4/2017 | Maille |
| 2017/0114208 | A1 | 4/2017 | Rao et al. |
| 2017/0137719 | A1 | 5/2017 | Qiao et al. |
| 2017/0190976 | A1 | 7/2017 | Brandhorst, Jr. et al. |
| 2018/0002609 | A1 | 1/2018 | Narayanaswamy et al. |
| 2018/0319950 | A1 | 11/2018 | Parrott |
| 2019/0023886 | A1 | 1/2019 | Crouch et al. |
| 2019/0136138 | A1 | 5/2019 | Feugnet et al. |
| 2020/0247910 | A1 | 8/2020 | Sheppard et al. |
| 2022/0127416 | A1 † | 4/2022 | Thinon |
| 2023/0103080 | A1 | 3/2023 | DeBruin et al. |
| 2023/0110481 | A1 * | 4/2023 | DeBruin .................... C10J 3/00 252/373 |
| 2023/0203270 | A1 | 6/2023 | DeBruin et al. |
| 2023/0211394 | A1 | 7/2023 | DeBruin et al. |
| 2023/0227622 | A1 | 7/2023 | DeBruin et al. |
| 2023/0235238 | A1 | 7/2023 | DeBruin et al. |

FOREIGN PATENT DOCUMENTS

| | | | | |
|---|---|---|---|---|
| EP | 0662466 | A1 | | 7/1995 |
| EP | 0530169 | B1 | | 9/1996 |
| EP | 2 325 281 | A1 | | 5/2011 |
| EP | 2 458 946 | C2 | | 8/2012 |
| EP | 3048160 | A | | 7/2016 |
| JP | 11148084 | A | | 6/1999 |
| JP | 2000178375 | A | | 6/2000 |
| JP | 2001031978 | A | | 2/2001 |
| JP | 2003113125 | A | † | 4/2003 |
| JP | 2003238975 | A | | 8/2003 |
| JP | 2006 083125 | A1 | | 3/2006 |
| JP | 2009-522305 | A | | 6/2009 |
| KR | 10-1996-0704013 | A | | 8/1996 |
| WO | WO 2007/076384 | A2 | | 7/2007 |
| WO | WO 2008/007384 | A1 | | 1/2008 |
| WO | WO 2011/043515 | A1 | | 4/2011 |
| WO | WO 2012/110990 | A1 | | 8/2012 |
| WO | WO 2014/098229 | A1 | | 6/2014 |
| WO | WO 2020/242921 | A1 | | 12/2020 |
| WO | WO 2021/021855 | A1 | | 2/2021 |
| WO | WO 2021/061918 | A1 | | 4/2021 |
| WO | WO 2021/092291 | A1 | | 5/2021 |
| WO | WO 2021/092293 | A1 | | 5/2021 |
| WO | WO 2021/092296 | A1 | | 5/2021 |

OTHER PUBLICATIONS

Co-pending U.S. Appl. No. 17/996,011, filed Oct. 12, 2022; DeBruin et al.

Co-pending U.S. Appl. No. 17/996,672, filed Oct. 20, 2022; DeBruin et al.

Co-pending U.S. Appl. No. 17/996,012, filed Oct. 12, 2022; DeBruin et al.

ASTMD256; "Standard Test Methods for Determining the Izod Pendulum Impact Resistance of Plastics"; Nov. 2018.

ASTME308; "Standard Practice for Computing the Colors of Objects by Using the CIE System"; Aug. 2022.

ASTMD790; "Standard Test Methods for Flexural Properties of Unreinforced and Reinforced Plastics and Electrical Insulating Materials"; Jul. 2017.

ASTMD1925; "Standard Test Method for Yellowness Index of Plastics"; Mar. 1970.

ASTMD2887; "Standard Test Method for Boiling Range Distribution of Petroleum Fractions by Gas Chromatography"; Sep. 2022.

ASTMD5399; "Standard Test Method for Boiling Point Distribution of Hydrocarbon Solvents by Gas Chromatography"; Dec. 2017.

ASTMD5630; "Standard Test Method for Ash Content in Plastics"; Nov. 2022.

ASTMD6290; "Standard Test Method for Color Determination of Plastic Pellets"; Jun. 2019.

Notification of Transmittal of The International Search Report and The Written Opinion of the International Searching Authority, or the Declaration with a mailing date of Oct. 27, 2020 for PCT/US2020/044025.

Notification of Transmittal of The International Search Report and The Written Opinion of the International Searching Authority, or the Declaration with a mailing date of Jun. 4, 2021 for PCT/US2021/017377.

Notification of Transmittal of The International Search Report and The Written Opinion of the International Searching Authority, or the Declaration with a mailing date of Jun. 7, 2021 for PCT/US2021/017325.

(56) References Cited

OTHER PUBLICATIONS

Notification of Transmittal of The International Search Report and The Written Opinion of the International Searching Authority, or the Declaration with a mailing date of Jun. 3, 2021 for PCT/US2021/0173340.
Notification of Transmittal of The International Search Report and The Written Opinion of the International Searching Authority, or the Declaration with a mailing date of Jun. 4, 2021 for PCT/US2021/017342.
Notification of Transmittal of The International Search Report and The Written Opinion of the International Searching Authority, or the Declaration with a mailing date of Jun. 4, 2021 for PCT/US2021/017381.
Notification of Transmittal of The International Search Report and The Written Opinion of the International Searching Authority, or the Declaration with a mailing date of Jun. 4, 2021 for PCT/US2021/017366.
Notification of Transmittal of The International Search Report and The Written Opinion of the International Searching Authority, or the Declaration with a mailing date of Jul. 21, 2021 for PCT/US2021/026976.
Notification of Transmittal of The International Search Report and The Written Opinion of the International Searching Authority, or the Declaration with a mailing date of Jul. 30, 2021 for PCT/US2021/026992.
Notification of Transmittal of The International Search Report and The Written Opinion of the International Searching Authority, or the Declaration with a mailing date of Jul. 23, 2021 for PCT/US2021/027012.
Riesel, L. et al.; "Eine einfache Synthese von Organylfluorphosphanen"; J.Z. ANorg. ALlg. Chem., 603, 145-150 (1991).
Tullock, C.W. et al.; "Synthesis of Fluorides by Metathesis with Sodium Fluoride"; J. Org Chem., 25, 2016-2019 (1960).
White, D.W. et al.; "Structural Implications of Nuclear Magnetic Resonance Studies on 1-R-1-Phospha-2,6-dioxacyclohexanes"; J. Am.Chem. Soc., 92, 7125-7135 (1970).
Meyer, Thomas G. et al.; "Darstellung und Einkristall-Rontgenstrukturanalyse einiger Fluorphosphite und Phosphitester"; Bi. Chem. Sci. 48, 659-671 (1993).
Sherwood, James; "Closed-Loop Recycling of Polymers Using Solvents: Remaking plastics for a circular economy"; Johnson Matthey Technology Review, 2020, vol. 64, (1), pp. 4-15.
Choi, Samuel et al.; "Eco-friendly, Expeditious Depolymerization of PET in the Blend Fabrics by Using a Bio-based Deep Eutectic Solvent under Microwave Irradiation for Composition Identification"; Fibers and Polymers (2019), vol. 20, No. 4, pp. 752-759.
Abdel-Azim A Abdel-Azim; "Unsaturated Polyester Resins from Poly(Ethylene Terephthalate) Waste for Polymer Concrete"; Polymer Engineering and Science; Dec. 1996, vol. 36, No. 24.
USPTO Office Action dated Oct. 10, 2024 received in Co-pending U.S. Appl. No. 17/760,323.
USPTO Office Action dated May 14, 2025 received in Co-pending U.S. Appl. No. 17/760,323.
Co-pending U.S. Appl. No. 17/818,752, filed Aug. 10, 2022; Hawkins et al.; now U. S. Publication No. 2023-0065649.
European Search Report dated Nov. 6, 2024 received in Application No. 21754340.4.
ASTMD648; "Standard Test Method for Deflection Temperature of Plastics Under Flexural Load in the Edgewise Position"; Published Apr. 2018.
ASTMD1003; "Standard Test Method for Haze and Luminous Transmittance of Transparent Plastics"; Published Jun. 2021.
ASTMD3418; "Standard Test Method for Transition Temperatures and Enthalpies of Fusion and Cyrstallization of Polymers by Differential Scanning Calorimetry"; Published Sep. 2021.
ASTMD4440; "Standard Test Method for Plastics: Dynamic Mechanical Properties Melt Rheology"; Published Feb. 2015.
ASTM D6474; "Standard Test Method for Determining Molecular Weight Distribution and Molecular Weight Averages of Polyolefins by High Temperature Gel Permeation Chromatography"; Published Apr. 2020.
Third Party Submission received from USPTO in Co-pending U.S. Appl. No. 17/760,319 dated Oct. 3, 2023.
Third Party Submission received from USPTO in Co-pending U.S. Appl. No. 17/760,316 dated Sep. 1, 2023.
Nagy, Dorottya et al.; "Measuring viscosity of polyethylene blends using a rotational rheometer"; J. Phys.: Conf. Ser. 1045 012030 (2018).
USPTO Notice of Allowance dated Sep. 9, 2025 received in Co-pending U.S. Appl. No. 17/760,323.
USPTO Office Action dated Sep. 3, 2025 received in Co-pending U.S. Appl. No. 17/760,321.
USPTO Office Action dated Jul. 30, 2025 received in Co-pending U.S. Appl. No. 17/760,319.
Butler, E, et al.; "Waste Polyolefins to Liquid Fuels via Pyrolysis: Review of Commercial State-of-the-Art and Recent Laboratory Research"; Waste Biomass Valor, (2011), 2:227-255.
Shukla, S.R., et al.; "Glycolysis of Polyethylene Terephthalate Waste Fibers"; Journal of Applied Polymer Science, vol. 97. pp. 513-517 (2005).
"Table 64." In Yaws' Critical Property Data for Chemical Engineers and Chemists, 2014. Retrieved from the Internet: <URL: https://app.knovel.com/hotlink/itble/rcid:kpYCPDCECD/id:kt009ZN321/yaws-critical-property/table-64-enthalpy-vaporization>. (Year: 2014).

* cited by examiner
† cited by third party

CHEMICAL RECYCLING OF SOLVOLYSIS TEREPHTHALYL COLUMN BOTTOMS COPRODUCT STREAMS

CROSS-REFERENCE TO RELATED APPLICATION(S)

This application is a national stage filing under 35 USC § 371 of International Application Number PCT/US2021/017366, filed on, Feb. 10, 2021 which claims the benefit of the filing date to U.S. Provisional Application No. 62/972,289, filed on Feb. 10, 2020, the entire disclosures of which are incorporated by reference herein.

BACKGROUND

Waste materials, especially non-biodegradable waste materials, can negatively impact the environment when disposed of in landfills after a single use. Thus, from an environmental standpoint, it is desirable to recycle as much waste materials as possible. However, there still exists streams of low value waste that are not possible or economically feasible to recycle with conventional recycling technologies. In addition, some conventional recycling processes produce waste streams that are themselves not economically feasible to recover or recycle, resulting in additional waste streams that must be disposed of or otherwise handled.

Thus, a need exists for a large-scale facility capable of chemically recycling a variety of waste materials, including various types of plastics, in an economically viable manner. Ideally, such a facility would minimize the production of further waste streams to both enhance efficiency of production and minimize environmental impact, while still providing commercially-valuable end products.

SUMMARY

In one aspect, the present technology concerns a method for processing waste plastic, the method comprising: introducing a polyolefin-containing coproduct stream from a solvolysis facility into at least one of the following: (i) a partial oxidation (POX) gasification facility; (ii) a pyrolysis facility; (iii) a solidification facility; (iv) a cracker facility; and (v) an energy generation/energy production facility.

In one aspect, the present technology concerns a solvolysis coproduct composition comprising: at least 90 weight percent of polyolefins and not more than 1 weight percent PET, based on the total weight of the composition, wherein the composition has a viscosity of at least 100 poise at 10 radians per second and 250° C.

In one aspect, the present technology concerns a method for processing waste plastic, the method comprising: separating a stream of mixed waste plastic (MWP) into a polyethylene terephthalate-enriched (PET-enriched) stream and a polyolefin-enriched stream (PO-enriched) stream; subjecting at least a portion of the PET-enriched stream to solvolysis in a solvolysis facility to form a principal glycol product, a principal terephthalyl product, and at least one coproduct stream, wherein the coproduct stream comprises a polyolefin-containing coproduct stream; and introducing at least a portion of the coproduct stream from the solvolysis facility into at least one of the following: (i) a partial oxidation (POX) gasification facility; (ii) a pyrolysis facility; (iii) a solidification facility; (iv) a cracker facility; and (v) an energy generation/energy production facility.

In one aspect, the present technology concerns a method of processing waste plastic, the method comprising: (a) separating mixed plastic waste (MPW) into a polyethylene terephthalate-enriched (PET-enriched) stream and a polyolefin-enriched (PO-enriched) stream; (b) subjecting at least a portion of the PET-enriched stream to solvolysis in a solvolysis facility; and (c) subjecting at least a portion of the PO-enriched steam to (i) partial oxidation (POX) gasification facility; (ii) pyrolysis in a pyrolysis facility; or (iii) chemical conversion in an energy generation/energy production facility.

In one aspect, the present technology concerns a method of processing waste plastic, the method comprising: (a) separating mixed plastic waste (MPW) into a polyethylene terephthalate-enriched (PET-enriched) stream and a polyolefin-enriched (PO-enriched) stream; (b) subjecting at least a portion of the PO-enriched steam to at least one of (i) a partial oxidation (POX) gasification facility; (ii) pyrolysis in a pyrolysis facility; and (iii) chemical conversion in an energy generation/energy production facility, wherein the PO-enriched stream comprises at least 50 weight percent PO and has one or more of the following characteristics (i) through (vii)—(i) an ash content of not more than 5 weight percent; (ii) a halogen content of not more than 250 ppm by weight (on a dry basis); (iii) not more than 5 weight percent of nitrogen-containing compounds; (iv) not more than 10 weight percent of polyethylene terephthalate; (v) a mercury content of not more than 1 ppm; (vi) an arsenic content of not more than 100 ppm; and (vii) a melt viscosity of less than 25,000 poise measured using a Brookfield R/S rheometer with V80-40 vane spindle operating at a shear rate of 10 rad/s and a temperature of 250° C.

In one aspect, the present technology concerns a method of processing waste plastic, the method comprising: introducing a feed stream comprising at least 50 weight percent polyolefin (PO) into at least one of (i) a partial oxidation (POX) gasification facility; (ii) a pyrolysis facility; and (iii) an energy generation/energy production facility, wherein at least a portion of the feed stream comprises plastic not classified as #3 through #7 plastics.

In one aspect, the present technology concerns a method for processing waste plastic, the method comprising: introducing a polyolefin (PO)-containing waste plastic stream and a solvolysis coproduct stream into at least one of (i) a partial oxidation (POX) gasification facility; (ii) a pyrolysis facility; and (iii) an energy generation/energy production facility.

In one aspect, the present technology concerns a method for processing waste plastic, the method comprising: (a) introducing a polyethylene terephthalate (PET)-containing waste plastic stream into a solvolysis facility to thereby produce at least a principal terephthalyl stream, a principal glycol stream, and at least one solvolysis coproduct stream; and (b) introducing a polyolefin containing waste plastic stream and at least a portion of the solvolysis coproduct stream into at least one of (i) a partial oxidation (POX) gasification facility; (ii) a pyrolysis facility; and (iii) an energy generation/energy production facility.

In one aspect, the present technology concerns a method for processing waste plastic, the method comprising: (a) separating a stream of mixed plastic waste (MPW) into a polyethylene terephthalate-enriched (PET-enriched) stream and a polyolefin-enriched (PO-enriched) stream; (b) introducing at least a portion of the PET-enriched stream into a solvolysis facility to thereby produce at least a principal terephthalyl stream, a principal glycol stream, and at least one solvolysis coproduct stream; and (c) introducing at least a portion of the PO-enriched stream and at least a portion of the solvolysis coproduct stream into at least one of (i) a partial oxidation (POX) gasification facility; (ii) a pyrolysis facility; and (iii) an energy generation/energy production facility.

In one aspect, the present technology concerns a method for processing waste plastic, the method comprising: introducing a glycol column bottoms coproduct stream from a solvolysis facility into at least one of the following: (i) a partial oxidation (POX) gasification facility; (ii) a pyrolysis facility; (iii) a solidification facility; (iv) a cracker facility; and (v) an energy generation/energy production facility.

In one aspect, the present technology concerns a method for processing waste plastic, the method comprising: (a) withdrawing a glycol column bottoms coproduct stream from a solvolysis facility used to process PET-containing waste plastic; and (b) introducing at least a portion of the coproduct stream into at least one of the following: (i) a partial oxidation (POX) gasification facility; (ii) a pyrolysis facility; and (iii) a solidification facility; (iv) a cracker facility; and (v) an energy generation/energy production facility.

In one aspect, the present technology concerns a method for processing waste plastic, the method comprising: (a) separating a stream of mixed plastic waste (MPW) into a polyethylene terephthalate-enriched (PET-enriched) stream and a polyolefin-enriched stream (PO-enriched) stream; (b) subjecting at least a portion of the PET-enriched stream to solvolysis in a solvolysis facility to form a principal glycol product, a principal terephthalyl product, and at least one coproduct stream, wherein the coproduct stream comprises a glycol column bottoms coproduct stream; and (c) introducing at least a portion of the coproduct stream from the solvolysis facility into at least one of the following: (i) a partial oxidation (POX) gasification facility; (ii) a pyrolysis facility; (iii) a solidification facility; (iv) a cracker facility; and (v) an energy generation/energy production facility.

In one aspect, the present technology concerns a solvolysis coproduct composition formed within a solvolysis facility for processing polyester terephthalate-containing waste plastic to form a principal glycol, a principal terephthalyl, and a principal solvent, the composition comprising: at least 60 weight percent of oligomers comprising moieties of the polyester, based on the total weight of the composition; the principal glycol; and at least one glycol other than the principal glycol, wherein the weight ratio of the at least one glycol other than the principal glycol to the principal glycol is at least 0.5:1.

In one aspect, the present technology concerns a method for processing waste plastic, the method comprising: introducing a reactor purge coproduct stream from a solvolysis facility into at least one of the following: (i) a partial oxidation (POX) gasification facility; (ii) a pyrolysis facility; (iii) a cracker facility; and (iv) an energy generation/energy production facility.

In one aspect, the present technology concerns a method for processing waste plastic, the method comprising: (a) withdrawing a reactor purge coproduct stream from a solvolysis facility used to process PET-containing waste plastic; and (b) introducing at least a portion of the coproduct stream into at least one of the following: (i) a partial oxidation (POX) gasification facility; (ii) a pyrolysis facility; and (iii) a cracker facility; (iv) an energy generation/energy production facility.

In one aspect, the present technology concerns a method for processing waste plastic, the method comprising: (a) separating a stream of mixed plastic waste (MPW) into a polyethylene terephthalate-enriched (PET-enriched) stream and a polyolefin-enriched stream (PO-enriched) stream; (b) subjecting at least a portion of the PET-enriched stream to solvolysis in a solvolysis facility to form a principal glycol product, a principal terephthalyl product, and at least one coproduct stream, wherein the coproduct stream comprises a reactor purge coproduct stream; and (c) introducing at least a portion of the coproduct stream from the solvolysis facility into at least one of the following: (i) a partial oxidation (POX) gasification facility; (ii) a pyrolysis facility; (iii) a solidification facility; and (iv) a cracker facility; and (v) an energy generation/energy production facility.

In one aspect, the present technology concerns a solvolysis coproduct composition formed within a solvolysis facility for processing polyester-containing waste plastic into a principal glycol, a principal terephthalyl, and a principal solvent, the composition comprising: at least 25 weight percent of the principal terephthalyl, based on the total weight of the composition; and an amount of 100 ppm by weight to 25 percent by weight of one or more non-terephthalyl solids, based on the total weight of the composition.

In one aspect, the present technology concerns a method for processing waste plastic, the method comprising: introducing a terephthalyl column bottoms coproduct stream from a solvolysis facility into at least one of the following: (i) a partial oxidation (POX) gasification facility; (ii) a pyrolysis facility; (iii) a solidification facility; (iv) a cracker facility; and (v) an energy generation/production facility 80.

In certain embodiments, the present technology concerns a method for processing waste plastic, the method comprising: (a) withdrawing a terephthalyl column bottoms coproduct stream from a solvolysis facility 30 used to process PET-containing waste plastic; and (b) introducing at least a portion of the coproduct stream into at least one of the following: (i) a partial oxidation (POX) gasification facility 50; (ii) a pyrolysis facility 60; (iii) a solidification facility 40; (iv) a cracker facility; and (v) an energy generation/production facility 80.

In certain embodiments, the present technology concerns a method for processing waste plastic, the method comprising: (a) separating a stream of mixed plastic waste (MPW) into a polyethylene terephthalate-enriched (PET-enriched) stream and a polyolefin-enriched stream (PO-enriched) stream; (b) subjecting at least a portion of the PET-enriched stream 102 to solvolysis in a solvolysis facility 30 to form a principal glycol product, a principal terephthalyl product, and at least one coproduct stream, wherein the coproduct stream comprises a terephthalyl column bottoms coproduct stream; and (c) introducing at least a portion of the coproduct stream from the solvolysis facility 30 into at least one of the following: (i) a partial oxidation (POX) gasification facility 50; (ii) a pyrolysis facility 60; (iii) a solidification facility 40; (iv) a cracker facility; and (v) an energy generation/energy production facility.

In one aspect, the present technology concerns a solvolysis coproduct composition formed within a solvolysis facility for processing polyester terephthalate-containing waste plastic to form a principal glycol, a principal terephthalyl, and a principal solvent, the composition comprising: at least 70 weight percent of oligomers comprising polyester moieties, based on the total weight of the stream; and at least 1 part per billion and/or not more than 25 weight percent of substituted terephthalyl components, wherein the composition has a mid-range boiling point higher than the boiling point of the principal terephthalyl.

In one aspect, the present technology concerns a method for processing waste plastic, the method comprising: introducing a solvolysis coproduct stream from a solvolysis facility into at least one of the following: (i) a partial oxidation (POX) facility; (ii) a pyrolysis facility; (iii) a cracker facility; and (iv) an energy generation/energy production facility.

In one aspect, the present technology concerns a method for processing waste plastic, the method comprising: (a) withdrawing a solvolysis coproduct stream from a solvolysis facility for processing PET-containing waste plastic; and (b) introducing at least a portion of the solvolysis coproduct stream into at least one of the following: (i) a partial oxidation (POX) facility; (ii) a pyrolysis facility; (iii) a cracker facility; and (iv) an energy generation/energy production facility.

In one aspect, the present technology concerns a method for processing waste plastic, the method comprising: (a) separating a stream of mixed plastic waste (MPW) into a polyethylene terephthalate-enriched (PET-enriched) stream and a polyolefin-enriched stream (PO-enriched) stream; (b) subjecting at least a portion of the PET-enriched stream to solvolysis in a solvolysis facility to form a primary glycol product, a primary terephthalyl product, and at least one coproduct stream; and (c) introducing at least a portion of the solvolysis coproduct stream from the solvolysis facility into at least one of the following: (i) a partial oxidation (POX) facility; (ii) a pyrolysis facility; (iii) a solidification facility; (iv) a cracker facility; and (v) an energy generation/energy production facility.

DETAILED DESCRIPTION

When a numerical sequence is indicated, it is to be understood that each number is modified the same as the first number or last number and is in an "or" relationship, i.e. each number is "at least," or "up to" or "not more than" as the case may be. For example, "at least 10 weight percent, 20, 30, 40, 50, 75 . . . " means the same as "at least 10 weight percent, or at least 20 weight percent, or at least 30 weight percent, or at least 40 weight percent, or at least 50 weight percent, or at least 75 weight percent, etc.

All concentrations or amounts are by weight unless otherwise stated. As used herein, the terms "containing," and "including" are open ended and synonymous with "comprising."

Weight percentages expressed on the mixed plastic waste (MPW) are the weight of the MPW as fed to the first stage separation and prior to addition of any diluents/solutions such as salt or caustic solutions.

References to MPW throughout this description also provide support for particulate plastics or MPW particulates or size reduced plastics or a plastics feedstock to the separation process. For example, references to weight percentages of ingredients in the MPW also describes and provides support for those same weight percentages on particulate plastics or size reduced plastics or the plastics as fed to the first stage separation prior to combining them with caustic or salt solutions.

Figure 1:
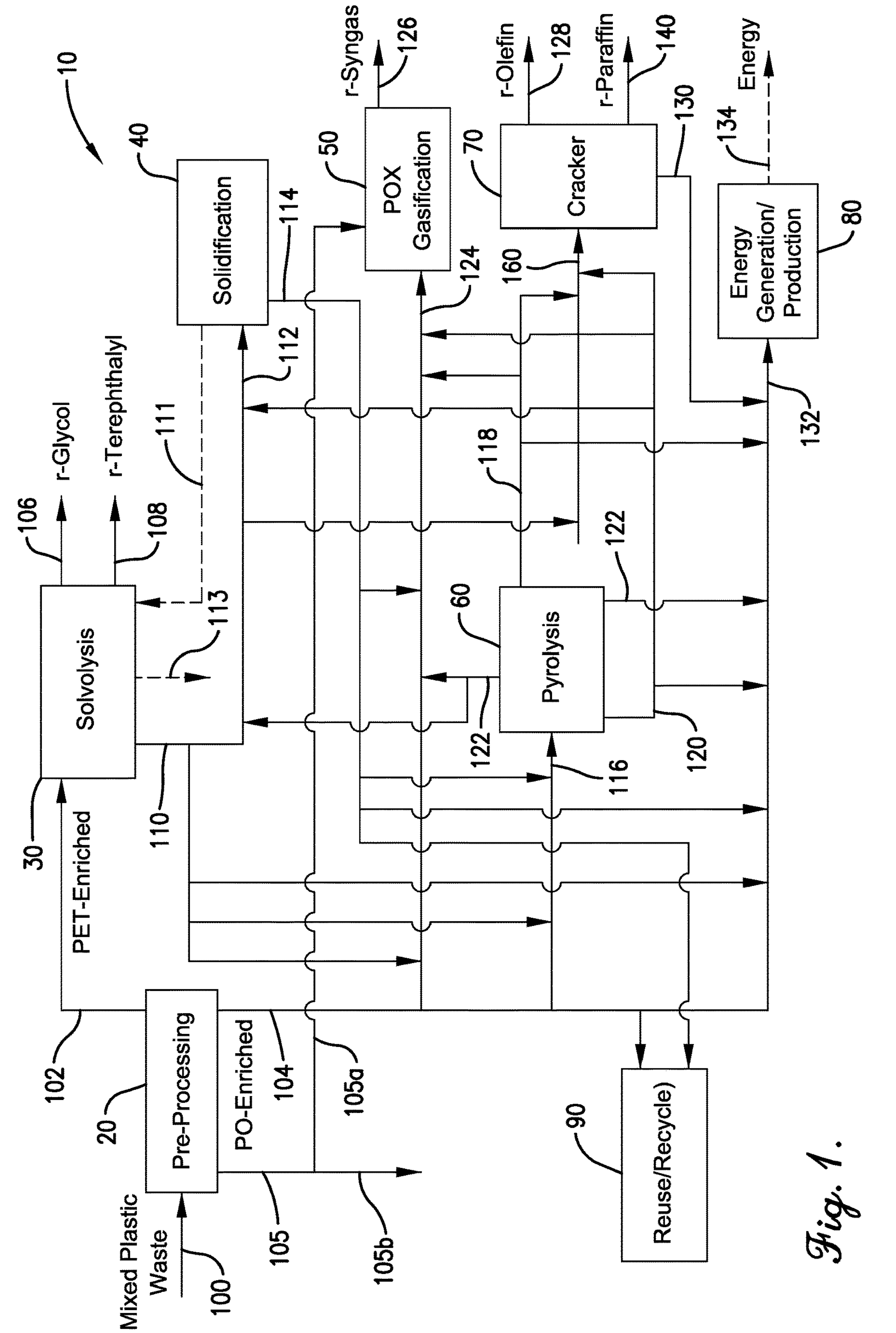
FIG. 1 is a schematic block flow diagram illustrating the main steps of a chemical recycling facility according to embodiments of the present technology.

Turning now to FIG. 1, a schematic overview of a chemical recycling facility 10 for processing a stream 100 comprising mixed plastic waste is shown. The chemical recycling facility 10 generally illustrated in FIG. 1 includes a pre-processing facility 20 in combination with one or more of a solvolysis facility 30, a solidification facility 40, a partial oxidation (POX) gasification facility 50, a pyrolysis facility 60, a cracker facility 70, an energy generation/production facility 80, and a reuse (recycle) facility 90. Although shown as including each of these facilities, it should be understood that chemical recycling facilities according to embodiments of the present technology would not have to include all of the above facilities, but can include two or more, three or more, or four or more of these facilities. Chemical recycling facilities as described herein may be used to convert mixed plastic waste to recycle content products or chemical intermediates used to form a variety of end use materials.

As used herein, the term "chemical recycling" refers to a waste plastic recycling process that includes a step of chemically converting waste plastic polymers into lower molecular weight polymers, oligomers, monomers, and/or non-polymeric molecules (e.g., hydrogen and carbon monoxide) that are useful by themselves and/or are useful as feedstocks to another chemical production process or processes. A "chemical recycling facility," is a facility for producing a recycle content product via chemical recycling of waste plastic. As used herein, the term "recycle content" is used herein i) as a noun to refer to a physical component (e.g., compound, molecule, or atom) at least a portion of which is derived directly or indirectly from recycled waste or ii) as an adjective modifying a particular composition (e.g., a compound, polymer, feedstock, product, or stream) at least a portion of which is directly or indirectly derived from recycled waste.

As used herein, the term "directly derived" 'means having at least one physical component originating from waste plastic, while "indirectly derived" means having an assigned recycle content that i) is attributable to waste plastic, but ii) that is not based on having a physical component originating from waste plastic.

Chemical recycling facilities are not physical recycling facilities. As used herein, the term "physical recycling" (also known as "mechanical recycling") refers to a recycling process that includes a step of melting waste plastic and forming the molten plastic into a new intermediate product (e.g., pellets or sheets) and/or a new end product (e.g., bottles). Generally, physical recycling does not change the chemical structure of the plastic being recycled. In one embodiment or in combination with any of the mentioned embodiments, the chemical recycling facilities described herein may be configured to receive and process waste streams from and/or that are not typically processable by a physical recycling facility.

Pre-Processing Facility

Turning again to FIG. 1, a stream 100 of mixed plastic waste may first be introduced into a pre-processing facility 20. As used herein, the term "waste plastic" refers to used, scrap, and/or discarded plastic materials, such as polyethylene terephthalate (PET), polyolefins (PO), and/or polyvinylchloride (PVC). As used herein, a "mixed plastic waste," or MPW, refers to a post-industrial (or pre-consumer) plastic, a post-consumer plastic, or a mixture thereof. Examples of plastic materials include, but are not limited to, polyesters, one or more polyolefins (PO), and polyvinylchloride (PVC). Furthermore, as used herein, a "waste plastic" refers to any post-industrial (or pre-consumer) and post-consumer plastics, such as but not limited to polyesters, polyolefins (PO), and/or polyvinylchloride (PVC). In one embodiment or more embodiments, the waste plastic may also include a minor amount of other plastic components (other than PET and polyolefins) that total less than 50, less than 40, less than 30, less than 20, less than 15, or less than 10 weight percent, and optionally can individually represent less than 30, less than 20, less than 15, less than 10, or less than 1 weight percent, of the total amount of waste plastic in stream 100.

The plastics suitable for processing in recycling facility 10 can include any organic synthetic polymers that are solid at 25° C. at 1 atm. The polymers can be thermoplastic or thermosetting polymers. The polymer number average molecular weight (Mn) can be at least 300, or at least 500, or at least 1000, or at least 5,000, or at least 10,000, or at least 20,000, or at least 30,000, or at least 50,000 or at least 70,000 or at least 90,000 or at least 100,000 or at least 130,000. The weight average molecular weight (Mw) of the polymers can be at least 300, or at least 500, or at least 1000, or at least 5,000, or at least 10,000, or at least 20,000, or at least 30,000 or at least 50,000, or at least 70,000, or at least 90,000, or at least 100,000, or at least 130,000, or at least 150,000, or at least 300,000.

In one embodiment or in combination with any of the mentioned embodiments, the MPW processed in recycling facility 10 can include, but is not limited to, plastic components, such as polyesters, including those having repeating aromatic or cyclic units such as those containing a repeating terephthalate or naphthalate units such as polyethylene terephthalate (PET) and/or polyethylene naphthalate (PEN). As used herein, "PET" means a homopolymer of polyethylene terephthalate, or polyethylene terephthalate modified with modifiers or containing residues or moieties of other than ethylene glycol and terephthalic acid, such as isophthalic acid, diethylene glycol, TMCD (2,2,4,4-tetramethyl-1,3-cyclobutanediol), CHDM (cyclohexanedimethanol), propylene glycol, isosorbide, 1,4-butanediol, 1,3-propane diol, and/or NPG (neopentylglycol), or polyesters having repeating terephthalate units (and whether or not they contain repeating ethylene glycol based units) and one or more residues or moieties of TMCD (2,2,4,4-tetramethyl-1,3-cyclobutanediol), CHDM (cyclohexanedimethanol), propylene glycol, or NPG (neopentylglycol), isosorbide, isophthalic acid, 1,4-butanediol, 1,3-propane diol, and/or diethylene glycol, or combinations thereof.

Alternatively, or in addition, polyesters may include furanate repeating units. Although within the definition of PET as provided herein, it is worth mentioning polyesters suitable for processing in chemical recycling facility 10 may also have repeating terephthalate units and one or more residues or moieties of TMCD (2,2,4,4-tetramethyl-1,3-cyclobutanediol), CHDM (cyclohexanedimethanol), propylene glycol, or NPG (neopentylglycol), isosorbide, isophthalic acid, 1,4-butanediol, 1,3-propane diol, and/or diethylene glycol, or combinations thereof and aliphatic polyesters such as PLA, polyglycolic acid, polycaprolactones, and polyethylene adipates; polyolefins (e.g., low density polyethylene, high density polyethylene, low density polypropylene, high density polypropylene, crosslinked polyethylene, amorphous polyolefins, and the copolymers of any one of the aforementioned polyolefins), polyvinyl chloride (PVC), polystyrene, polytetrafluoroethylene, acrylobutadienestyrene (ABS), cellulosics such as cellulose acetate, cellulose diacetate, cellulose triacetate, cellulose acetate propionate, cellulose acetate butyrate, and regenerated cellulose such as viscose; epoxides, polyamides, phenolic resins, polyacetal, polycarbonates, polyphenylene-based alloys, poly(methyl methacrylate), styrenic containing polymers, polyurethane, vinyl-based polymers, styrene acrylonitrile, thermoplastic elastomers other than tires, and urea containing polymers and melamines.

In one embodiment or in combination with any of the mentioned embodiments, the MPW introduced into chemical recycling facility 10 can contain thermosetting polymers. Examples of the amounts of thermosetting polymers present in the MPW can be at least 1 weight percent, or at least 2 weight percent, or at least 5 weight percent, or at least 10 weight percent, or at least 15 weight percent, or at least 20 weight percent, or at least 25 weight percent, or at least 30 weight percent, or at least 40 weight percent, based on the weight of the MPW.

In one embodiment or in combination with any of the mentioned embodiments, the MPW introduced into the chemical recycling facility 10 contains plastics at least a portion of which are obtained from cellulosics, such as cellulose derivates having an acyl degree of substitution of less than 3, or 1.8 to 2.8. Examples include cellulose acetate, cellulose diacetate, cellulose triacetate, cellulose acetate propionate, and cellulose acetate butyrate.

In one embodiment or in combination with any of the mentioned embodiments, the MPW stream introduced into the chemical recycling facility 10 contains plastics at least a portion of which are obtained from polymers having repeating terephthalate units, such as polyethylene terephthalate, polypropylene terephthalate, polybutylene terephthalate, and copolyesters thereof.

In one embodiment or in combination with any of the mentioned embodiments, the MPW stream introduced into the chemical recycling facility 10 contains plastics at least a portion of which are obtained from copolyesters having multiple dicyclohexane dimethanol moeities, 2,2,4,4-tetramethyl-1,3-cyclobutanediol moieties, or combinations thereof.

In one embodiment or in combination with any of the mentioned embodiments, the MPW stream introduced into the chemical recycling facility 10 contains plastics at least a portion of which are obtained from low density polyethylene, high density polyethylene, linear low-density polyethylene, polypropylene, polymethylpentene, polybutene-1, and copolymers thereof.

In one embodiment or in combination with any of the mentioned embodiments, the MPW stream introduced into the chemical recycling facility 10 contains plastics at least a portion of which are obtained from eyeglass frames, or crosslinked polyethylene.

1n one embodiment or in combination with any of the mentioned embodiments, the MPW stream introduced into the chemical recycling facility 10 contains plastics at least a portion of which are obtained from plastic bottles.

In one embodiment or in combination with any of the mentioned embodiments, the MPW stream introduced into the chemical recycling facility 10 contains plastics at least a portion of which are obtained from diapers.

In one embodiment or in combination with any of the mentioned embodiments, the MPW stream introduced into the chemical recycling facility 10 contains plastics at least a portion of which are obtained from Styrofoam, or expanded polystyrene.

In one embodiment or in combination with any of the mentioned embodiments, the MPW stream introduced into the chemical recycling facility 10 contains plastics at least a portion of which are obtained from flashspun high density polyethylene.

In one embodiment or in combination with any of the mentioned embodiments, the MPW stream introduced into the chemical recycling facility 10 contains plastics having or obtained from plastics having a resin ID code numbered 1-7 within the chasing arrow triangle established by the SPI. In one embodiment or in combination with any of the mentioned embodiments, at least a portion of the MPW contains one or more plastics that are not generally mechanically recycled. These would include plastics having numbers 3 (polyvinyl chloride), 5 (polypropylene), 6 (polystyrene), and 7 (other). In one embodiment or in combination with any of the mentioned embodiments, the MPW contains at least 0.1 weight percent, or at least 0.5 weight percent, or at least 1 weight percent, or at least 2 weight percent, or at least 3 weight percent, or at least 5 weight percent, or at least 7 weight percent, or at least 10 weight percent, or at least 12 weight percent, or at least 15 weight percent, or at least 20 weight percent, or at least 25 weight percent, or at least 30 weight percent, or at least 40 weight percent, or at least or more than 50 weight percent, or at least 65 weight percent, or at least 85 weight percent, or at least 90 weight percent plastics having or corresponding to a number 3, 5, 6, 7, or a combination thereof, based on the weight of the plastics in the MPW.

In one embodiment or in combination with any of the mentioned embodiments, the MPW comprises plastics having or obtained from plastics having at least 30, at least 35, at least 40, at least 45, at least 50, at least 55, at least 60, at least 65, at least 70, at least 75, at least 80, at least 85, at least 90, at least 95, or at least 99 weight percent of at least one, at least two, at least three, or at least four different kinds of resin ID codes.

The MPW introduced into the chemical recycling facility 10 may contain recycle textiles. Textiles may contain natural and/or synthetic fibers, rovings, yarns, nonwoven webs, cloth, fabrics and products made from or containing any of the aforementioned items. Textiles can be woven, knitted, knotted, stitched, tufted, may include pressed fibers such as in felting, embroidered, laced, crocheted, braided, or may include nonwoven webs and materials. Textiles can include fabrics, and fibers separated from a textile or other product containing fibers, scrap or off-spec fibers or yarns or fabrics, or any other source of loose fibers and yarns. A textile can also include staple fibers, continuous fibers, threads, tow bands, twisted and/or spun yarns, gray fabrics made from yarns, finished fabrics produced by wet processing gray fabrics, and garments made from the finished fabrics or any other fabrics. Textiles include apparels, interior furnishings, and industrial types of textiles. Textiles can include post-industrial textiles (pre-consumer) or post-consumer textiles or both.

In one embodiment or in combination with any of the mentioned embodiments, textiles can include apparel, which can generally be defined as things humans wear or made for the body. Such textiles can include sports coats, suits, trousers and casual or work pants, shirts, socks, sportswear, dresses, intimate apparel, outerwear such as rain jackets, cold temperature jackets and coats, sweaters, protective clothing, uniforms, and accessories such as scarves, hats, and gloves. Examples of textiles in the interior furnishing category include furniture upholstery and slipcovers, carpets and rugs, curtains, bedding such as sheets, pillow covers, duvets, comforters, mattress covers; linens, tablecloths, towels, washcloths, and blankets. Examples of industrial textiles include transportation (auto, airplane, train, bus) seats, floor mats, trunk liners, and headliners; outdoor furniture and cushions, tents, backpacks, luggage, ropes, conveyor belts, calendar roll felts, polishing cloths, rags, soil erosion fabrics and geotextiles, agricultural mats and screens, personal protective equipment, bullet proof vests, medical bandages, sutures, tapes, and the like.

The nonwoven webs that are classified as textiles do not include the category of wet laid nonwoven webs and articles made therefrom. While a variety of articles having the same function can be made from a dry or wet laid process, an article made from a dry laid nonwoven web is classified as a textile. Examples of suitable articles that may be formed from dry laid nonwoven webs as described herein can include those for personal, consumer, industrial, food service, medical, and other end uses. Specific examples can include, but are not limited to, baby wipes, flushable wipes, disposable diapers, training pants, feminine hygiene products such as sanitary napkins and tampons, adult incontinence pads, underwear, or briefs, and pet training pads. Other examples include a variety of different dry or wet wipes, including those for consumer (such as personal care or household) and industrial (such as food service, health care, or specialty) use. Nonwoven webs can also be used as padding for pillows, mattresses, and upholstery, and batting for quilts and comforters. In the medical and industrial fields, nonwoven webs of the present invention may be used for consumer, medical, and industrial face masks, protective clothing, caps, and shoe covers, disposable sheets, surgical gowns, drapes, bandages, and medical dressings.

Additionally, nonwoven webs as described herein may be used for environmental fabrics such as geotextiles and tarps, oil and chemical absorbent pads, as well as building materials such as acoustic or thermal insulation, tents, lumber and soil covers and sheeting. Nonwoven webs may also be used for other consumer end use applications, such as for, carpet backing, packaging for consumer, industrial, and agricultural goods, thermal or acoustic insulation, and in various types of apparel.

The dry laid nonwoven webs as described herein may also be used for a variety of filtration applications, including transportation (e.g., automotive or aeronautical), commercial, residential, industrial, or other specialty applications. Examples can include filter elements for consumer or industrial air or liquid filters (e.g., gasoline, oil, water), including nanofiber webs used for microfiltration, as well as end uses like tea bags, coffee filters, and dryer sheets. Further, nonwoven webs as described herein may be used to form a variety of components for use in automobiles, including, but not limited to, brake pads, trunk liners, carpet tufting, and under padding.

The textiles can include single type or multiple type of natural fibers and/or single type or multiple type of synthetic fibers. Examples of textile fiber combinations include all natural, all synthetic, two or more type of natural fibers, two or more types of synthetic fibers, one type of natural fiber and one type of synthetic fiber, one type of natural fibers and two or more types of synthetic fibers, two or more types of natural fibers and one type of synthetic fibers, and two or more types of natural fibers and two or more types of synthetic fibers.

Natural fibers include those that are plant derived or animal derived. Natural fibers can be cellulosics, hemicellulosics, and lignins. Examples of plant derived natural fibers include hardwood pulp, softwood pulp, and wood flour; and other plant fibers including those in wheat straw, rice straw, abaca, coir, cotton, flax, hemp, jute, bagasse, kapok, papyrus, ramie, rattan, vine, kenaf, abaca, henequen, sisal, soy, cereal straw, bamboo, reeds, esparto grass, bagasse, Sabai grass, milkweed floss fibers, pineapple leaf fibers, switch grass, lignin-containing plants, and the like. Examples of animal derived fibers include wool, silk, mohair, cashmere, goat hair, horse hair, avian fibers, camel hair, angora wool, and alpaca wool.

Synthetic fibers are those fibers that are, at least in part, synthesized or derivatized through chemical reactions, or regenerated, and include, but are not limited to, rayon, viscose, mercerized fibers or other types of regenerated cellulose (conversion of natural cellulose to a soluble cellulosic derivative and subsequent regeneration) such as lyocell (also known as TENCEL™), Cupro, Modal, acetates such as polyvinylacetate, polyamides including nylon, polyesters such as PET, olefinic polymers such as polypropylene and polyethylene, polycarbonates, poly sulfates, poly sulfones, polyethers such as polyether-urea known as Spandex or elastane, polyacrylates, acrylonitrile copolymers, polyvinylchloride (PVC), polylactic acid, polyglycolic acid, sulfopolyester fibers, and combinations thereof.

The textiles can be in any of the forms mentioned above and may be exposed to one or more pre-processing steps in pre-processing facility 20 prior to being processed in the remaining zones of the chemical processing facility 10 as shown in FIG. 1. Examples of pre-processing steps include, but are not limited to, size reduction via chopping, shredding, harrowing, confrication, pulverizing, or cutting a feedstock of textiles to make size reduced textiles. The textiles can also be densified. Examples of processes that densify include those that agglomerate the textiles through heat generated by frictional forces or particles made by extrusion or other external heat applied to the textile to soften or melt a portion or all of the textile.

In one embodiment or in combination with any of the mentioned embodiments, the amount of textiles (including textile fibers) in the MPW stream in line 100 is at least 0.1 weight percent, or at least 0.5 weight percent, or at least 1 weight percent, or at least 2 weight percent, or at least 5 weight percent, or at least 8 weight percent, or at least 10 weight percent, or at least 15 weight percent, or at least 20 weight percent material obtained from textiles or textile fibers, based on the weight of the MPW. In one embodiment or in combination with any of the mentioned embodiments, the amount of textiles (including textile fibers) in the MPW in stream 100 is not more than 50, not more than 40, not more than 30, not more than 20, not more than 15, not more than 10, not more than 8, not more than 5, not more than 2, not more than 1, not more than 0.5, not more than 0.1, not more than 0.05, not more than 0.01, or not more than 0.001 weight percent, based on the weight of the MPW stream 100. The amount of textiles in the MPW stream 100 can be in the range of from 0.1 to 50 weight percent, 5 to 40 weight percent, or 10 to 30 weight percent, based on the total weight of the MPW stream 100.

In one embodiment or in combination with any of the mentioned embodiments, the mixed plastic waste introduced into the chemical recycling facility 10 (or into any of the subsequent processing facilities within the chemical recycling facility 10) can include one or more inert components, which are typically present as additives in at least a portion of the mixed waste plastic. For example, such inert components may be particularly present in the plastic when it comprises textiles as described herein. Examples of such inert components can include, but are not limited to, calcium carbonate, sand, titanium dioxide, and other hard, crystalline solids that are non-dissolvable in water or other aqueous solvents.

In one embodiment or in combination with any of the mentioned embodiments, the amount of inert components present in the feed stream to the chemical recycling facility 10 (or to any one of the facilities within chemical recycling facility 10) can be at least 0.001, at least 0.0025, at least 0.005, at least 0.0075, at least 0.010, at least 0.025, at least 0.05, at least 0.075, at least 0.100, or at least 0.150 weight percent and/or not more than 0.50, not more than 0.45, not more than 0.40, not more than 0.35, not more than 0.30, not more than 0.25, or not more than 0.20 weight percent, based on the total weight of the feed stream. The amount of inert components present in the feed stream 100 to the chemical recycling facility 10 can be in the range of 0.002 to 0.5 weight percent, 0.005 to 0.40 weight percent, or 0.100 to 0.25 weight percent, based on the total weight of the stream 100.

Alternatively, or in addition, the amount of inert components present in the feed stream to the chemical recycling facility 10 (or to any one of the facilities within chemical recycling facility 10) can be at least 0.35, at least 0.40, at least 0.45, at least 0.50, at least 0.55, at least 0.60, at least 0.65, at least 0.70, or at least 0.75 and/or not more than 3, not more than 2.5, not more than 2, not more than 1.5, not more than 1, not more than 0.75, not more than 0.60, not more than 0.55, or not more than 0.50 weight percent, based on the total weight of the stream. The amount of inert components in the feed stream 100 can be in the range of from 0.35 to 3 weight percent, 0.40 to 2.5 weight percent, or 0.50 to 2 weight percent, based on the total weight of the feed stream 100.

The feed stream 100 of mixed plastic waste introduced into the chemical recycling facility 10 may include post-consumer and/or post-industrial (pre-consumer) plastic materials. As discussed previously, such plastics can include polyethylene terephthalate (PET), polyolefin (PO), and/or polyvinyl chloride (PVC). In one embodiment or in combination with any of the mentioned embodiments, PET and PO in combination make up at least 50, at least 55, at least 60, at least 65, at least 70, at least 75, at least 80, at least 85, at least 90, at least 95, or at least 99 weight percent of the mixed plastic waste, while PVC can make up at least 0.001, at least 0.01, at least 0.05, at least 0.1, at least 0.25, or at least 0.5 weight percent and/or not more than 5, not more than 4, not more than 3, not more than 2, not more than 1, not more than 0.75, or not more than 0.5 weight percent, based on the total weight of the MPW. The amount of PVC in the mixed plastic waste can be in the range of from 0.001 to 5 weight percent, 0.01 to 3 weight percent, or 0.1 to 2 weight percent, based on the total weight of the MPW stream 100.

In one embodiment or in combination with any of the mentioned embodiments, the mixed plastic waste can comprise at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of PET, based on the total weight of the MPW stream or composition.

In one embodiment or in combination with any of the mentioned embodiments, the mixed plastic waste can comprise at least 5, at least 10, at least 15, at least 20, at least 25, at least 30, at least 35, at least 40 and/or not more than 75, not more than 70, not more than 65, not more than 60, not more than 55, not more than 50, not more than 45, not more than 40, or not more than 35 weight percent polyolefin (PO), based on the total weight of the MPW. The amount of PO in the MPW stream 100 can be in the range of from 5 to 75 weight percent, 10 to 60 weight percent, or 20 to 35 weight percent, based on the total weight of the stream 100.

In one embodiment or in combination with any of the mentioned embodiments, the MPW comprises multi-component polymers. As used herein, the term "multi-component polymers" refers to articles and/or particulates comprising at least one synthetic or natural polymer combined with, attached to, or otherwise physically and/or chemically associated with at least one other polymer and/or non-polymer solid. The polymer can be a synthetic polymer or plastic, such as PET, olefins, and/or nylons. The non-polymer solid can be a metal, such as aluminum. The multi-component polymers can include metalized plastics.

In one embodiment or in combination with any of the mentioned embodiments, the MPW comprises multi-component plastics in the form of multi-layer polymers. As used herein, the term "multi-layer polymers" refers to multi-component polymers comprising PET and at least one other polymer and/or non-polymer solid physically and/or chemically associated together in two or more physically distinct layers. A polymer or plastic is considered a multi-layered polymer even though a transition zone may exist between two layers, such as may be present in adhesively adhered layers or co-extruded layers. An adhesive between two layers is not deemed to be a layer. The multi-layer polymers may comprise a layer comprising PET and a one or more additional layers at least one of which is a synthetic or natural polymer that is different from PET, or a polymer which has no ethylene terephthalate repeating units, or a polymer which has no alkylene terephthalate repeating units (a "non-PET polymer layer"), or other non-polymer solid.

Examples of non-PET polymer layers include nylons, polylactic acid, polyolefins, polycarbonates, ethylene vinyl alcohol, polyvinyl alcohol, and/or other plastics or plastic films associated with PET-containing articles and/or particulates, and natural polymers such as whey proteins. The multi-layer polymers may include metal layers, such as aluminum, provided that at least one additional polymer layer is present other than the PET layer. The layers may be adhered with adhesive bonding or other means, physically-adjacent (i.e., articles pressed against the film), tackified (i.e., the plastics heated and stuck together), co-extruded plastic films, or otherwise attached to the PET-containing articles. The multi-layer polymers may comprise PET films associated with articles containing other plastics in the same or similar manner. The MPW may comprise multi-component polymers in the form of PET and at least one other plastic, such as polyolefins (e.g., polypropylene) and/or other synthetic or natural polymers, combined in a single physical phase. For example, the MPW comprises a heterogenous mixture comprising a compatibilizer, PET, and at least one other synthetic or natural polymer plastic (e.g., non-PET plastic) combined in a single physical phase. As used herein, the term "compatibilizer" refers to an agent capable of combining at least two otherwise immiscible polymers together in a physical mixture (i.e., blend).

In one embodiment or in combination with any of the mentioned embodiments, the MPW comprises not more than 20, not more than 10, not more than 5, not more than 2, not more than 1, or not more than 0.1 weight percent nylons, on a dry plastic basis. In one embodiment or in combination with any of the mentioned embodiments, the MPW comprises from 0.01 to 20, from 0.05 to 10, from 0.1 to 5, or from 1 to 2 weight percent nylons, on a dry plastic basis.

In one embodiment or in combination with any of the mentioned embodiments, the MPW comprises not more than 40, not more than 20, not more than 10, not more than 5, not more than 2, or not more than 1 weight percent multi-component plastics, on a dry plastic basis. In one embodiment or in combination with any of the mentioned embodiments, the MPW comprises from 0.1 to 40, from 1 to 20, or from 2 to 10 weight percent multi-component plastics, on a dry plastic basis. In one embodiment or in combination with any of the mentioned embodiments, the MPW comprises not more than 40, not more than 20, not more than 10, not more than 5, not more than 2, or not more than 1 weight percent multi-layer plastics, on a dry plastic basis. In one embodiment or in combination with any of the mentioned embodiments, the MPW comprises from 0.1 to 40, from 1 to 20, or from 2 to 10 weight percent multi-layer plastics, on a dry plastic basis.

The mixed plastic waste may also include non-plastic solids, such as dirt, fillers, rocks, sand, food, cellulosics such as paper and cardboard, and glass, which can make up at least 0.1, at least 1, at least 2, at least 4, at least 5, at least 6, and/or not more than 25, not more than 20, not more than 15, not more than 10, not more than 8, not more than 5, not more than 2.5, or not more than 2 weight percent of the mixed plastic waste, based on the total weight of the MPW. The amount of non-plastic solids in the MPW feed stream 100 can be in the range of from 0.1 to 25 weight percent, 1 to 20 weight percent, or 2 to 8 weight percent, based on the total weight of the MPW stream 100.

In one embodiment or in combination with any of the mentioned embodiments, the MPW may comprise at least 0.01, at least 0.1, at least 0.5, or at least 1 and/or not more than 25, not more than 20, not more than 25, not more than 10, not more than 5, or not more than 2.5 weight percent of liquids, based on the total weight of the MPW stream or composition. The amount of liquids in the MPW can be in the range of from 0.01 to 25 weight percent, from 0.5 to 10 weight percent, or 1 to 5 weight percent, based on the total weight of the MPW stream 100.

The mixed plastic waste may comprise plastic that is not classified as #3 through #7 plastics. In one embodiment or in combination with any of the mentioned embodiments, the total amount of plastic not classified as #3 through #7 plastics in the MPW can be at least 5, at least 10, at least 15, at least 20, at least 25, at least 30, at least 35, at least 40, at least 45, at least 50, at least 55, at least 60, at least 65, at least 70, or at least 75 and/or not more than 95, not more than 90, not more than 85, not more than 80, not more than 75, not more than 70, not more than 65, not more than 60, not more than 55, not more than 50, not more than 45, not more than 40, or not more than 35 weight percent, based on the total weight of the MPW stream. The total amount of plastic not classified as #3 through #7 plastics in the MPW can be in the range of from 5 to 95 weight percent, 20 to 80 weight percent, or 25 to 75 weight percent, based on the total weight of the stream.

The mixed plastic waste introduced into (or the pre-processed plastic stream withdrawn from the pre-processing facility 20) may be in several forms including, but not limited to, whole articles or particulates that have been comminuted or pelletized or formed into fibers. As used herein, the terms "mixed plastic waste particulates," or "MPW particulates" refers to mixed plastic waste having an average particle diameter of less than 1 inch. A MPW particulate can include, for example, comminuted plastic particles that have been shredded or chopped, or plastic pellets. When whole or nearly whole articles are introduced into the pre-processing facility 20, one or more comminuting or pelletizing steps may be used therein to convert the MPW into mixed plastic waste particulates. Alternatively, or in addition, at least a portion of the mixed plastic waste introduced into the pre-processing facility 20 may already be in the form of particulates.

In one embodiment or in combination with any of the mentioned embodiments, the MPW feedstock comprises not more than 20, not more than 15, not more than 12, not more than 10, not more than 8, not more than 6, not more than 5, not more than 4, not more than 3, not more than 2, or not more than 1 weight percent of biowaste materials, with the total weight of the MPW feedstock taken as 100 weight percent on a dry basis. In one embodiment or in combination with any of the mentioned embodiments, the MPW feedstock comprises from 0.01 to 20, from 0.1 to 10, from 0.2 to 5, or from 0.5 to 1 weight percent of biowaste materials, with the total weight of the MPW feedstock taken as 100 weight percent on a dry basis. As used herein, the term "biowaste" refers to material derived from living organisms or of organic origin. Exemplary biowaste materials include, but are not limited to, cotton, wood, saw dust, food scraps, animals and animal parts, plants and plant parts, and manure.

In one embodiment or in combination with any of the mentioned embodiments, the MPW feedstock comprises not more than 20, not more than 15, not more than 12, not more than 10, not more than 8, not more than 6, not more than 5, not more than 4, not more than 3, not more than 2, or not more than 1 weight percent of manufactured cellulose products, with the total weight of the MPW feedstock taken as 100 weight percent on a dry basis. In one embodiment or in combination with any of the mentioned embodiments, the MPW feedstock comprises from 0.01 to 20, from 0.1 to 10, from 0.2 to 5, or from 0.5 to 1 weight percent of manufactured cellulose products, with the total weight of the MPW feedstock taken as 100 weight percent on a dry basis. As used herein, the term "manufactured cellulose products" refers to nonnatural (i.e., manmade or machine-made) articles, and scraps thereof, comprising cellulosic fibers. Exemplary manufactured cellulose products include, but are not limited to, paper and cardboard.

As noted above, in one embodiment or in combination with any of the mentioned embodiments, the MPW may comprise non-plastic solids. In one embodiment or in combination with any of the mentioned embodiments, no separate separation process is needed or included to remove non-plastic solids from the MPW. However, in one embodiment or in combination with any of the mentioned embodiments, at least a portion of the non-plastic solids in the MPW may be separated before the MPW feedstock is fed to the separation process(es), and particularly to the first density separation stage. Regardless, in one embodiment or in combination with any of the mentioned embodiments, the MPW feedstock comprises not more than 20, not more than 15, not more than 12, not more than 10, not more than 8, not more than 6, not more than 5, not more than 4, not more than 3, not more than 2, or not more than 1 weight percent of non-plastic solids, with the total weight of the MPW feedstock taken as 100 weight percent on a dry basis. In one embodiment or in combination with any of the mentioned embodiments, the MPW feedstock comprises from 0.01 to 20, from 0.1 to 10, from 0.2 to 5, or from 0.5 to 1 weight percent of non-plastic solids, with the total weight of the MPW feedstock taken as 100 weight percent on a dry basis.

When introduced into the pre-processing facility 20, the mixed plastic waste may undergo one or more steps to prepare it for chemical recycling. As used herein, the term "pre-processing" refers to preparing waste plastic for chemical recycling using one or more of the following steps: (i) comminuting; (ii) particulating; (iii) washing; (iv) drying; and/or (v) separating. As used herein, the term "preprocessing facility" refers to a facility that includes all equipment, lines, and controls necessary to carry out the pre-processing of waste plastic. Pre-processing facilities as described herein may employ any suitable method for carrying out the preparation of mixed plastic waste for chemical recycling.

In one embodiment or in combination with any of the mentioned embodiments, the pre-processing facility 20 shown in FIG. 1 may include a separation zone (not shown) for separating the mixed plastic waste into two or more streams enriched in certain types of plastics. For example, the separation zone may separate the mixed plastic waste into a PET-enriched stream 102 and a PO-enriched stream 104 as generally shown in FIG. 1. Additionally, a stream of non-plastic, non-soluble components **105*a* and non-plastic soluble components 105*b* may also be removed from pre-processing facility 20 and routed to various locations within or outside of the chemical recycling facility 10**.

Examples of suitable types of separation techniques usable in the separation facility 20 of chemical recycling facility 10 include mechanical separation and density separation, which may include sink-float separation and/or centrifugal density separation. As used herein, the term "sink-float separation" refers to a density separation process where the separation of materials is primarily caused by floating or sinking in a selected liquid medium, while the term "centrifugal density separation" refers to a density separation process where the separation of materials is primarily caused by centrifugal forces. In general, the term "density separation process" refers to a process for separating materials based, at least in part, upon the respective densities of the materials into at least a higher-density output and a lower-density output.

When sink-float separation is used in the pre-processing facility 20, the liquid medium can comprise water. Salts, saccharides, and/or other additives can be added to the liquid medium, for example to increase the density of the liquid medium and adjust the target separation density of the sink-float separation stage. In one embodiment or in combination with any of the mentioned embodiments, the liquid medium comprises a concentrated salt solution. In one or more such embodiments, the salt is sodium chloride. In one or more other embodiments, however, the salt is a non-halogenated salt, such as an acetate, a carbonate, a citrate, a nitrate, a nitrite, a phosphate, and/or a sulfate.

It should be understood that the target separation densities referred to herein refer to target plastic densities, as opposed to the densities of the concentration salt solution used in the separation processes, which may or may not be the same as the target separation density for the plastic materials. For example, in a typical sink/float separation stage, the plastic and the concentration salt solution densities are the same or substantially the same. However, in a typical hydrocyclone separation stage, the concentrated salt solution density is generally not greater than the target plastic density, but the concentrated salt solution density can be less than the target plastic density. In one embodiment or in combination with any of the mentioned embodiments, a hydrocyclone separator is used with a concentrated salt solution having a density of 1.25 to 1.35 g/cc and a target plastic separation density of 1.25 to 1.35 g/cc. Such embodiments will generally allow for higher PET purity, but results in a large yield loss. In one embodiment or in combination with any of the mentioned embodiments, a hydrocyclone separator is used with a concentrated salt solution having a density of 1.00 to 1.20, or 1.10 to g/cc and a target plastic separation density of 1.25 to 1.35 g/cc. Such embodiments will generally result in lower PET purity, but the PET yield is higher.

In one embodiment or in combination with any of the mentioned embodiments, the liquid medium comprises a concentrated salt solution comprising sodium bromide, sodium dihydrogen phosphate, sodium hydroxide, sodium iodide, sodium nitrate, sodium thiosulfate, potassium acetate, potassium bromide, potassium carbonate, potassium hydroxide, potassium iodide, calcium chloride, cesium chloride, iron chloride, strontium chloride, zinc chloride, manganese sulfate, zinc sulfate, and/or silver nitrate. In one embodiment or in combination with any of the mentioned embodiments, the liquid medium comprises a saccharide, such as sucrose. In one embodiment or in combination with any of the mentioned embodiments, the liquid medium comprises carbon tetrachloride, chloroform, dichlorobenzene, dimethyl sulfate, and/or trichloro ethylene. The particular components and concentrations of the liquid medium may be selected depending on the desired target separation density of the separation stage.

In one embodiment or in combination with any of the mentioned embodiments, after separation in the pre-processing facility 20, the separated waste plastic streams (or, In one embodiment or in combination with any of the mentioned embodiments, the mixed plastic waste stream) may optionally be washed to remove inorganic, non-plastic solids such as dirt, glass, fillers and other non-plastic solid materials, and/or to remove biological components such as bacteria and/or food. The resulting waste plastic (whether separated or not) may also be dried to a moisture content of not more than 5, not more than 3, not more than 2, not more than 1, not more than 0.5, not more than 0.25 weight percent water (or liquid), based on the total weight of the stream.

As also shown in FIG. 1, a stream of non-plastic components 105 may be withdrawn from pre-processing facility 20. The non-plastic component stream 105 may include soluble components and non-soluble components and may originate from one or more locations within the pre-processing facility. The soluble components may be those components which are substantially soluble in water, having, for example, a solubility of at least 50, at least 55, at least 60, at least 65, at least 70, at least 75, at least 80, at least 85, at least 90, at least 95, or at least 99 g per 100 grams of water, measured at 25° C. and 1 atm pressure. Examples of soluble components include, but are not limited to, salts, sugars, and combinations thereof.

As shown in FIG. 1, after separation within the pre-processing facility 20, a stream of non-plastic, soluble components **105*b* may be withdrawn from the facility 20 and routed to a wastewater treatment facility (not shown). The aqueous stream of non-plastic, soluble components 105*b* can include at least 1, at least 2, at least 3, at least 5, at least 10, at least 15, at least 20, at least 25, at least 30 and/or not more than 50, not more than 45, not more than 40, not more than 35, not more than 30, not more than 25, not more than 20, not more than 15, not more than 10, not more than 7, or not more than 5 weight percent of soluble, non-plastic components, based on the total weight of the stream. The aqueous stream of non-plastic, soluble components 105*b*** can include soluble, non-plastic components in an amount in the range of 1 to 50 weight percent, 2 to 45 weight percent, or 5 to 25 weight percent, based on the total weight of the stream. The balance of the stream can be or comprise water.

In one or more embodiments as also illustrated in FIG. 1, a stream of non-plastic, non-soluble components can also be withdrawn from pre-processing facility 20 via line **105*a*. The non-plastic, non-soluble components withdrawn from the pre-processing facility 20** can include organics (such as food or cellulosics, like paper or cardboard), as well as dirt, glass, metal, rocks, TEFLON®, intert-filled polyolefins such as polypropylene and polyethylene, silicon, and combinations thereof. At least 5, at least 10, at least 15, at least 20, or at least 25 weight percent and/or not more than 75, not more than 70, not more than 60, not more than 55, not more than 50, not more than 45, not more than 40, not more than 35, not more than 30, or not more than 25 weight percent of the non-plastic, non-soluble components can comprise biomass or other organic materials, or the amount of non-plastic, non-soluble components can be in the range of from 5 to 75 weight percent, 10 to 60 weight percent, or 20 to 50 weight percent, based on the total weight of the stream.

In one embodiment or in combination with any of the mentioned embodiments, the non-plastic, non-soluble components in stream **105*b*** can include at least 45, at least 50, at least 55, at least 60, at least 65, at least 70, at least 75, or at least 80 weight percent and/or not more than 95, not more than 90, not more than 85, not more than 80, not more than 75, not more than 70, or not more than 65 weight percent of metals, based on the total weight of the stream, or it can include metals in an amount in the range of from 45 to 95 weight percent, 50 to 85 weight percent, or 60 to 80 weight percent, based on the total weight of the stream.

In one embodiment or in combination with any of the mentioned embodiments, the non-plastic, non-soluble component stream **105*b* can include at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent organic compounds, based on the total weight of stream. Additionally, or in the alternative, the non-plastic, non-soluble component stream 105*b*** can include not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, or not more than 5 weight percent organic compounds, based on the total weight of the stream, or the stream can include organic compounds in the amount of 5 to 95 weight percent, 15 to 85 weight percent, 25 to 75 weight percent, or 30 to 50 weight percent, based on the total weight of the stream.

In one embodiment or in combination with any of the mentioned embodiments, the non-plastic, non-soluble component stream 105*b* can include at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent inorganic compounds, based on the total weight of stream. Additionally, or in the alternative, the non-plastic, non-soluble component stream 105*b* can include not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, or not more than 5 weight percent inorganic compounds, based on the total weight of the stream, or it may include inorganic compounds in an amount of 5 to 80 weight percent, 10 to 60 weight percent, or 15 to 40 weight percent, based on the total weight of the stream. Examples of inorganic compounds include metals, metalloids (like silicon), rocks, dirt, glass, and combinations thereof.

In one embodiment or in combination with any of the mentioned embodiments, the non-plastic, non-soluble stream 105*a* removed from pre-processing facility 20 can be sent to a subsequent processing facility, wherein one or more types of constituents from the stream may be removed and further utilized. For example, n one embodiment or in combination with any of the mentioned embodiments, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of the components in the non-plastic, non-soluble stream 105*a* can be further processed, recycled, and/or sold. For example, metal components may be removed and sold to a metals reclaiming facility (not shown). Alternatively, less than 20, not more than 15, not more than 10, not more than 5, not more than 3, or not more than 1 weight percent of the non-plastic, non-soluble components can be further processed, recycled, and/or sold.

In one embodiment or in combination with any of the mentioned embodiments, at least 20, at least 25, at least 30, at least 35, at least 40, at least 45, at least 50, at least 55, at least 60, at least 65, at least 70, at least 75, at least 80, at least 85, at least 90, or at least 95 weight percent of the non-plastic, non-soluble components from the pre-processing facility 20 can be introduced into the partial oxidation (POX) gasifier 50, as shown in FIG. 1. Alternatively, less than 20, not more than 15, not more than 10, not more than 5, not more than 3, or not more than 1 weight percent of the non-plastic, non-soluble components can be introduced into the POX gasifier 50. In one embodiment or in combination with any of the mentioned embodiments, at least a portion of the components may be transported to an industrial landfill or other processing facility (not shown).

As generally depicted in FIG. 1, the PO-enriched plastic stream 104 withdrawn from the pre-processing facility 20 (or a PO-enriched waste plastic stream from an outside source) may be routed to one or more of several facilities within the chemical recycling facility 10. In one embodiment or in combination with any of the mentioned embodiments, at least a portion or all of a polyolefin-enriched (PO-enriched) plastic stream 104 may be directly or indirectly sent to at least one of (i) a partial oxidation (POX) gasification facility 50; (ii) a pyrolysis facility 60, (iii) a cracker facility 70; (iv) an energy generation/production facility 80; and (v) a reuse facility 90. Various embodiments of each of these types of facilities are discussed below, with reference to the Figures, along with specific examples of how two or more of the above facilities may be integrated with one another within the chemical recycling facility 10.

In one or more embodiments as mentioned previously, the mixed plastic waste stream 100 may be separated into a PET-enriched stream 102 and a PO-enriched stream 104 in the pre-processing facility 20. As used herein, the term "enriched" means having a concentration (on a dry weight basis) of a specific component that is greater than the concentration of that component in a reference material or stream. As used herein, all weight percentages are given on a dry basis, unless otherwise noted. Thus, the PET-enriched stream 102 of waste plastic formed in and/or withdrawn from the pre-processing facility 20 may have a higher concentration of PET than the concentration of PET in the mixed waste feed stream 100 introduced into the pre-processing facility 20. Similarly, the PO-enriched waste plastic stream 104 formed in and/or withdrawn from the pre-processing facility 20 may have a higher concentration of PO than the concentration of PO in the mixed plastic waste stream 100 introduced into the pre-processing facility 20.

In one embodiment, the PET-enriched stream 102 is enriched in concentration of PET relative to the concentration of PET in the MPW stream, or the PET-depleted stream, or both, on an undiluted solids dry basis. For example, if the PET-enriched stream 102 is diluted with liquid or other solids after separation, the enrichment would be on the basis of a concentration in the undiluted PET-enriched stream, and on a dry basis. In one embodiment or in combination with any of the mentioned embodiments, the PET-enriched stream 102 has a percent PET enrichment relative to the MPW stream, the PET-depleted stream, or both that is at least 10, at least 20, at least 40, at least 50, at least 60, at least 80, at least 100, at least 125, at least 150, at least 175, at least 200, at least 225, at least 250, at least 300, at least 350, at least 400, at least 500, at least 600, at least 700, at least 800, at least 900, or at least 1000 percent as determined by the formulas:

$$\%\ PETenrichment = \frac{PETe - PETm}{PETm} \times 100$$

and $$\%\ PETenrichment = \frac{PETe - PETd}{PETd} \times 100$$

where PETe is the concentration of PET in the PET-enriched stream 102 on an undiluted dry weight basis; and PETm is the concentration of PET in the MPW stream on a dry weight basis, and PETd is the concentration of PET in the PET-depleted stream on a dry weight basis, In one embodiment or in combination with any of the mentioned embodiments, the PET-enriched stream 102 is also enriched in halogens, such as fluorine (F), chlorine (Cl), bromine (Br), iodine (I), and astatine (At), and/or halogen-containing compounds, such as PVC, relative to the concentration of halogens in the MPW stream, or the PET-depleted stream, or both In one embodiment or in combination with any of the mentioned embodiments, the PET-enriched stream 102 has a percent PVC enrichment relative to the MPW stream that is at least 1, at least 3, at least 5, at least 7, at least 10, at least 15, at least 20, at least 40, at least 50, at least 60, at least 80, at least 100, at least 125, at least 150, at least 175, at least 200, at least 225, at least 250, at least 300, at least 350, at least 400, at least 500 percent, as determined by the formula:

$$\% \ PVCenrichment = \frac{PVCe - PVCm}{PVCm} \times 100$$

and $$\% \ PVCenrichment = \frac{PVCe - PVCd}{PVCd} \times 100$$

where PVCe is the concentration of PVC in the PET-enriched stream 102 on an undiluted dry weight basis; and PVCm is the concentration of PVC in the MPW stream on an undiluted dry weight basis, and where PVCd is the concentration of PVC in the PET-depleted stream on an undiluted dry weight basis.

Due to the separation of polyolefins from the PET, the PET-depleted stream is enriched in polyolefins relative to the concentration of polyolefins in the MPW feed, or the PET-enriched stream, or both, on an undiluted solids dry basis. In one embodiment or in combination with any of the mentioned embodiments, the PET-depleted stream has a percent polyolefin enrichment relative to the MPW stream or relative to the PET-enriched stream 102 or both that is at least 10, at least 20, at least 40, at least 50, at least 60, at least 80, at least 100, at least 125, at least 150, at least 175, at least 200, at least 225, at least 250, at least 300, at least 350, at least 400, at least 500, at least 600, at least 700, at least 800, at least 900, or at least 1000 percent, as determined by the formula:

$$\% \ POenrichment = \frac{POd - POm}{POm} \times 100$$

and $$\% \ POenrichment = \frac{POd - POe}{POe} \times 100$$

where POd is the concentration of polyolefins in the PET-depleted stream on an undiluted dry weight basis; and POm is the concentration of PO in the MPW stream on a dry weight basis, and POe is the concentration of PO in the PET-enriched stream.

In one embodiment or in combination with any of the mentioned embodiments, the PET-depleted stream is also depleted in halogens, such as fluorine (F), chlorine (Cl), bromine (Br), iodine (I), and astatine (At), and/or halogen-containing compounds, such as PVC, relative to the concentration of halogens in the MPW stream, the PET-enriched stream, or both. In one embodiment or in combination with any of the mentioned embodiments, the PET-depleted stream has a percent PVC depletion, relative to the MPW stream or the PET-enriched stream 102 or both, that is at least 1, at least 3, at least 5, at least 7, at least 10, at least 15, at least 20, at least 25, at least 30, at least 35, at least 40, at least 50, at least 60, at least 65, at least 70, at least 75, at least 80, at least 85, at least 90 percent, as determined by the formulas:

$$\% \ PVCdepletion = \frac{PVCm - PVCd}{PVCm} \times 100$$

-continued and $$\% \ PVCdepletion = \frac{PVCe - PVCd}{PVCe} \times 100$$

where PVCm is the concentration of PVC in the MPW stream on an undiluted dry weight basis;

PVCd is the concentration of PVC in the PET-depleted stream on an undiluted dry weight basis; and PVCe is the concentration of PVC in the PET-enriched stream 102 on an undiluted dry weight.

In one embodiment or in combination with any other mentioned embodiments, the PET-depleted stream is also depleted in PET, relative to the concentration of PET in the MPW stream, the PET-enriched stream, or both. In one embodiment or in combination with any of the mentioned embodiments, the PET-depleted stream has a percent PET depletion, relative to the MPW stream or the PET-enriched stream 102 or both, that is at least 1, at least 3, at least 5, at least 7, at least 10, at least 15, at least 20, at least 25, at least 30, at least 35, at least 40, at least 50, at least 60, at least 65, at least 70, at least 75, at least 80, at least 85, at least 90 percent as determined by the formulas:

$$\% \ PETdepletion = \frac{PETm - PETd}{PETm} \times 100$$

and $$\% \ PETdepletion = \frac{PETe - PETd}{PETe} \times 100$$

where PETm is the concentration of PET in the MPW stream on an undiluted dry weight basis;

PETd is the concentration of PET in the PET-depleted stream on an undiluted dry weight basis; and PETe is the concentration of PET in the PET-enriched stream 102 on an undiluted dry weight.

The percentage of enrichment or depletion in any of the above embodiments can be measured as an average over 1 week, or over 3 days, or over 1 day, and the measurements can be conducted to reasonably correlate the samples taken at the exits of the process to MPW bulk from which the sample of MPW is taken in order to account for the residence time of the MPW flowing from entry to exit. For example, if the average residence time of the MPW in the pre-processing facility 20 (or separation zone within the pre-processing facility 20) is 2 minutes, then the outlet sample would be taken two minutes after the input sample, so that the samples correlate to one another.

In one embodiment or in combination with any of the mentioned embodiments, the PET-enriched stream 102 exiting the separation zone or the pre-processing facility 20 may include at least 50, at least 55, at least 60, at least 65, at least 70, at least 75, at least 80, at least 85, at least 90, at least 95, at least 97, at least 99, or at least 99.5 weight percent PET, based on the total weight of the PET-enriched stream 102. The PET-enriched stream 102 may include at least 50, at least 55, at least 60, at least 65, at least 70, at least 75, at least 80, at least 85, at least 90, or at least 95 weight percent of the total amount of PET introduced into the pre-processing facility 20.

The PET-enriched stream 102 may also be enriched in PVC and can include, for example, at least 0.1, at least 0.5, at least 1, at least 2, at least 3, at least 5 and/or not more than 10, not more than 8, not more than 6, not more than 5, not more than 3 weight percent of halogens, including PVC, based on the total weight of the PET-enriched stream 102, or it can include halogens (including PVC) in an amount of 0.1 to 10 weight percent, 0.5 to 6 weight percent, or 0.5 to 3 weight percent, based on the total weight of the stream.

The PET-enriched stream 102 withdrawn from the pre-processing facility 20 (or separation zone) may also be depleted in PO. As used herein, the term "depleted" means having a concentration (on a dry weight basis) of a specific component that is less than the concentration of that component in a reference material or stream. In one embodiment or in combination with any of the mentioned embodiments, the PET-enriched stream 102 may comprise not more than 45, not more than 40, not more than 35, not more than 30, not more than 25, not more than 20, not more than 15, not more than 10, not more than 5, not more than 2, not more than 1, not more than 0.5 weight percent PO, based on the total weight of the PET-enriched stream 102.

However, it should be understood that the halogen concentration in the PET-enriched stream (and the PET-depleted stream) is based, at least in part, on the halogen content in the MPW feedstock, and thus even lower amounts of halogens may be present in the PET-enriched stream. In one embodiment or in combination with any of the mentioned embodiments, the PET-enriched stream 20 comprises not more than 1000 ppm, not more than 500 ppm, not more than 100 ppm, not more than 50 ppm, not more than 15 ppm, not more than 10 ppm, not more than 5 ppm, or not more than 1 ppm halogens and/or halogen-containing compounds on a dry basis.

The PET-enriched stream 102 may comprise not more than 10, not more than 8, not more than 5, not more than 3, not more than 2, or not more than 1 weight percent of the total amount of PO introduced into the pre-processing facility 20. In one embodiment or in combination with any of the mentioned embodiments, the PET-enriched stream 102 may also comprise not more than 45, not more than 40, not more than 35, not more than 30, not more than 25, not more than 20, not more than 15, not more than 10, not more than 5, not more than 2, not more than 1 weight percent of components other than PET, based on the total weight of PET-enriched stream 102.

Similarly, the PO-enriched stream 104 may include at least 50, at least 55, at least 60, at least 65, at least 70, at least 75, at least 80, at least 85, at least 90, at least 95, at least 97, at least 99, or at least 99.5 weight percent PO, based on the total weight of the PO-enriched stream 104. The PO-enriched stream 104 may also be depleted in PVC and can include, for example, not more than 5, not more than 4, not more than 3, not more than 2, not more than 1, not more than 0.5, not more than 0.1 weight percent of halogens or PVC, based on the total weight of the PO-enriched stream 104. The PO-enriched stream 104 may include at least 50, at least 55, at least 60, at least 65, at least 70, at least 75, at least 80, at least 85, at least 90, or at least 95 weight percent of the total amount of PO introduced into the pre-processing facility 20.

The PO-enriched stream 104 withdrawn from the pre-processing facility 20 may also be depleted in PET. For example, in one embodiment or in combination with any of the mentioned embodiments, the PO-enriched stream 104 may comprise not more than 45, not more than 40, not more than 35, not more than 30, not more than 25, not more than 20, not more than 15, not more than 10, not more than 5, not more than 2, not more than 1, not more than 0.5 weight percent PET based on the total weight of the PO-enriched stream 104.

The PO-enriched stream 104 may comprise not more than 10, not more than 8, not more than 5, not more than 3, not more than 2, or not more than 1 weight percent of the total amount of PET introduced into the pre-processing facility 20. In one embodiment or in combination with any of the mentioned embodiments, the PO-enriched stream 104 may also comprise not more than 45, not more than 40, not more than 35, not more than 30, not more than 25, not more than 20, not more than 15, not more than 10, not more than 5, not more than 2, or not more than 1 weight percent of components other than PO, based on the total weight of PO-enriched stream 104.

In one embodiment or in combination with any of the mentioned embodiments, the PO-enriched stream 104 may also have one or more of the following characteristics—

An ash content of not more than 5, not more than 4.5, not more than 4, not more than 3.5, not more than 3, not more than 2.5, not more than 2, not more than 1.5, not more than 1, or not more than 0.5 weight percent;

A halogen content of not more than 250, not more than 225, not more than 200, not more than 175, not more than 150, not more than 125, not more than 100, not more than 75, not more than 50, not more than 25, not more than 10, or not more than 5 ppm by weight (on a dry basis);

Not more than 5, not more than 4.5, not more than 4, not more than 3.5, not more than 3, not more than 2.5, not more than 2, not more than 1.5, not more than 1, not more than 0.75, not more than 0.5, not more than 0.25 weight percent of nitrogen-containing compounds;

Not more than 5, not more than 4.5, not more than 4, not more than 3.5, not more than 3, not more than 2.5, not more than 2, not more than 1.5, not more than 1, not more than 0.75, not more than 0.5, not more than 0.25 weight percent of oxygenated compounds;

Not more than 10, not more than 8, not more than 6, not more than 4, not more than 2, not more than 1, not more than 0.5 weight percent of polyethylene terephthalate;

A mercury content of not more than 1, not more than 0.75, not more than 0.50, not more than 0.25, not more than 0.10, or not more than 0.05 ppm;

An arsenic content of not more than 100, not more than 75, not more than 50, not more than 25, not more than 10, not more than 5 ppm; and Melt viscosity of less than 25,000, less than 15,000, less than 10,000, or less than 5000 poise measured using a Brookfield R/S rheometer with V80-40 vane spindle operating at a shear rate of 10 rad/s and a temperature of 250° C., or from 1 to 5000 poise, or 500 to 3000 poise, Wherein all of the weights are based on the total weight of the PO-enriched stream 104. In one embodiment or in combination with any of the mentioned embodiments, the PO-enriched stream 104 may comprise one, two, three, four, five, six, seven, or all of the above characteristics.

Ash content can be determined by thermally vaporizing the non-ash components and gravimetrically weighing the ash according to ASTM D5630-13. The halogen content can be determined via Uniquant X-ray fluorescence or combustion ion chromatography. The nitrogen-containing compounds can be measured using a nitrogen analyze or a CHN analyzer. The mercury and arsenic content may be determined using ICP-OES.

In one embodiment or in combination with any of the mentioned embodiments, the PO-enriched stream 104 may have a melt viscosity of at least 1, at least 5, at least 50, at least 100, at least 200, at least 300, at least 400, at least 500, at least 600, at least 700, at least 800, at least 900, at least 1000, at least 1500, at least 2000, at least 2500, at least 3000, at least 3500, at least 4000, at least 4500, at least 5000, at least 5500, at least 6000, at least 6500, at least 7000, at least 7500, at least 8000, at least 8500, at least 9000, at least 9500, or at least 10,000 poise. Alternatively, or in addition, the PO-enriched stream 104 may have a melt viscosity of not more than 25,000, not more than 24,000, not more than 23,000, not more than 22,000, not more than 21,000, not more than 20,000, not more than 19,000, not more than 18,000, or not more than 17,000 poise, measured using a Brookfield R/S rheometer with V80-40 vane spindle operating at a shear rate of 10 rad/s and a temperature of 250° C. The melt viscosity of the PO-enriched stream can be in the range of 1 to 25,000 poise, 100 to 20,000 poise, or 2000 to 17,000 poise.

In one embodiment or in combination with any of the mentioned embodiments, the PO-enriched stream 104 comprises not more than 4, not more than 2, not more than 1, not more than 0.5, not more than 0.1 weight percent of adhesives, based on the total weight of the stream.

In one embodiment or in combination with any of the mentioned embodiments, at least 50, at least 75, at least 90, at least 95, at least 99, or at least 100 weight percent of the PVC in the PET-enriched stream 20 remains in the PET-enriched stream 20 upon processing the PET polymers in the PET enriched stream 20 in downstream chemical recycling processes. In one embodiment or in combination with any of the mentioned embodiments, from 50 to 100, or from 75 to 99, or from 90 to 95 weight percent of the PVC in the PET-enriched stream 20 remains in the PET-enriched stream 20 upon processing the PET polymers in the PET enriched stream 20 in downstream chemical recycling processes.

In one embodiment or in combination with any of the mentioned embodiments, the PET-enriched stream 20 is depleted in multi-layer plastics, relative to the MPW 10, the PET-depleted stream 30, or both. In one embodiment or in combination with any of the mentioned embodiments, the PET-enriched stream 20 comprises not more than 10, not more than 5, not more than 2, not more than 1, or not more than 0.1 weight percent multi-layer plastics on a dry basis. In one embodiment or in combination with any of the mentioned embodiments, the PET-enriched stream 20 comprises from 0.01 to 10, from 0.05 to 5, or from 0.1 to 2, or from 0.5 to 1 weight percent multi-layer plastics on a dry basis.

In one embodiment or in combination with any of the mentioned embodiments, the PET-enriched stream 20 is depleted in multi-component plastics, relative to the MPW 10, the PET-depleted stream 30, or both. In one embodiment or in combination with any of the mentioned embodiments, the PET-enriched stream 20 comprises not more than 10, not more than 5, not more than 2, not more than 1, or not more than 0.1 weight percent multi-component plastics on a dry basis. In one embodiment or in combination with any of the mentioned embodiments, the PET-enriched stream 20 comprises from 0.01 to 10, from 0.05 to 5, or from 0.1 to 2, or from 0.5 to 1 weight percent multi-component plastics on a dry basis.

As shown in FIG. 1, both the PET-enriched stream 102 and the PO-enriched stream 104 may be introduced into one or more downstream processing facilities within the chemical recycling facility. In one embodiment or in combination with any of the mentioned embodiments, at least a portion of the PET-enriched stream 102 may be introduced into a solvolysis facility 30, while at least a portion of the PO-enriched stream 104 may be directly or indirectly introduced into one or more of a pyrolysis facility 60, a cracking (cracker) facility 70, a partial oxidation (POX) gasification facility 50, a solidification facility 40, and an energy generation/production facility 80. Alternatively, or in addition, all or a portion of the stream can be sent to an industrial landfill and/or further processed and/or sold. Additional details of each type of facility, as well as the integration of each of these facilities with one or more of the others according to one or more embodiments of the present technology are discussed in further detail below.

In one embodiment or in combination with any of the mentioned embodiments, the pre-processing step(s) and/or separation process(es) described herein are particularly effective at separating nylons and other plastics associated with PET in the form of multi-layer plastics or other multi-component plastics. Regardless the mode of association, the pre-processing and/or separation process(es) may effectively disassociate and separate the nylon and/or other plastics from the PET, thereby allowing for increased separation efficiency of these components.

In one embodiment or in combination with any of the mentioned embodiments, the PET-enriched stream 20 comprises not more than 5, not more than 4, not more than 3, not more than 2, not more than 1, not more than 0.5, or not more than 0.1 weight percent associated PET-nylon on a dry basis. In one embodiment or in combination with any of the mentioned embodiments, the PET-enriched stream 20 comprises from 0.001 to 5, from 0.01 to 2, or from 0.1 to 1 weight percent associated PET-nylon on a dry basis.

In one embodiment or in combination with any of the mentioned embodiments, the PET-enriched stream 20 comprises not more than 20, not more than 15, not more than 10, not more than 5, not more than 2, or not more than 1 weight percent of the associated PET-nylon that is present in the MPW and/or the MPW feedstock stream fed to the first separation stage, on a dry basis. In one embodiment or in combination with any of the mentioned embodiments, the PET-enriched stream 20 comprises from 0.01 to 20, from 0.1 to 10, or from 1 to 5 weight percent of the associated PET-nylon that is present in the MPW and/or the MPW feedstock stream fed to the first separation stage, on a dry basis.

In one embodiment or in combination with any of the mentioned embodiments, the PET-depleted stream 30 is enriched in multi-layer plastics, relative to the MPW 10, the PET-enriched stream 20, or both. However, in one embodiment or in combination with any of the mentioned embodiments, the PET-depleted stream 30 is depleted in multi-layer plastics, relative to the MPW 10. In one embodiment or in combination with any of the mentioned embodiments, the PET-depleted stream 30 comprises at least 0.001, at least 0.01, at least 0.1, or at least 1 weight percent and/or not more than 10, not more than 8, not more than 6, or not more than 4 weight percent multi-layer plastics on a dry plastic basis. In one embodiment or in combination with any of the mentioned embodiments, the PET-depleted stream 30 comprises from 0.001 to 10, from 0.01 to 8, from 0.1 to 6, or from 1 to 4 weight percent multi-layer plastics on a dry plastic basis. In one embodiment or in combination with any of the mentioned embodiments, the weight ratio of the multi-layer plastics in the PET-depleted stream to the multi-layer plastics in the PET-enriched stream is at least 1:1, at least 2:1, at least 5:1, at least 10:1, at least 50:1, or at least 100:1.

In one embodiment or in combination with any of the mentioned embodiments, the PET-depleted stream 30 is enriched in multi-component plastics, relative to the MPW 10, the PET-enriched stream 20, or both. However, in one embodiment or in combination with any of the mentioned embodiments, the PET-depleted stream 30 is depleted in multi-component plastics, relative to the MPW 10. In one embodiment or in combination with any of the mentioned embodiments, the PET-depleted stream 30 comprises at least 0.001, at least 0.01, at least 0.1, or at least 1 weight percent and/or not more than 10, not more than 8, not more than 6, or not more than 4 weight percent multi-component plastics on a dry plastic basis. In one embodiment or in combination with any of the mentioned embodiments, the PET-depleted stream 30 comprises from 0.001 to 10, from 0.01 to 8, from 0.1 to 6, or from 1 to 4 weight percent multi-component plastics on a dry plastic basis. In one embodiment or in combination with any of the mentioned embodiments, the weight ratio of the multi-component plastics in the PET-depleted stream to the multi-component plastics in the PET-enriched stream is at least 1:1, at least 2:1, at least 5:1, at least 10:1, at least 50:1, or at least 100:1.

In one embodiment or in combination with any of the mentioned embodiments, the PO-enriched stream 104 may be further processed within pre-processing facility 20 before being routed to one or more downstream facilities. For example, at least a portion, or all, of the PO-enriched stream 104 may be optionally pulverized and pelletized (or micro-pelletized), or all or a portion of the stream may be sent directly to one or more of the downstream facilities listed above. In one embodiment or in combination with any of the mentioned embodiments, all or a portion of the solids, whether directly from the separation zone or after pulverization and/or pelletization, may be sent directly, may be combined with other solids, or may be combined with a liquid to form a slurry.

When pulverized, the PO-enriched flake from within the pre-processing facility 20 can be passed to a pulverizer, wherein the flake (or other solids) is contacted with a plurality of cutting blades or discs to reduce the particle size of the incoming material. The number and size of the blades may be selected to achieve the desired final particle size. After size reduction, the resulting material can be screened to provide a final solids stream with a specified particle size distribution.

When pelletized, the feed stream can be introduced into a melt extruder, wherein it is heated and melted to form a molten polymer at a temperature of at least 240, at least 245, at least 250, at least 255, at least 260° C. and/or not more than 310, not more than 305, not more than 300, not more than 290, not more than 280, not more than 275, not more than 270, not more than 265, or not more than 260° C. The molten polymer is then passed through a die plate with a plurality of holes and the resulting polymer strands are cut, optionally under water, to form pellets. The resulting pellets can have an average particle size, measured along the longest dimension, of at least 0.5, at least 0.75, at least 0.90, at least 1, at least 1.1, at least 1.25 mm and/or not more than 2.25, not more than 2.1, not more than 2, not more than 1.75, or not more than 1.6 mm.

Although described herein as being part of a single chemical recycling facility 10, it should be understood that one or more of the pre-processing facility 20, solvolysis facility 30, pyrolysis facility 60, cracking facility 70, partial oxidation (POX) gasification facility 50, solidification facility 40, energy generation/production facility 80, and reuse facility 90 may be located in a different geographical location and/or be operated by a different commercial entity. In one embodiment or in combination with any of the mentioned embodiments, each of the pre-processing facility 20, solvolysis facility 30, pyrolysis facility 60, cracking facility 70, partial oxidation (POX) gasification facility 50, solidification facility 40, energy generation/production facility 80 and reuse facility 90 may be operated by the same entity, while, in other cases, one or more of the pre-processing facility 20, solvolysis facility 30, pyrolysis facility 60, cracking facility 70, partial oxidation (POX) gasification facility 50, solidification facility 40, energy generation/production facility 80 and reuse facility 90 may be operated by a different entity.

In one embodiment or in combination with any of the mentioned embodiments, the chemical recycling facility 10 may be a commercial-scale facility capable of processing significant volumes of mixed plastic waste. As used herein, the term "commercial scale facility" refers to a facility having an average annual feed rate of at least 500 pounds per hour, averaged over one year. In one embodiment or in combination with any of the mentioned embodiments, the average feed rate to the chemical recycling facility (or to any one of the pre-processing facility 20, the solvolysis facility 30, the pyrolysis facility 60, the cracking facility 70, the partial oxidation (POX) gasification facility 50, the solidification facility 40, the energy generation/production facility 80, and the reuse facility 90) can be at least 1000, at least 1500, at least 2000, at least 2500, at least 3000, at least 3500, at least 4000, at least 4500, at least 5000, at least 5500, at least 6000, at least 6500, at least 7500, at least 10,000, at least 12,500, at least 15,000, at least 17,500, at least 20,000, at least 22,500, at least 25,000, at least 27,500, at least 30,000 or at least 32,500 pounds per hour and/or not more than 500,000, not more than 450,000, not more than 400, 000, not more than 350,000, not more than 300,000, not more than 250,000, not more than 200,000, not more than 150,000, not more than 100,000, not more than 75,000, not more than 50,000, or not more than 40,000 pounds per hour (lbs/hr), or it can be in the range of 1000 to 500,000 lbs/hr, 3500 to 250,000 lbs/hr, or 10,000 to 100,000 lbs/hr. When a facility includes two or more feed streams, the average annual feed rate is determined based on the higher volume feed stream.

Additionally, In one embodiment or in combination with any of the mentioned embodiments, the chemical recycling facility 10 (or any one of the pre-processing facility 20, the solvolysis facility 30, the pyrolysis facility 60, the cracking facility 70, the partial oxidation (POX) gasification facility 50, the solidification facility 40, the energy generation/production facility 80 and the reuse facility 90) may be operated in a continuous manner.

Additionally, or in the alternative, at least a portion of the chemical recycling facility (or any of the pre-processing facility 20, the solvolysis facility 30, the pyrolysis facility 60, the cracking facility 70, the partial oxidation (POX) gasification facility 50, the solidification facility 40, and the energy generation/production facility 80) may be operated in a batch or semi-batch manner. In some cases, the facility may include a plurality of tanks between portions of a facility or between facilities to manage inventory and ensure consistent flow rates into each facility.

In addition, two or more of the facilities shown in FIG. 1 may also be co-located with one another. In one embodiment or in combination with any of the mentioned embodiments, at least two, three, four, five, six, or all of the facilities may be co-located. As used herein, the term "co-located" refers to facilities in which at least a portion of the processes or supporting equipment or services are shared between the two facilities. In one embodiment or in combination with any of the mentioned embodiments, when two or more of the facilities shown in FIG. 1 are co-located, the facilities may meet at least one of the following criteria (i) through (v): (i)

the facilities share at least one utility; (ii) the facilities share at least one service group; (iii) the facilities are owned and/or operated by parties that share at least one boundary; (iv) the facilities are connected by at least one conduit; and (v) the facilities are within 40, within 35, within 30, within 20, within 15, within 12, within 10, within 8, within 5, within 2, or within 1 mile of one another, measured from their geographical center. At least one, two, three, four, or all of the above may be true.

Regarding (i), examples of suitable utilities include, but are not limited to, steam systems (co-generation and distribution systems), cooling water systems, heat transfer fluid systems, plant or instrument air systems, nitrogen systems, hydrogen systems, electrical generation and distribution, including distribution above 8000V, waste water/sewer systems, storage facilities, transport lines, flare systems, and combinations thereof.

Regarding (ii), examples of service groups and facilities include, but are not limited to, emergency services personnel (fire and/or medical), a third-party vendor, a government oversight group, and combinations thereof. Government oversight groups can include, for example, regulatory or environmental agencies, as well as municipal and taxation agencies at the city, county, and state level.

Regarding (iii), the boundary may be, for example, a fence line, a property line, a gate, or common boundaries with at least one boundary of a third-party owned land or facility.

Regarding (iv), the conduit may be a fluid conduit, such as a gas-filled or liquid-filled conduit, or an electrical conduit. In some cases, two units may share one or more conduits selected from the above list. Fluid conduits may be used to transport process streams or utilities between the two units. For example, the inlet of one facility (e.g., the solvolysis facility 30) may be fluidly connected via a conduit with the inlet of another facility (e.g., the POX gasification facility 50). In some cases, the interim storage between the outlet of one facility and the inlet of another can be no more than 90, not more than 75, not more than 60, not more than 40, not more than 30, not more than 25, not more than 20, not more than 15, not more than 10, not more than 5, not more than 2 days or not more than 1 day.

In one embodiment or in combination with any of the mentioned embodiments, one or more of the above streams withdrawn from the pre-processing facility 20, including the non-plastic, non-soluble stream 105*a*, the PO-enriched stream 104, and the PET-enriched stream 102, can be or comprise solids. Examples of such streams can include, solid particles transportable by solids transport devices and systems, as well as melts and slurries.

Additional embodiments of specific facilities within the chemical recycling facility as shown in FIG. 1 are described in further detail below.

Solvolysis Facility

In one embodiment or in combination with any of the mentioned embodiments, at least a portion of a PET-enriched stream 102 may be introduced into a solvolysis facility 30. As used herein, the term "solvolysis" or "ester solvolysis" refers to a reaction by which an ester-containing feed is chemically decomposed in the presence of a solvent to form a principal carboxyl product and a principal glycol product. A "solvolysis facility" is a facility that includes all equipment, lines, and controls necessary to carry out solvolysis of waste plastic and feedstocks derived therefrom. As used herein, the term "principal carboxyl" refers to the main or key carboxyl product being recovered from the solvolysis facility. As used herein, the term "principal glycol" refers to the main glycol product being recovered from the solvolysis facility.

When the ester being subjected to solvolysis comprises PET, the solvolysis performed in the solvolysis facility may be PET solvolysis. As used herein, the term "PET solvolysis" refers to a reaction by which a polyester terephthalate-containing feed is chemically decomposed in the presence of a solvent to form a principal terephthalyl product and a principal glycol product. As used herein, the term "principal terephthalyl" refers to the main or key terephthalyl product being recovered from the solvolysis facility. As used herein, the term "glycol" refers to a component comprising two or more —OH functional groups per molecule. As used herein, the term "terephthalyl" refers to a molecule including the following group:

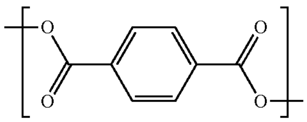

Figure 2:
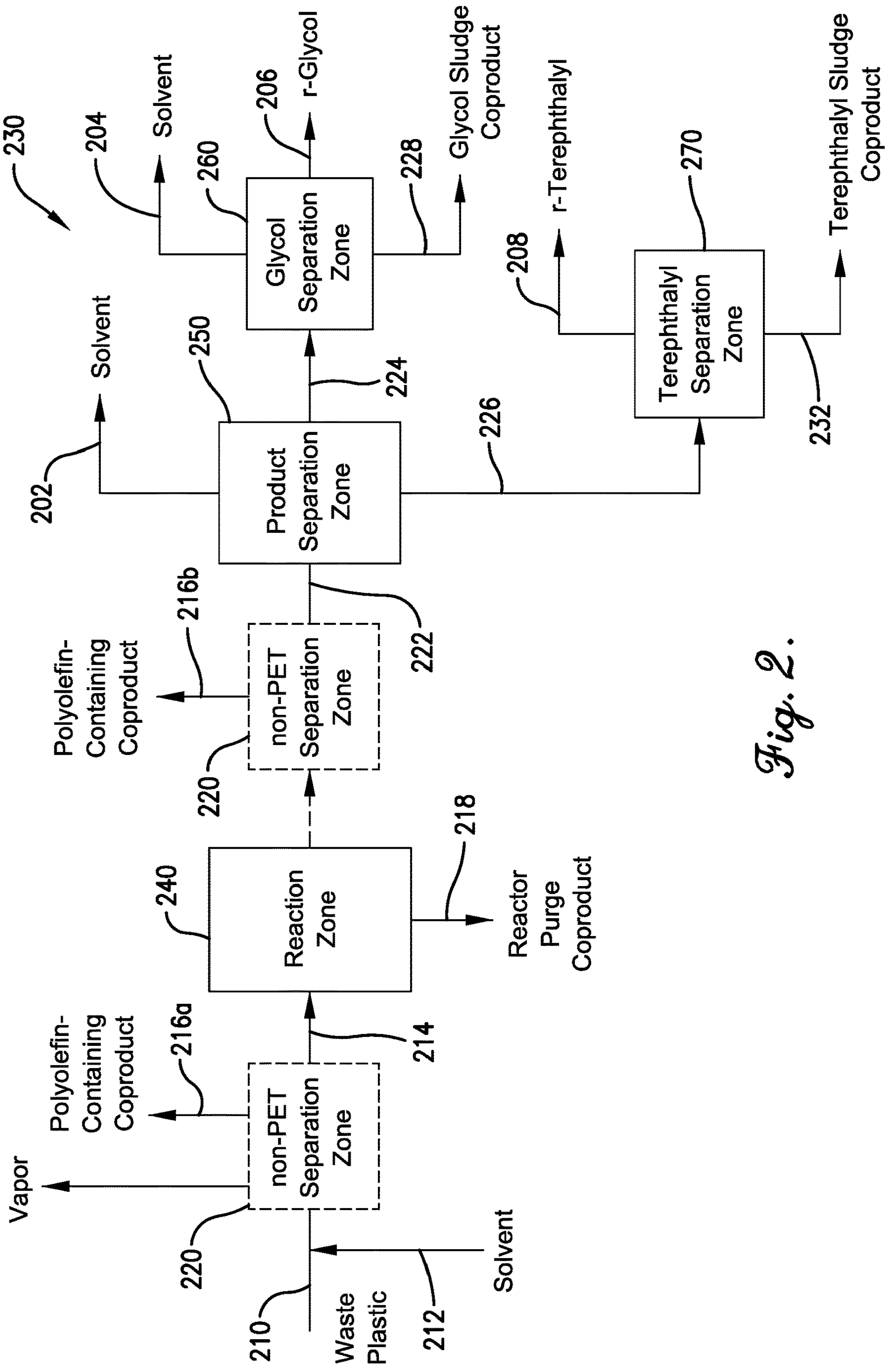
FIG. 2 is a schematic block flow diagram illustrating the main steps of a solvolysis facility according to embodiments of the present technology.

In one embodiment or in combination with any of the mentioned embodiments, the principal terephthalyl formed during solvolysis comprises a terephthalyl such as terephthalic acid or dimethyl terephthalate (or oligomers thereof), while the principal glycol formed during solvolysis comprises a glycol such as ethylene glycol and diethylene glycol. The main steps of a PET solvolysis facility according to one or more embodiments of the present technology are generally shown in FIG. 2, the details of which will be described hereafter.

In one embodiment or in combination with any of the mentioned embodiments, the principal solvent used in solvolysis comprises a chemical compound having at least one —OH group. Examples of suitable solvents can include, but are not limited to, water (in which case the solvolysis may be referred to as "hydrolysis"), alcohols (in which case the solvolysis may be referred to as "alcoholysis") such as methanol (in which case the solvolysis may be referred to as "methanolysis") or ethanol (in which case the solvolysis may be referred to as "ethanolysis"), a glycol such as ethylene glycol or diethylene glycol (in which case the solvolysis may be referred to as "glycolysis"), or ammonia (in which case the solvolysis may be referred to as "ammonolysis").

In one embodiment or in combination with any of the mentioned embodiments, the solvent can include at least 50, at least 55, at least 60, at least 65, at least 70, at least 75, at least 80, at least 85, at least 90, at least 95, or at least 99 weight percent of the principal solvent, based on the total weight of the solvent stream. In one embodiment or in combination with any of the mentioned embodiments, the solvent may comprise not more than 45, not more than 40, not more than 35, not more than 30, not more than 25, not more than 20, not more than 15, not more than 10, not more than 5, not more than 2, or not more than 1 weight percent of other solvents or components.

When a solvolysis facility 30 utilizes methanol as the principal solvent, the facility may be referred to as a methanolysis facility. In one embodiment or in combination with any of the mentioned embodiments, the chemical recycling facility 10 of FIG. 1 may include a methanolysis facility.

Figure 3:
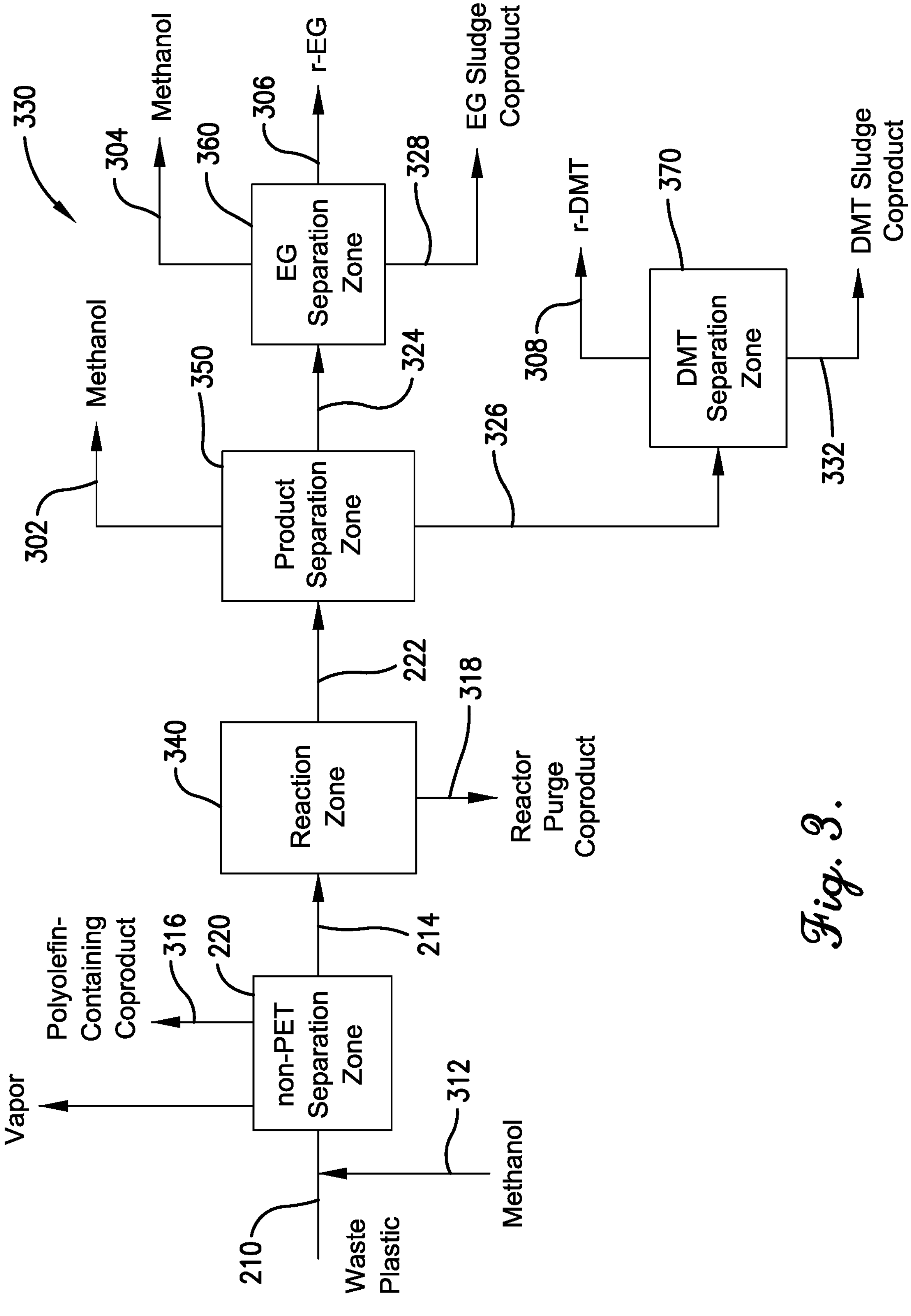
FIG. 3 is a schematic block flow diagram illustrating the main steps of a methanolysis facility according to embodiments of the present technology.

Turning now to FIGS. 2 and 3, block flow diagrams providing schematic representations of the main steps of a PET solvolysis facility 230 (FIG. 2) and a PET methanolysis facility 330 (FIG. 3) are presented. During solvolysis, PET can be chemically decomposed to form the principal glycol and the principal terephthalyl. When the feedstock to the solvolysis facility 230 includes mixed plastic waste, the principal glycol and the principal terephthalyl include recycle content and comprise recycle content glycol (r-glycol) 206 and recycle content terephthalyl (r-terephthalyl) 208, as shown in FIG. 2. Additionally, several solvolysis co-product streams are also produced, which will be discussed in detail below.

Similarly, during methanolysis, PET can be chemically decomposed to form ethylene glycol (EG) as the principal glycol and dimethyl terephthalate (DMT) as the principal terephthalyl. When the PET comprises waste plastic, both the EG and DMT may comprise recycle content to that the principal glycol stream comprises an r-EG stream 306 and the principal terephthalyl stream comprises an r-DMT stream 308, as shown in FIG. 3. Additionally, several co-product streams are also produced, which will be discussed in detail below Referring back to FIG. 2, In one embodiment or in combination with any of the mentioned embodiments, the r-glycol stream 206 withdrawn from the solvolysis facility 230 may comprise at least 45, at least 50, at least 55, at least 60, at least 65, at least 70, at least 75, at least 80, at least 85, at least 90, or at least 95 weight percent of the principal glycol formed in the solvolysis facility 30. It may also include not more than 99, not more than 95, not more than 90, not more than 85, not more than 80, or not more than 75 weight percent of the principal glycol, or it may include principal glycol in an amount in the range of from 45 to 99 weight percent, 50 to 95 weight percent, or 55 to 90 weight percent, based on the total weight of the stream.

In one embodiment or in combination with any of the mentioned embodiments, the r-glycol stream 206 may include at least 0.5, at least 1, at least 2, at least 5, at least 7, at least 10, at least 12, at least 15, at least 20, or at least 25 weight percent and/or not more than 45, not more than 40, not more than 35, not more than 30, not more than 25, not more than 20, or not more than 15 weight percent of components other than the principal glycol, based on the total weight of the stream, or it can include components other than the principal glycol in an amount of 0.5 to 45 weight percent, 1 to 40 weight percent, or 2 to 20 weight percent, based on the total weight of the stream. In one embodiment or in combination with any of the mentioned embodiments, components other than the principal glycol may include other modifying glycols used in formation of the PET. Examples of such glycols can include, but are not limited to, cyclohexanedimethanol, 2,2,4,4-tetramethyl-1,3-cyclobutanediol, neopentyl glycol, and combinations thereof.

In one embodiment or in combination with any of the mentioned embodiments, the recycle content principal terephthalyl (r-terephthalyl) stream 208 withdrawn from the solvolysis facility 230 may comprise at least 45, at least 50, at least 55, at least 60, at least 65, at least 70, at least 75, at least 80, at least 85, at least 90, or at least 95 weight percent of the principal terephthalyl formed in the solvolysis facility 30. It may also include not more than 99, 95, 90, 85, 80, or 75 weight percent of the principal terephthalyl, or it may include principal terephthalyl in an amount in the range of from 45 to 99 weight percent, 50 to 95 weight percent, or 55 to 90 weight percent, based on the total weight of the stream.

The r-terephthalyl stream 208 may include at least 0.5, at least 1, at least 2, at least 5, at least 7, at least 10, at least 12, at least 15, at least 20, or at least 25 weight percent and/or not more than 45, not more than 40, not more than 35, not more than 30, not more than 25, not more than 20, or not more than 15 weight percent of components other than the principal terephthalyl, based on the total weight of the stream, or it can include components other than the principal terephthalyl in an amount of 0.5 to 45 weight percent, 1 to 40 weight percent, or 2 to 20 weight percent, based on the total weight of the stream.

As shown in FIG. 2, In one embodiment or in combination with any of the mentioned embodiments, one or more stream of solvent 202, 204 may be withdrawn from solvolysis facility 230. The solvent may comprise at least 45, at least 50, at least 55, at least 60, at least 65, at least 70, at least 75, at least 80, at least 85, at least 90, or at least 95 weight percent of the principal solvent used in the solvolysis facility 30. It may also include not more than 99, not more than 95, not more than 90, not more than 85, not more than 80, or not more than 75 weight percent of the principal solvent, based on the weight of one of the solvent streams, or it can include solvent in an amount in the range of from 45 to 99 weight percent, 50 to 95 weight percent, or 55 to 90 weight percent, based on the total weight of the stream.

One of the solvent streams 202, 204 withdrawn from the solvolysis facility 230 may also include at least 0.5, at least 1, at least 2, at least 5, at least 7, at least 10, at least 12, at least 15, at least 20, or at least 25 weight percent and/or not more than 45, not more than 40, not more than 35, not more than 30, not more than 25, not more than 20, not more than 15, not more than 10, not more than 5, not more than 2, or not more than 1 weight percent of components other than the principal solvent, based on the total weight of the stream, or it can include components other than the principal solvent in an amount of 0.5 to 45 weight percent, 1 to 40 weight percent, or 2 to 20 weight percent, based on the total weight of the stream.

In one embodiment or in combination with any of the mentioned embodiments, at least one of the solvent streams 202, 204 (or 302, 304) may include the primary glycol (or ethylene glycol) in an amount of at least 1, at least 2, at least 5, at least 10, at least 15, at least 20, at least 25, at least 30, or at least 40 and/or not more than 75, not more than 70, not more than 65, not more than 60, not more than 55, not more than 50, not more than 45, not more than 40, not more than 35, not more than 30, not more than 25, not more than 20, not more than 15, not more than 10, or not more than 5 weight percent, based on the total weight of the stream, or the primary glycol (or EG) can be present in an amount in the range of from 1 to 75 weight percent, 5 to 65 weight percent, or 15 to 50 weight percent, based on the total weight of the stream.

When the solvolysis facility is a methanolysis facility 330 as shown in FIG. 3, the recycle content glycol stream 306 withdrawn from the solvolysis facility 30 comprises recycle content ethylene glycol (r-EG) and may comprise at least 45, at least 50, at least 55, at least 60, at least 65, at least 70, at least 75, at least 80, at least 85, at least 90, or at least 95 weight percent of EG. It may also include not more than 99, not more than 95, not more than 90, not more than 85, not more than 80, or not more than 75 weight percent of EG, or EG in an amount in the range of from 45 to 99 weight percent, 50 to 95 weight percent, or 55 to 90 weight percent, based on the total weight of the stream.

In one embodiment or in combination with any of the mentioned embodiments, the r-EG stream may include at least 0.5, at least 1, at least 2, at least 5, at least 7, at least 10, at least 12, at least 15, at least 20, or at least 25 weight percent and/or not more than 45, not more than 40, not more than 35, not more than 30, not more than 25, not more than 20, or not more than 15 weight percent of components other than EG, based on the total weight of the stream, or it may include these components in amounts in the range of from 0.5 to 45 weight percent, 1 to 25 weight percent, or 2 to 15 weight percent, based on the total weight of the stream. Components other than EG may include other modifying glycols used in formation of the PET. Examples of such glycols can include one or more of those described previously.

Additionally, when the solvolysis facility is a methanolysis facility, the r-terephthalyl may comprise DMT and the recycle content DMT (r-DMT) stream 308 withdrawn from the methanolysis facility 330 may comprise at least 45, at least 50, at least 55, at least 60, at least 65, at least 70, at least 75, at least 80, at least 85, at least 90, or at least 95 weight percent of dimethyl terephthalate (DMT), based on the total weight of the stream. It may also include not more than 99, not more than 95, not more than 90, not more than 85, not more than 80, or not more than 75 weight percent of DMT, or DMT in an amount in the range of from 45 to 99 weight percent, 50 to 95 weight percent, or 55 to 90 weight percent, based on the total weight of the stream.

In one embodiment or in combination with any of the mentioned embodiments, the r-DMT stream may include at least 0.5, at least 1, at least 2, at least 5, at least 7, at least 10, at least 12, at least 15, at least 20, or at least 25 weight percent and/or not more than 45, not more than 40, not more than 35, not more than 30, not more than 25, not more than 20, or not more than 15 weight percent of components other than DMT, based on the total weight of the stream, or it may include these components in amounts in the range of from 0.5 to 45 weight percent, 1 to 25 weight percent, or 2 to 15 weight percent, based on the total weight of the stream.

As shown in the diagram of the methanolysis facility 330 in FIG. 3, one or more streams of methanol 306, 308 may be formed within or withdrawn from methanolysis facility 330. The solvent may comprise at least 45, at least 50, at least 55, at least 60, at least 65, at least 70, at least 75, at least 80, at least 85, at least 90, or at least 95 weight percent methanol. It may also include not more than 99, not more than 95, not more than 90, not more than 85, not more than 80, or not more than 75 weight percent methanol, or it can include methanol in an amount in the range of from 45 to 99 weight percent, 50 to 95 weight percent, or 55 to 95 weight percent, based on the total weight of the stream.

Methanol streams 306, 308 may also include at least 0.5, at least 1, at least 2, at least 5, at least 7, at least 10, at least 12, at least 15, at least 20, or at least 25 weight percent and/or not more than 45, not more than 40, not more than 35, not more than 30, not more than 25, not more than 20, not more than 15, not more than 10, not more than 5, not more than 2, or not more than 1 weight percent of components other than methanol, or these components can be present in an amount in the range of from 0.5 to 45 weight percent, 1 to 25 weight percent, or 2 to 15 weight percent, based on the total weight of the stream. The composition of the solvent streams described herein may refer to a stream of solvent within the process, withdrawn from the process, and/or added to the process within the methanolysis facility 330.

In addition to providing streams comprising recycle content principal glycol, recycle content principal terephthalyl, and a stream of principal solvent, one or more solvolysis (or methanolysis) coproduct streams may also be withdrawn from one or more locations within the solvolysis facility 230 (or methanolysis facility 330). As used herein, the term "coproduct" or "solvolysis coproduct" refers to any compound withdrawn from a solvolysis facility that is not the principal carboxyl (or principal terephthalyl) product of the solvolysis facility, the principal glycol product of the solvolysis facility, or the principal solvent fed to the solvolysis facility. When the solvolysis facility is a methanolysis facility, the coproducts may be referred to as methanolysis coproducts. As used herein, the term "methanolysis coproduct" refers to any compound withdrawn from a methanolysis facility that is not DMT, EG, or methanol.

In one embodiment or in combination with any of the mentioned embodiments, one or more coproduct streams withdrawn from the solvolysis (or methanolysis) facility can comprise heavy organic coproducts and/or light organic coproducts. As used herein, the term "heavy organic solvolysis coproduct" refers to a solvolysis coproduct with a boiling point greater than the boiling point of the principal terephthalyl product of the solvolysis facility, while the term "light organic solvolysis coproduct" refers to a solvolysis coproduct with a boiling point less than the boiling point of the principal terephthalyl product of the solvolysis facility. As used herein, the term "heavy organic methanolysis coproduct" refers to a methanolysis coproduct with a boiling point greater than DMT, while the term "light methanolysis coproduct" refers to a methanolysis coproduct with a boiling point less than DMT. Examples of specific coproducts from both methanolysis and solvolysis facilities are described in further detail below.

As shown in FIGS. 2 and 3, several coproduct streams may be withdrawn from a solvolysis facility 230 and a methanolysis facility 330. In one embodiment or in combination with any of the mentioned embodiments, at least one coproduct stream may comprise at least 35, at least 40, at least 45, at least 50, at least 55, at least 60, at least 65, at least 70, at least 75, at least 80, at least 85, at least 90, or at least 95 weight percent of organic compounds having a boiling point higher than the boiling point of the principal glycol (or EG) produced from the solvolysis (or methanolysis) facility, based on the total weight of organics in the stream. Additionally, or in the alternative, the coproduct can comprise not more than 25, not more than 20, not more than 15, not more than 10, not more than 5, not more than 2, not more than 1 weight percent of components with a boiling point lower than the boiling point of the principal glycol (or EG), based on the total weight of organics in the stream.

In one embodiment or in combination with any of the mentioned embodiments, at least one coproduct stream withdrawn from the solvolysis (or methanolysis) facility may comprise at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of the organic compounds have a boiling point higher than the boiling point of the principal glycol (or EG) and lower than the boiling point of the principal terephthalyl (or DMT) produced from the solvolysis (or methanolysis) facility, based on the total weight of organics in the stream. Additionally, or in the alternative, the coproduct can comprise not more than 25, not more than 20, not more than 15, not more than 10, not more than 5, not more than 2, not more than 1 weight percent of components with boiling point lower than the boiling point of the principal glycol (or EG) and higher than the boiling point of the principal terephthalyl (or DMT), based on the total weight of organics in the stream.

In one embodiment or in combination with any of the mentioned embodiments, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of the organic compounds in one or more of the coproduct streams from the solvolysis (or methanolysis) facility can have a boiling point higher than the boiling point of the principal terephthalyl (or DMT) produced from the solvolysis (or methanolysis) facility, based on the total weight of organics in the stream. Additionally, or in the alternative, the coproduct can comprise not more than 25, not more than 20, not more than 15, not more than 10, not more than 5, not more than 2, not more than 1 weight percent of components with a boiling point lower than the boiling point of the principal terephthalyl (or DMT), based on the total weight of organics in the stream.

In one embodiment or in combination with any of the mentioned embodiments, at least 5, at least 10, at least 15, at least 20, at least 25 and/or not more than 50, not more than 45, not more than 40, not more than 35, not more than 30 weight percent of the organic compounds in one or more of the coproduct streams from the solvolysis (or methanolysis) facility have a boiling point lower than the boiling point of the principal glycol (or EG) produced from the solvolysis (or methanolysis) facility, based on the total weight of organics in the stream. Additionally, or in the alternative, the coproduct can comprise not more than 25, not more than 20, not more than 15, not more than 10, not more than 5, not more than 2, not more than 1 weight percent of components with a boiling point higher than the boiling point of the principal glycol (or EG), based on the total weight of organics in the stream.

Referring again to FIGS. 2 and 3, the operation of solvolysis facility 230 and methanolysis facility 330 will be described in detail. For simplicity, the following description is generally applicable to both a solvolysis and methanolysis facilities, unless otherwise noted. As shown in FIGS. 2 and 3, a stream of mixed plastic waste 210 and solvent 212 (or methanol 312) can be introduced (separately or together) into the solvolysis facility 230 (or methanolysis facility 330). The stream may first be passed through an optional non-PET separation zone 220, wherein at least 50 percent of the total amount of components other than PET are separated out of the stream. In one embodiment or in combination with any of the mentioned embodiments, the non-PET components may have a boiling point (or density) lower than PET and may be removed from the zone as a vapor. In one embodiment or in combination with any of the mentioned embodiments, these non-PET components may enter the facility 230 or 330 as a liquid. Alternatively, or in addition, at least a portion of the non-PET components may have a slightly higher or lower density than PET and may be separated out as a liquid. Finally, In one embodiment or in combination with any of the mentioned embodiments, the non-PET components may be separated out as solids from a PET-containing liquid phase.

One example of non-PET components separated out in the non-PET separation zone 220 is polyolefins. In one embodiment or in combination with any of the mentioned embodiments, at least 50, at least 55, at least 60, at least 65, at least 70, at least 75, at least 80, at least 85, at least 90, or at least 95 percent of the non-PET components separated from the PET-containing stream comprise polyolefins such as polyethylene and/or polypropylene. As indicated generally by the dashed lines in FIG. 2, all or a part of the non-PET separation zone 220 in the solvolysis facility 230 may be upstream of the solvolysis reaction zone 240, while all or a part of the non-PET separation zone 220 may be downstream of the reaction zone 240. As shown in FIG. 3, the non-PET separation zone 220 in the methanolysis facility 330 can be located upstream of the methanolysis reaction zone 340.

Separation techniques used in the non-PET separation zone 220 can include, but are not limited to, extraction, filtration, decanting, cyclone or centrifugal separation, manual removal, magnetic removal, chemical degradation, vaporization and degassing, distillation, and combinations thereof. One or more of these techniques may be used in the non-PET separation zone 220 to separate the non-PET components from the PET-containing stream prior to and/or after the solvolysis reaction zone 240, or prior to the methanolysis reaction zone 340.

The now PET-enriched stream 214 exiting the non-PET separation zone 220 may comprise not more than 25, not more than 20, not more than 15, not more than 10, not more than 5, not more than 2, not more than 1, or not more than 0.5 weight percent of components other than the PET (or its oligomeric and monomeric degradation products) and solvent, based on the total weight of the PET-containing stream 214. The PET-containing stream 214 exiting the non-PET separation zone 220 upstream of the solvolysis reaction zone 240 or the methanolysis reaction zone 340 may comprise not more than 25, not more than 20, not more than 15, not more than 10, not more than 5, not more than 2, or not more than 1 weight percent of other types of plastics (such as polyolefins). In one embodiment or in combination with any of the mentioned embodiments, the PET-containing stream 214 exiting the non-PET separation zone 220 may include not more than 45, not more than 40, not more than 35, not more than 30, not more than 25, not more than 20, not more than 10, not more than 5, or not more than 2 weight percent of the total amount of non-PET components introduced into the non-PET separation zone 220 via the mixed plastic waste stream 210.

As shown in FIGS. 2 and 3, the non-PET components may be purged from the solvolysis facility 230 (or methanolysis facility 330) via polyolefin-containing coproduct streams 216*a,b* (or 316). The resulting polyolefin-containing coproduct stream 216*a,b* (or 316) may comprise at least 35, at least 40, at least 45, at least 50, at least 55, at least 60, at least 65, at least 70, at least 75, at least 80, at least 85, at least 90, at least 92, at least 95, at least 97, at least 99, or at least 99.5 weight percent of polyolefin, based on the total weight of the polyolefin-containing coproduct stream.

The polyolefin present in the polyolefin-containing coproduct stream 216*a,b* (or 316) may comprise predominantly polyethylene, predominantly polypropylene, or a combination of polyethylene and polypropylene. As used herein, the term "predominantly" means at least 50 percent by weight of a given component, based on the total weight of the stream or composition. In one embodiment or in combination with any of the mentioned embodiments, the polyolefin in the polyolefin-containing coproduct stream comprises at least 55, at least 60, at least 65, at least 70, at least 75, at least 80, at least 85, at least 90, at least 92, at least 94, at least 95, at least 97, at least 98, or at least 99 weight percent of polyethylene, based on the total weight of the polyolefin in the polyolefin-containing coproduct stream.

Alternatively, the polyolefin in the polyolefin-containing coproduct stream 216*a,b* (or 316) comprises at least 55, at least 60, at least 65, at least 70, at least 75, at least 80, at least 85, at least 90, at least 92, at least 94, at least 95, at least 97, at least 98, or at least 99 weight percent of polypropylene, based on the total weight of the polyolefin in the polyolefin-containing coproduct stream.

In one embodiment or in combination with any of the mentioned embodiments, the polyolefin-containing coproduct stream 216*a,b* comprises not more than 10, not more than 5, not more than 2, not more than 1, not more than 0.75, not more than 0.50, not more than 0.25, not more than 0.10, or not more than 0.05 weight percent of PET, based on the total weight of the polyolefin-containing coproduct stream 216*a,b*. Additionally, In one embodiment or in combination with any of the mentioned embodiments, the polyolefin-containing coproduct stream 216*a,b* comprises at least 0.01, at least 0.05, at least 0.10, at least 0.50, at least 1, or at least 1.5 and/or not more than 40, not more than 35, not more than 30, not more than 25, not more than 20, not more than 15, not more than 10, not more than 5, or not more than 2 weight percent of components other than polyolefin, based on the total weight of the polyolefin-containing coproduct stream, or it may contain components other than polyolefin in an amount in the range of 0.01 to 40 weight percent, 0.10 to 15 weight percent, or 0.5 to 5 weight percent, based on the total weight of the stream.

Overall, the polyolefin-containing coproduct stream 216*a,b* (or 316) comprises at least 40, at least 45, at least 50, at least 55, at least 60, at least 65, at least 70, at least 75, at least 80, at least 85, at least 90, at least 95, or at least 99 weight percent of organic compounds, based on the total weight based on the total weight of the polyolefin-containing coproduct stream 216*a,b*. The polyolefin-containing coproduct stream 216*a,b* (or 316) can include at least 0.5, at least 1, at least 2, at least 3, at least 5, at least 10, or at least 15 and/or not more than 40, not more than 35, not more than 30, not more than 25, not more than 20, not more than 15, not more than 10, not more than 5, not more than 2, or not more than 1 weight percent of non-organic components, based on the total weight of the polyolefin-containing coproduct stream, or it may contain non-organic components in an amount in the range of 0.5 to 40 weight percent, 1 to 15 weight percent, or 2 to 5 weight percent, based on the total weight of the stream.

In one embodiment or in combination with any of the mentioned embodiments, the polyolefin-containing coproduct stream 216*a,b* (or 316) can comprise at least 0.1, at least 0.5, at least 1, at least 1.5, at least 2, at least 2.5, at least 3, at least 3.5, at least 4, at least 4.5, at least 5, at least 8, at least 10, at least 12, at least 15, at least 18, at least 20, at least 22, or at least 25 weight percent and/or not more than 50, not more than 45, not more than 40, not more than 35, not more than 30, not more than 25, not more than 20, not more than 15, not more than 10, not more than 5, or not more than 2 weight percent of one or more non-reactive solids, based on the total weight of the polyolefin-containing coproduct stream, or it may contain non-reactive solids in an amount in the range of from 0.1 to 50 weight percent, 2 to 25 weight percent, or 3 to 15 weigh percent, based on the total weight of the stream.

Non-reactive solids refer to solid components that do not chemically react with PET. Examples of non-reactive solids include, but are not limited to, sand, dirt, glass, plastic fillers, and combinations thereof. In one embodiment or in combination with any of the mentioned embodiments, one or more of the coproduct streams, including the polyolefin-containing coproduct stream 216*a,b* (or 316) can include non-reactive solids in an amount of 100 ppm by weight to 50 weight percent, 500 ppm by weight to 10 weight percent, or 1000 ppm by weight to 5 weight percent, based on the total weight of the stream.

In one embodiment or in combination with any of the mentioned embodiments, the polyolefin-containing coproduct stream comprises at least 100, at least 250, at least 500, at least 750, at least 1000, at least 1500, at least 2000, at least 2500, at least 5000, at least 7500 ppm by weight or at least 1, at least 1.5, at least 2, at least 5, at least 10, at least 15, at least 20, or at least 25 weight percent and/or not more than 50, not more than 45, not more than 40, not more than 35, not more than 30, not more than 25, not more than 20, not more than 15, not more than 10, not more than 5, not more than 2, not more than 1 weight percent of one or more fillers, based on the total weight of the polyolefin-coproduct stream, or the stream can include fillers in an amount in the range of from 100 ppm to 50 weight percent, 500 ppm to 20 weight percent, or 2500 ppm to 2 weight percent, based on the total weight of the stream.

Examples of fillers can include, but are not limited to, thixotropic agents such as fumes silica and clay (kaolin), pigments, colorants, fire retardants such as alumina trihydrate, bromine, chlorine, borate, and phosphorous, suppressants such as wax based materials, UV inhibitors or stabilizers, conductive additives such as metal particles, carbon particles, or conductive fibers, release agents such as zinc stearate, waxes, and silicones, calcium carbonate, and calcium sulfate.

The polyolefin-containing coproduct stream can be predominantly liquid but may further include at least some vapor and/or solids. In one embodiment or in combination with any of the mentioned embodiments, the polyolefin-containing coproduct stream 216*a,b* (or 316) can have a viscosity of at least 1, at least 10, at least 25, at least 50, at least 75, at least 90, at least 100, at least 125, at least 150, at least 200, at least 250, at least 300, at least 350, at least 400, at least 450, at least 500, at least 550, at least 600, at least 650, at least 700, at least 750, at least 800, at least 850, at least 900, or at least 950 poise and/or not more than 25,000, not more than 24,000, not more than 23,000, not more than 22,000, not more than 21,000, not more than 20,000, not more than 19,000, not more than 18,000, not more than 17,000, not more than 16,000, not more than 15,000, not more than 14,000, not more than 13,000, not more than 12,000, not more than 11,000, not more than 10,000, not more than 9000, not more than 8000, not more than 7000, not more than 6000, not more than 5000, not more than 4500, not more than 4000, not more than 3500, not more than 3000, not more than 2500, not more than 2000, not more than 1750, not more than 1500, not more than 1250, not more than 1200, not more than 1150, not more than 1100, not more than 1050, not more than 1000, not more than 950, not more than 900, not more than 800, not more than 750 poise, measured using a Brookfield R/S rheometer with V80-40 vane spindle operating at a shear rate of 10 rad/s and a temperature of 250° C.

The viscosity of the polyolefin-containing coproduct stream 216*a,b* (or 316) can have a viscosity of at least 500, at least 750, at least 900, or at least 950 poise and/or not more than 25,000, not more than 20,000, not more than 17,000, not more than 15,000, not more than 12,000, not more than 11,000, not more than 10,000, not more than 5000, not more than 2500, not more than 1250, not more than 1000 poise, measured using a Brookfield R/S rheometer with V80-40 vane spindle operating at a shear rate of 10 rad/s and a temperature of 250° C., or the viscosity of the polyolefin-containing coproduct stream 216*a,b* (or 316) can be in the range of from 500 to 25,000 poise, 1000 to 15,000 poise, or 5000 to 12,500 poise.

The polyolefin-containing coproduct stream 216*a,b* (or 316) may be a non-Newtonian fluid, and/or it may be a shear-thinning fluid. As used herein, the term "non-Newtonian" describes a fluid whose viscosity is dependent on shear rate, time, or deformation history. As used herein, the term "shear thinning" refers to a non-Newtonian fluid whose viscosity decreases with shear rate. For example, a shear thinning fluid would have a lower viscosity at 1000 rad/s than at 1 rad/s for temperatures of at least 260, at least 270, or at least 280° C.

In one embodiment or in combination with any of the mentioned embodiments, at least a portion, or all, of the polyolefin-containing coproduct stream 216*a,b* (or 316) can be pelletized or micro-pelletized prior to being routed to one or more downstream facilities, as discussed in detail below.

When pelletized, the feed stream is introduced into a melt extruder, wherein it is heated and melted to form a molten polymer at a temperature of at least 240, at least 245, at least 250, at least 255, at least 260° C. and/or not more than 310, not more than 305, not more than 300, not more than 290, not more than 280, not more than 275, not more than 270, not more than 265, or not more than 260° C., or at a temperature in the range of from 240 to 280° C., 245 to 275° C., or 255 to 265° C. The molten polymer is then passed through a die plate with a plurality of holes and the resulting polymer strands are cut, optionally under water, to form pellets. The resulting pellets can have an average particle size, measured along the longest dimension, of at least 0.5, at least 0.75, at least 0.90, at least 1, at least 1.1, at least 1.25 mm and/or not more than 2.25, not more than 2.1, not more than 2, not more than 1.75, or not more than 1.6 mm, or in the range of from 0.5 to 2.25 mm, 0.9 to 2.1 mm, or 1 to 2 mm.

In one embodiment or in combination with any of the mentioned embodiments, the polyolefin-containing coproduct stream 216*a,b* (or 316) can have a density of at least 0.75, at least 0.80, at least 0.85, at least 0.90, at least 0.95, at least 0.99 and/or not more than 1.5, not more than 1.4, not more than 1.3, not more than 1.2, not more than 1.1, not more than 1.05, or not more than 1.01 g/$cm^3$, measured at a temperature of 25° C. The density can be from 0.80 to 1.4, from 0.90 to 1.2, or 0.95 to 1.1 g/$cm^3$.

When removed from the non-PET separation zone 220, the polyolefin-containing coproduct stream 216*a,b* (or 316) may have a temperature of at least 200, at least 205, at least 210, at least 215, at least 220, at least 225, at least 230, or at least 235° C. and/or not more than 350, not more than 340, not more than 335, not more than 330, not more than 325, not more than 320, not more than 315, not more than 310, not more than 305, or not more than 300° C., or it can be in the range of 200 to 350° C., 215 to 330° C., 220 to 340° C., or 235 to 300° C.

In one embodiment or in combination with any of the mentioned embodiments, the polyolefin-containing coproduct stream 216*a,b* (or 316) can comprise at least 50, at least 55, at least 60, at least 65, at least 70, at least 75, at least 80, at least 85, at least 90, or at least 95 weight percent of components that boil higher than the principal terephthalyl or, when the facility is a methanolysis facility 330, than DMT.

In one embodiment or in combination with any of the mentioned embodiments, the polyolefin-containing coproduct stream 216*a,b* from the solvolysis facility 230 (or stream 316 from methanolysis facility 330) can comprise at least 90, at least 92, at least 95, at least 97, at least 99, or at least 99.5 weight percent of polyolefins and/or not more than 1, not more than 0.75, not more than 0.50, not more than 0.25, or not more than 0.10 weight percent of PET, based on the total weight of the polyolefin-containing coproduct stream. The stream may also have a viscosity of at least 100, at least 150, at least 200, at least 250, at least 300, at least 350, at least 400, at least 450, or at least 500 poise measured using a Brookfield R/S rheometer with V80-40 vane spindle operating at a shear rate of 10 rad/s and a temperature of 250° C.

In one embodiment or in combination with any of the mentioned embodiments, all or a portion of the polyolefin-containing coproduct stream from the solvolysis facility 230 (or methanolysis facility 330) can be introduced into one or more of the other facilities within the chemical recycling facility. Referring again to FIG. 1, this is generically represented by coproduct stream 110. Coproduct stream 110 shown in FIG. 1 can include one or more of any of the coproduct streams discussed herein, separately, or in combination with one or more of the other coproduct streams.

As shown in FIG. 1, all or a portion of the coproduct stream 110 from the solvolysis facility 30 can be passed to one or more of the other processing facilities of chemical recycling facility 10. Such facilities can include for example (i) a solidification facility 40; (ii) a partial oxidation (POX) gasification facility 50; (iii) a pyrolysis facility 60; (iv) a cracker facility 70; and (v) an energy generation/production facility 80. In one embodiment or in combination with any of the mentioned embodiments, at least 10, at least 20, at least 30, at least 40, at least 50, at least 60, at least 70, at least 80, at least 90, at least 95, or at least 99 weight percent of the polyolefin-containing coproduct stream can be introduced as or with a feed stream to at least one, at least two, at least three, or all of the facilities (i) through (v).

In one embodiment or in combination with any of the mentioned embodiments, at least one other coproduct stream from the solvolysis facility 30 may also be introduced into one of (i) a solidification facility 40; (ii) a partial oxidation (POX) gasification facility 50; (iii) a pyrolysis facility 60; (iv) a cracker facility 70; and (v) an energy generation/production facility 80, simultaneously with the polyolefin-containing coproduct stream. As used herein, the term "downstream facility" generically refers to one or more of the above facilities.

When introduced simultaneously, the polyolefin-containing coproduct stream may be introduced separately from the other coproduct stream, or the two may be combined prior and the combined stream may be introduced into the downstream facility. In one embodiment or in combination with any of the mentioned embodiments, the polyolefin-containing coproduct stream can be introduced into the same downstream facility as the other coproduct stream, while, in one or more other embodiments, the polyolefin-containing coproduct stream can be introduced into a different downstream facility as the other coproduct stream. When three or more coproduct streams from the solvolysis facility 30 are introduced into downstream processing facilities (such as, for example, a pyrolysis facility 60, a cracker facility 70, a solidification facility 40, an energy generation/production facility 80, and/or a POX gasification facility 50), at least one of the other coproduct streams may be introduced into the same facility as the polyolefin-containing coproduct stream and/or at least one of the other coproduct streams may be introduced into a different downstream facility as the polyolefin-containing coproduct stream.

Turning again to FIGS. 2 and 3, the PET-containing stream (which comprises dissolved PET as well as its degradation products and solvent) exiting the non-PET separation zone 220 in stream 214 may then be transferred to a solvolysis reaction zone 240 (or methanolysis reaction zone 340), wherein at least 50 percent of the decomposition of the PET introduced therein can occur. In one embodiment or in combination with any of the mentioned embodiments, the reaction medium within the reaction zone 240 (or 340) may be agitated or stirred and one or more temperature control devices (such as heat exchangers) may be employed to maintain a target reaction temperature.

In one embodiment or in combination with any of the mentioned embodiments, the average reaction temperature of the solvolysis reactor can be at least 50, at least 55, at least 60, at least 65, at least 70, at least 75, at least 80, or at least 85° C. and/or not more than 350, not more than 345, not more than 340, not more than 335, not more than 330, not more than 325, not more than 320, not more than 315, not more than 310, not more than 300, or not more than 295° C., or it can be in the range of from 50 to 350° C., 60 to 325° C., or 85 to 295° C.

The pressure in the solvolysis reactor can be within 5, within at least 10, within at least 15, within at least 20, within at least 25, within at least 30, within at least 35, within at least 40, within at least 45, or within at least 50 pounds per square inch gauge (psig) of atmospheric, or it may be within at least 55, within at least 75, within at least 90, within at least 100, within at least 125, or within at least 150 psig of atmospheric. The pressure in the solvolysis reactor can be at least 0.35, at least 0.70, at least 1, within at least 1.4, at least 1.75, at least 2, at least 2.5, at least 2.75, at least 3, at least 3.5, at least 3.75, at least 5, or at least 6.25 bar gauge (barg) and/or not more than 10.35, not more than 8.6, or not more than 6.9 barg of atmospheric.

In one embodiment or in combination with any of the mentioned embodiments, the average residence time of the reaction medium in the reaction zone 240 (or 340) can be at least 1, at least 2, at least 5, at least 10, or at least 15 minutes and/or not more than 12, not more than 11, not more than 10, not more than 9, not more than 8, not more than 7, not more than 6, not more than 5, not more than 4, not more than 3, not more than 2, or not more than 1 hour, or it can be in the range of from 1 minute to 12 hours, 5 minutes to 7 hours, or 15 minutes to 1 hour.

In one embodiment or in combination with any of the mentioned embodiments, at least 50, at least 55, at least 60, at least 65, at least 70, at least 75, at least 80, at least 85, at least 90, at least 95, or at least 99 percent of the total weight of PET introduced into the solvolysis facility 230 (or methanolysis facility 330) is decomposed upon leaving the reaction zone 240 (or 340) in the reactor effluent stream.

In one embodiment or in combination with any of the mentioned embodiments, a reactor effluent purge stream may be removed from the reaction zone 240 (or 340) and at least a portion may be passed to one or more downstream facilities within the chemical recycling facility 10 shown in FIG. 1 as a reactor purge coproduct stream, shown as line 218 in the solvolysis facility of FIG. 2 and line 318 in the methanolysis facility of FIG. 3. The reactor purge coproduct stream 218 (or 318) may have a mid-range boiling point higher than the boiling point of the principal terephthalyl (or DMT in the case of methanolysis) produced from the solvolysis facility 230 (or methanolysis facility 330).

In one embodiment or in combination with any of the mentioned embodiments, the reactor purge coproduct stream 218 (or 318) shown in FIG. 2 (or 3) can comprise at least 50, at least 55, at least 60, at least 65, at least 70, at least 75, at least 80, at least 85, at least 90, or at least 95 weight percent of components with a boiling point higher than the boiling point of the principal terephthalyl (or DMT). Additionally, or in the alternative, the coproduct stream comprises at least 0.10, at least 0.25, at least 0.50, at least 0.75, at least 1, at least 2, at least 5, at least 8, at least 10, at least 12, at least 15, or at least 17 and/or not more than 30, not more than 25, not more than 20, not more than 15, not more than 12, not more than 10, not more than 8, not more than 6, not more than 5, not more than 3, or not more than 2 weight percent of compounds having a boiling point greater than the principal terephthalyl (or than DMT), or these can be present in an amount in the range of from 0.10 to 30 weight percent, 0.50 to 20 weight percent, or 1 to 15 weight percent, based on the total weight of the stream.

In one embodiment or in combination with any of the mentioned embodiments, the reactor purge coproduct stream 218 (or 318) can comprise not more than 25, not more than 20, not more than 15, not more than 10, not more than 5, not more than 2, not more than 1 weight percent of components with a boiling point lower than the boiling point of the principal terephthalyl (or of DMT). Additionally, or in another embodiment, the reactor purge coproduct stream 218 (or 318) can have a melting temperature at least 5, at least 10, at least 15, at least 20, or at least 25 and/or not more than 50, not more than 45, not more than 40, not more than 35, not more than 30, not more than 25, not more than 20, or not more than 15° C. higher than the temperature of the reactor, or it can be in the range of 5 to 50° C. higher, or 10 to 40° C. higher, or 15 to 30° C. higher.

In one embodiment or in combination with any of the mentioned embodiments, the reactor purge coproduct stream 218 comprises at least 25, at least 30, at least 35, at least 40, at least 45, at least 50, at least 55, at least 60, at least 65, at least 70, at least 75, at least 80, at least 85, at least 90, at least 95, or at least 99 weight percent of the principal terephthalyl, based on the total weight of the composition. When the solvolysis facility is a methanolysis facility as shown in FIG. 3, the reactor purge coproduct stream 318 may comprise at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of DMT, based on the total weight of the stream.

In addition, the reactor purge coproduct stream 218 (or 318) may include at least 100 ppm and not more than 25 weight percent of one or more non-terephthalyl solids, based on the total weight of the stream. In one embodiment or in combination with any of the mentioned embodiments, the total amount of non-terephthalyl solids in the reactor purge coproduct stream 218 (or 318) can be at least 150, at least 200, at least 250, at least 300, at least 350, at least 400, at least 500, at least 600, at least 700, at least 800, at least 900, at least 1000, at least 1500, at least 2000, at least 2500, at least 3000, at least 3500, at least 4000, at least 4500, at least 5000, at least 5500, at least 6000, at least 7000, at least 8000, at least 9000, at least 10,000, or at least 12,500 ppm and/or not more than 25, not more than 22, not more than 20, not more than 18, not more than 15, not more than 12, not more than 10, not more than 8, not more than 5, not more than 3, not more than 2, or not more than 1 weight percent, based on the total weight of the stream, or it can be in the range of from 150 ppm to 22 weight percent, 500 ppm to 15 weight percent, or 1500 ppm to 5 weight percent, based on the total weight of the stream.

In one embodiment or in combination with any of the mentioned embodiments, the reactor purge coproduct stream 218 (or 318) has a total solids content of at least 100, at least 250, at least 500, at least 750, at least 1000, at least 1500, at least 2000, at least 2500, at least 3000, at least 3500, at least 4000, at least 4500, at least 5000, at least 5500, at least 6000, at least 6500, at least 7000, at least 7500, at least 8000, at least 8500, at least 9000, at least 9500 ppm by weight or at least 1, at least 2, at least 5, at least 8, at least 10, or at least 12 weight percent and/or not more than 25, not more than 22, not more than 20, not more than 17, not more than 15, not more than 12, not more than 10, not more than 8, not more than 6, not more than 5, not more than 3, not more than 2, or not more than 1 weight percent or not more than 7500, not more than 5000, or not more than 2500 ppm by weight, based on the total weight of the stream, or it can be in the range of 100 ppm to 25 weight percent, 500 ppm to 15 weight percent, or 1000 ppm to 10 weight percent, based on the total weight of the stream. Examples of solids can include, but are not limited to, non-volatile catalyst compounds.

In one embodiment or in combination with any of the mentioned embodiments, the reactor purge coproduct stream 218 (or 318) can include at least 100, at least 250, at least 500, at least 750, at least 1000, at least 1500, at least 2000, at least 2500, at least 3000, at least 3500, at least 4000, at least 4500, at least 5000, at least 7500, at least 10,000, or at least 12,500 ppm and/or not more than 60,000, not more than 50,000, not more than 40,000, not more than 35,000, not more than 30,000, not more than 25,000, not more than 20,000, not more than 15,000, or not more than 10,000 ppm of non-volatile catalyst compounds, or such compounds can be present in an amount in the range of from 100 to 60,000 ppm, 500 to 30,000 ppm, or 1000 to 10,000 ppm, based on the total weight of the stream. Examples of suitable non-volatile catalyst compounds can include, but are not limited to, titanium, zinc, methoxide, alkali metals, alkaline earth metals, tin, residual esterification catalysts, residual polycondensation catalysts, aluminum, and combinations thereof.

In one embodiment or in combination with any of the mentioned embodiments, the reactor purge coproduct stream 218 (or 318) has a viscosity of at least 1, at least 2, at least 5, at least 10, at least 20, at least 30, at least 40, at least 50, at least 60, at least 70, at least 80, at least 90, at least 100, at least 200, at least 300, at least 400, at least 500, at least 600, at least 700, at least 800, at least 900, at least 1000, at least 1500, at least 2000, at least 2500, at least 3000, at least 3500, at least 4000, at least 4500, at least 5000, at least 5500, at least 6000, at least 6500, at least 7000, at least 7500, at least 8000, at least 8500, at least 9000, at least 10,000, at least 11,000, at least 12,000, at least 13,000, at least 14,000, or at least 15,000 poise (P) and/or not more than 25,000, not more than 20,000, not more than 15,000, not more than 12,000, not more than 10,000, not more than 8000, not more than 6000, not more than 5000, not more than 3000, not more than 2000, not more than 1500, not more than 1000, not more than 750, not more than 500, not more than 100, not more than 75, not more than 50, or not more than 25 P, measured using a Brookfield R/S rheometer with V80-40 vane spindle operating at a shear rate of 10 rad/s and a temperature of 250° C.

The reactor purge coproduct stream 218 (or 318) can have a viscosity of at least 100, at least 500, at least 1000, at least 2500, at least 5000, at least 10,000, or at least 15,000 poise (P) and/or not more than 25,000, not more than 20,000, not more than 15,000, not more than 12,000, not more than 10,000, not more than 8000 P, measured using a Brookfield R/S rheometer with V80-40 vane spindle operating at a shear rate of 10 rad/s and a temperature of 250° C., or it can be in the range of from 100 to 25,000 P, 500 to 15,000 P, or 1000 to 10,000 P.

The temperature of the reactor purge coproduct stream 218 (or 318) withdrawn from the reaction zone 240 (or 340) and/or when introduced into one or more of the downstream facilities can be at least 130, at least 135, at least 140, at least 145, at least 150, at least 155, at least 160, at least 165, at least 170, at least 175, at least 180, at least 185, at least 190, at least 195, at least 200, at least 205, at least 210, at least 215, at least 220, at least 225, at least 230, at least 245, at least 250, at least 255, at least 260, at least 265, at least 270, at least 275, at least 280, at least 285, at least 290, at least 295, or at least 300° C.

Additionally, or in the alternative, the temperature of the reactor purge coproduct stream 218 (or 318) withdrawn from the reaction zone 240 (or 340) and/or when introduced into one or more of the downstream facilities can be no more than 350, not more than 345, not more than 340, not more than 335, not more than 330, not more than 325, not more than 320, not more than 315, not more than 310, not more than 305, not more than 300, not more than 295, not more than 290, not more than 285, not more than 280, not more than 275, not more than 270, not more than 265, not more than 260, not more than 255, or not more than 250° C.

The temperature of the reactor purge stream withdrawn from the reaction zone 240 (or 340) can be at least 150, at least 175, at least 200, at least 225, or at least 250° C. and/or not more than 350, not more than 330, not more than 325, not more than 310, or not more than 300° C., or it can be in the range of 150 to 350° C., 200 to 330° C., or 250 to 330° C.

When the reactor is purged, it may be done continuously or intermittently, and the resulting reactor purge coproduct stream may be introduced into one of the downstream facilities in a continuous or intermittent manner. In one embodiment or in combination with any of the mentioned embodiments, the reactor purge stream may be withdrawn from the solvolysis (or methanolysis) reactor in a continuous manner when the feed stream to the solvolysis or methanolysis facility (or reactor) has a high content of inert components, such as those resulting from recycling of mixed waste plastic comprising textiles. In one embodiment or in combination with any of the mentioned embodiments, the reactor purge may be performed continuously when the amount of inert components in the feed stream to the reactor is at least 0.25, at least 0.35, at least 0.40, at least 0.45, at least 0.50, or at least 0.55 weight percent, based on the total weight of the reactor feed stream.

In one embodiment or in combination with any of the mentioned embodiments, the reactor purge stream may be withdrawn from the solvolysis (or methanolysis) reactor in an intermittent manner when the feed stream to the solvolysis or methanolysis facility (or reactor) has a lower content of inert components. In one embodiment or in combination with any of the mentioned embodiments, the reactor purge may be performed intermittently (or batchwise) when the amount of inert components in the feed stream to the reactor is less than 0.40, not more than 0.35, not more than 0.30, not more than 0.25, not more than 0.20, not more than 0.15, or not more than 0.10, based on the total weight of the reactor feed stream.

In one embodiment or in combination with any of the mentioned embodiments, at least a portion of the reactor purge stream may be pelletized, pastillized, or flaked to form solids and at least a portion of the solids may be transferred to one or more downstream facilities as described herein.

Pelletization may be performed with reactor purge stream having a higher degree of cross-linking (e.g., a chain length of at least 6, at least 7, at least 8, or at least 10), while pastillation and flaking may be performed with a reactor purge stream having a lower degree of cross-linking (e.g., a chain length of less than 6, not more than 5, not more than 4, or not more than 3).

When pelletized, a stream of the molten feed can optionally be passed through a filter, and the resulting filtrate may be fed to a pelletizer. In the pelletizer, the molten feed is passed through a die plate with a plurality of holes and the resulting polymer strands are cut, optionally under water, to form pellets. The resulting pellets can have an average particle size, measured along the longest dimension, of at least 0.5, at least 0.75, at least 0.90, at least 1, at least 1.1, at least 1.25 mm and/or not more than 2.25, not more than 2.1, not more than 2, not more than 1.75, or not more than 1.6 mm, or in the range of from 0.5 to 2.25 mm, 0.9 to 2.1 mm, or 1 to 2 mm.

When pastillized, a stream of molten feed can optionally be passed through a filter, and the resulting filtrate may be fed to a pastillator. In the pastillator, the molten feed is introduced into a cylindrical rotoform, which rotates and deposits drops of the molten stream onto a moving belt. The temperature of the feed to the rotoform can be at least 230, at least 235, at least 240, at least 245, at least 250, or at least 255° C. and/or not more than 270, not more than 265, not more than 260, not more than 255, or not more than 250° C., or in the range of from 230 to 270° C., 240 to 265° C., or 250 to 260° C.

Water or other suitable fluid medium having a temperature of at least 27, at least 30, at least 32, at least 35° C. and/or not more than 50, not more than 45, not more than 40, not more than 35, or not more than 32° C., or in the range of from 27 to 50° C., 30 to 45° C., or 30 to 40° C., may be applied to the belt, thereby cooling and solidifying the molten drops. The solid pastilles can then be collected and transported as needed to one or more locations within chemical recycling facility 10 as discussed herein. The resulting pastilles can have an average particle size of at least 0.5, at least 1, at least 1.5, at least 2, at least 2.5, at least 3, at least 3.5, or at least 4 mm and/or not more than 8, not more than 7.5, not more than 7, not more than 6.5, not more than 6 mm, measured along the longest particle dimension, or in the range of from 1 to 8 mm, 1.5 to 7.5 m, 2 to 7 mm, or 4 to 6 mm.

In one embodiment or in combination with any of the mentioned embodiments, a belt flaker or drum flaker may be used to form flakes of the polymer material. When flaked with a belt flaker, a stream of molten feed can be passed through a filter, and the resulting filtrate may be fed onto a cylindrical rotoform in a similar manner as described with respect to pastillation. However, in flaking, the rotoform rotational speed may be slowed or stopped so that a stream of molten feed can be deposited directly onto the belt. The speed of the rotoform and belt and temperature of the rotoform and melt can be controlled to achieve a desired thickness of the material on the belt. In general, the temperature of the feed to the rotoform can be at least 230, at least 235, at least 240, at least 245, at least 250, or at least 255° C. and/or not more than 270, not more than 265, not more than 260, not more than 255, or not more than 250° C., or in the range of from 230 to 270° C., 240 to 265° C., or 250 to 260° C.

Once on the belt in a sheet or layer of molten polymer, water or other suitable fluid medium having a temperature of at least 27, at least 30, at least 32, at least 35° C. and/or not more than 50, not more than 45, not more than 40, not more than 35, or not more than 32° C., or in the range of from 27 to 50° C., 30 to 45° C., or 30 to 40° C., may be applied to the belt, thereby cooling and solidifying the molten material. Solid pieces or flakes are formed and collected and transported as needed to one or more locations within chemical recycling facility 10 as discussed herein. The average thickness of the resulting flakes can be at least 0.5, at least 1, at least 1.5, at least 2, at least 2.5 mm and/or not more than 4, not more than 3.5, not more than 3, not more than 2.5, not more than 2, not more than 1.5, not more than 1, or not more than 0.75 mm, measured along the thickest portion of the flakes, or in the range of from 0.5 to 4 mm, or 1 to 3 mm, or 1 to 2 mm.

When flaked with a drum flaker, the feed stream can be passed through a filter, and the resulting molten filtrate can be deposited onto the surface of a rotating, internally cooled drum. As the material contacts the cooled drum surface, it solidifies and a scraper or stationary knife may be used to remove the material in flakes. The average thickness of the resulting flakes can be at least 0.5, at least 1, at least 1.5, at least 2, at least 2.5 mm and/or not more than 4, not more than 3.5, not more than 3, not more than 2.5, not more than 2, not more than 1.5, not more than 1, or not more than 0.75 mm, measured along the thickest portion of the flakes, or in the range of from 0.5 to 4 mm, or 1 to 3 mm, or 1 to 2 mm.

In one embodiment or in combination with any of the mentioned embodiments, as generally shown with respect to the solvolysis facility 230 in FIG. 2, the effluent stream from the reaction zone in a solvolysis facility 30 may optionally be sent through a non-PET separation zone 220 located downstream of the reactor, as discussed in detail previously. This post-reactor non-PET separation zone 220 may be used in addition, or alternatively, to the non-PET separation zone 220 upstream of the reactor as shown in FIG. 2.

As generally shown in FIGS. 2 and 3, the resulting effluent stream 222 from the reaction zone 240 (or 340 in the methanolysis facility 330) or, when present, the non-PET separation zone 220, may be passed through a product separation zone 250 (or 350), wherein at least 50 weight percent of the principal solvent (or methanol) in the feed stream introduced into the product separation zone 250 (or 350) is separated out. In one embodiment or in combination with any of the mentioned embodiments, at least 55, at least 60, at least 65, at least 70, at least 75, at least 80, at least 85, or at least 90 weight percent of the total amount of principal solvent (or methanol when the solvolysis facility is a methanolysis facility) may be separated from feed stream in the product separation zone 250 (or 350).

As shown in FIGS. 2 and 3, a stream 222 predominantly comprising the principal solvent 222 (or a stream comprising predominantly methanol 322 when a methanolysis facility) may be removed from the product separation zone 250 (or 350). In one embodiment or in combination with any of the mentioned embodiments, this principal solvent stream 222 (or methanol stream 322) may comprise at least 50, at least 55, at least 60, at least 65, at least 70, at least 75, at least 80, at least 85, at least 90, at least 95, or at least 99 weight percent of the principal solvent (or methanol), based on the total weight of the stream.

In one embodiment or in combination with any of the mentioned embodiments, at least a portion, or all, of this principal solvent stream 222 (or methanol stream 322) may be recycled to the inlet of the solvolysis facility 230 (or methanolysis facility 330) and reintroduced with a new stream of PET-containing or PET-enriched waste plastic. Additionally, or in the alternative, at least a portion or all of the solvent stream 222 (or methanol stream 322) may be sent to one or more of the other facilities within or external to the chemical recycling facility 10.

Additionally, as shown in FIGS. 2 and 3, the product separation zone 250 (or 350) may be configured to provide a stream enriched in the principal glycol 224 and a stream enriched in the principal terephthalyl 226, or, when the facility is a methanolysis facility as shown in FIG. 3, a stream enriched in EG 324 and a stream enriched in DMT 326.

In one embodiment or in combination with any of the mentioned embodiments, the principal glycol stream 224 (or the EG stream 324) may comprise at least 35, at least 40, at least 45, at least 50, at least 55, at least 60, at least 65, at least 70, at least 75, at least 80, or at least 85 weight percent of principal glycol (or EG), based on the total weight of the stream. This may correspond to at least 40, at least 45, at least 50, at least 55, at least 60, at least 65, at least 70, at least 75, at least 80, at least 85, at least 90, or at least 95 percent of the total weight of principal glycol (or EG) introduced into the product separation zone 250 (or 350).

Similarly, the principal terephthalyl stream 226 (or the DMT stream 326) can comprise at least 35, at least 40, at least 45, at least 50, at least 55, at least 60, at least 65, at least 70, at least 75, at least 80, or at least 85 weight percent of the principal terephthalyl (or DMT), based on the total weight of the stream. This may correspond to at least 40, at least 45, at least 50, at least 55, at least 60, at least 65, at least 70, at least 75, at least 80, at least 85, at least 90, or at least 95 percent of the total weight of principal terephthalyl (or DMT) introduced into the product separation zone 250 (or 350).

Any suitable separation device or method can be used within the product separation zone 250 (or 350) to provide streams enriched in the principal solvent (or methanol), the principal glycol (or EG), and the principal terephthalyl (or DMT). Examples of suitable separation methods can include, but are not limited to, distillation, extraction, decanting, and combinations thereof. Equipment associated with such methods can include columns, vessels, decanters, membranes, and combinations thereof. In one embodiment or in combination with any of the mentioned embodiments, at least one separation step may be performed to separate the solvent from the principal glycol (or the methanol from the EG in the case of methanolysis) and at least one other separation step may be performed to separate the principal glycol from the principal terephthalyl (or the EG from the DMT).

As shown in FIGS. 2 and 3, the principal glycol stream 224 (324) withdrawn from the product separation zone 250 (350) can be passed to a glycol separation zone 260, wherein at least 50 weight percent of the principal glycol in the stream 224 introduced therein can be separated out. When the solvolysis facility is a methanolysis facility, as shown in FIG. 3, the glycol separation zone is an EG separation zone 360 used to separate at least 50 weight percent of EG from the stream 324 introduced therein. The glycol separation zone 260 (or EG separation zone 360) can include any suitable device or employ any suitable method needed to carry out the separation including, but not limited to, distillation (including azeotropic distillation), extraction, filtration, and combinations thereof.

As shown in FIGS. 2 and 3, the glycol separation zone 260 (or the EG separation zone 360) may be configured to separate at least a portion of the remaining solvent (or methanol) from the glycol stream 224 (or EG stream 324) withdrawn from the product separation zone 250 (or 350). In one embodiment or in combination with any of the mentioned embodiments, this stream of solvent (or methanol) withdrawn from the glycol (or EG) separation zone 204 (or 304) may comprise at least 50, at least 55, at least 60, at least 65, at least 70, at least 75, at least 80, at least 85, at least 90, or at least 95 weight percent of solvent (or methanol), based on the total weight of the stream.

Additionally, as shown in FIGS. 2 and 3, a stream of recycle content glycol 206 (or recycle content EG 306) and a stream of glycol sludge 228 (or a stream of EG sludge 328) may also be removed from the glycol separation zone 260 (or 360). In one embodiment or in combination with any of the mentioned embodiments, the r-glycol stream 206 and glycol sludge stream 228 (or the r-EG stream 306 and the EG sludge stream 328) may comprise not more than 25, not more than 20, not more than 15, not more than 10, not more than 5, not more than 2, or not more than 1 weight percent of solvent (or methanol), based on the total weight of each respective stream.

In one embodiment or in combination with any of the mentioned embodiments, the glycol separation zone 260 (or EG separation zone 360) may be configured to provide a stream enriched in the principal glycol 206. In one embodiment or in combination with any of the mentioned embodiments, the glycol enriched stream 206 can include at least 50, at least 55, at least 60, at least 65, at least 70, at least 75, at least 80, at least 85, at least 90, at least 95, or at least 97 weight percent of the principal glycol, based on the total weight of the stream.

In one embodiment or in combination with any of the mentioned embodiments, the glycol stream 206 withdrawn from the glycol separation zone 260 may comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of recycle content glycol, based on the total weight of the stream. This may correspond to at least 70, at least 75, at least 80, at least 85, at least 90, at least 95, at least 97, or at least 99 weight percent of the total amount of r-glycol produced in the solvolysis facility 230.

When the solvolysis facility is a methanolysis facility 330 as shown in FIG. 3, the EG separation zone 360 is configured to provide a stream enriched in EG 306. In one embodiment or in combination with any of the mentioned embodiments, the EG stream 306 withdrawn from the EG separation zone 360 can include at least 50, at least 55, at least 60, at least 65, at least 70, at least 75, at least 80, at least 85, at least 90, at least 95, or at least 97 weight percent of EG, based on the total weight of the stream.

In one embodiment or in combination with any of the mentioned embodiments, the EG stream 306 withdrawn from the EG separation zone 360 may comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of recycle content EG, based on the total weight of the stream. This may correspond to at least 70, at least 75, at least 80, at least 85, at least 90, at least 95, at least 97, or at least 99 weight percent of the total amount of EG produced in the methanolysis facility and it may be routed to further processing, storage, and/or use.

As shown in FIGS. 2 and 3, the glycol separation zone 260 (or, in the case of methanolysis, EG separation zone 360) may also be configured to provide a glycol column bottoms coproduct stream 228 (or an EG bottoms coproduct stream). The terms "glycol bottoms" or "glycol column bottoms" or "glycol sludge" refers to components other than the principal glycol that have a boiling point (or azeotrope) higher than the boiling point of the principal glycol but lower than the principal terephthalyl. Similarly, the terms "EG bottoms" or "EG column bottoms" or "EG sludge" refer to components other than the principal glycol that have a boiling point (or azeotrope) higher than the boiling point of the principal glycol but lower than the principal terephthalyl.

In one embodiment or in combination with any of the mentioned embodiments, the glycol column bottoms (or glycol sludge) coproduct stream 228 (or, in the case of methanolysis, the EG bottoms or EG sludge stream 328) can comprise at least 50, at least 55, at least 60, at least 65, at least 70, at least 75, at least 80, at least 85, at least 90, or at least 95 weight percent of components with a boiling point higher than the boiling point of the principal glycol (or ethylene glycol).

In one embodiment or in combination with any of the mentioned embodiments, the glycol column bottoms (or glycol sludge) coproduct stream 228 (or, in the case of methanolysis, the EG bottoms or EG sludge stream 328) can comprise not more than 60, not more than 55, not more than 50, not more than 45, not more than 40, not more than 35, not more than 30, not more than 25, not more than 20, not more than 15, not more than 10, not more than 5, not more than 2, not more than 1 weight percent of components with a boiling point lower than the boiling point of the principal glycol (or ethylene glycol). The glycol column bottoms (or glycol sludge) coproduct stream 228 (or, in the case of methanolysis, the EG bottoms or EG sludge stream 328) can have a mid-range boiling point higher than the boiling point of the principal glycol (or ethylene glycol).

In one embodiment or in combination with any of the mentioned embodiments, the bottoms (or glycol sludge) coproduct stream 228 (or, in the case of methanolysis, the EG bottoms or EG sludge stream 328) can have a viscosity of at least 0.01, at least 0.05, at least 0.10, at least 0.25, at least 0.50, at least 1, at least 2, at least 3, at least 5, at least 8 poise (P) and/or not more than 15, not more than 12, not more than 10, not more than 8, not more than 6, not more than 5, not more than 3, not more than 2, not more than 1, or not more than 0.5 P, measured using a Brookfield R/S rheometer with V80-40 vane spindle operating at a shear rate of 10 rad/s and a temperature of 250° C., or in the range of from 0.01 to 15 P, 0.05 to 10 P, or 0.10 to 5 P.

The total solids content of the glycol column bottoms (or glycol sludge) coproduct stream 228 (or, in the case of methanolysis, the EG bottoms or EG sludge stream 328) can be no more than 10, not more than 8, not more than 6, not more than 5, not more than 3, not more than 2, not more than 1, not more than 0.5 weight percent, based on the total weight of the stream.

In one embodiment or in combination with any of the mentioned embodiments, the glycol not more than can comprise at least 60, at least 65, at least 70, at least 75, at least 80, at least 85, at least 90, at least 92, at least 95, at least 97, at least 98, at least 99, or at least 99.5 weight percent of oligomers comprising moieties of the polyester, based on the total weight of the stream. As used herein, the term "polyester moieties" refers to portions or residues of a polyester, or reaction products of the polyester portions or residues.

The oligomers can have a chain length of at least 2, at least 3, at least 4, at least 5, at least 6, at least 7, or at least 8 monomer units and/or not more than 30, not more than 27, not more than 25, not more than 22, not more than 20, not more than 17, not more than 15, not more than 12, or not more than 10 monomer units, or a chain length in the range of from 2 to 30 monomer units, 3 to 25 monomer units, or 5 to 20 monomer units. The oligomers may comprise moieties of the polyester being processed including, for example, PET.

In one embodiment or in combination with any of the mentioned embodiments, the bottoms (or glycol sludge) coproduct stream 228 (or, in the case of methanolysis, the EG bottoms or EG sludge stream 328) comprises at least 0.01, at least 0.05, at least 0.10, at least 0.50, at least 1, or at least 1.5 and/or not more than 40, not more than 35, not more than 30, not more than 25, not more than 20, not more than 15, not more than 10, not more than 5, or not more than 2 weight percent of components other than oligomer, based on the total weight of the stream, or these components can be present in an amount in the range of from 0.01 to 40 weight percent, 0.10 to 30 weight percent, or 1 to 20 weight percent, based on the total weight of the stream.

In one embodiment or in combination with any of the mentioned embodiments, the oligomers further comprise moieties of at least one ester other than dimethyl terephthalate, at least one carboxylic acid other than terephthalic acid, and/or at least one glycol other than ethylene glycol. For example, the oligomers may further comprise moieties of one or more of diethylene glycol, triethylene glycol, 1,4-cyclohexane-dimethanol, propane-1,3-diol, butane-1,4-diol, pentane-1,5-diol, hexane-1,6-diol, neopentyl glycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4-tetramethylcyclobutanediol, 2,2-bis-(3-hydroxyethoxyphenyl)-propane, 2,2-bis-(4-hydroxypropoxyphenyl)-propane, isosorbide, hydroquinone, BDS-(2,2-(sulfonylbis)4,1-phenyleneoxy))bis(ethanol), phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, 2,2,-dimethyl-1,3-propandiol, dicarboxylic acid, succinic acid, glutaric acid, adipic acid, azelaic acid, sebacic acid, and combinations thereof.

The bottoms (or glycol sludge) coproduct stream 228 (or, in the case of methanolysis, the EG bottoms or EG sludge stream 328) may also comprise principal glycol (or, in the case of methanolysis, ethylene glycol) in an amount of at least 0.5, at least 1, at least 2, at least 3, at least 5, or at least 8 and/or not more than 30, not more than 25, not more than 20, not more than 15, not more than 12, or not more than 10 weight percent, based on the total weight of the stream, or it can comprise the principal glycol (or ethylene glycol) in an amount in the range of from 0.5 to 30 weight percent, 1 to 25 weight percent, or 5 to 20 weight percent, based on the total weight of the stream. The principal glycol (or ethylene glycol) may be present as itself (in a free state) or as a moiety in another compound. Other examples of other possible principal glycols (depending on the specific type of PET or other polymer being processed) may include, but are not limited to, diethylene glycol, neopentyl glycol, 1,4-cyclohexanedimethanol, and 2,2,4,4-tetramethyl-1,3-cyclobutanediol.

In one embodiment or in combination with any of the mentioned embodiments, the glycol column bottoms (or glycol sludge) coproduct stream 228 may further comprise at least one glycol other than the principal glycol. In the case of methanolysis, the EG bottoms or EG sludge stream 328 may comprise at least one glycol other than EG. Some examples of other glycols can include, but are not limited to, diethylene glycol, triethylene glycol, 1,4-cyclohexane-dimethanol, propane-1,3-diol, butane-1,4-diol, pentane-1,5-diol, hexane-1,6-diol, neopentyl glycol, 3-methylpentanediol-(2, 4), 2-methylpentanediol-(1,4), 2,2,4-trimethylpentane-diol-(1,3), 2-ethylhexanediol-(1,3), 2,2-diethylpropane-diol-(1, 3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4 tetramethylcyclobutanediol, 2,2-bis-(3-hydroxyethoxyphenyl)-propane, 2,2-bis-(4-hydroxypropoxyphenyl)-propane, isosorbide, hydroquinone, BDS-(2,2-(sulfonylbis)4,1-phenyleneoxy))bis(ethanol), and combinations thereof. The other glycol may not be or comprise ethylene glycol.

In one embodiment or in combination with any of the mentioned embodiments, the glycol other than the principal glycol (or ethylene glycol in the case of methanolysis) can be present in the glycol column bottoms (or glycol sludge) coproduct stream 228 (or, in the case of methanolysis, the EG bottoms or EG sludge stream 328) in an amount of at least 5, at least 10, at least 15, at least 20, at least 25, at least 30, at least 35, at least 40, at least 45, at least 50, at least 55, at least 60, at least 65, at least 70, or at least 75 and/or not more than 99, not more than 95, not more than 90, not more than 85, not more than 80, not more than 75, not more than 70, not more than 65, not more than 60, not more than 55, not more than 50, not more than 45, not more than 40, or not more than 35 weight percent, based on the total weight of glycols in the stream, or in an amount in the range of from 5 to 75 weight percent, 10 to 60 weight percent, or 15 to 45 weight percent, based on the total weight of the stream.

In one embodiment or in combination with any of the mentioned embodiments, the weight ratio of the at least one glycol other than the principal glycol (or ethylene glycol) to the principal glycol (or ethylene glycol) is at least 0.5:1, at least 0.55:1, at least 0.65:1, at least 0.70:1, at least 0.75:1, at least 0.80:1, at least 0.85:1, at least 0.90:1, at least 0.95:1, at least 0.97:1, at least 0.99:1, at least 1:1, at least 1.05:1, at least 1.1:1, at least 1.15:1, at least 1.2:1, or at least 1.25:1. Additionally, or in the alternative, the weight ratio of the at least one glycol other than the principal glycol (or ethylene glycol) to the principal glycol (or ethylene glycol) is not more than 5:1, not more than 4.5:1, not more than 4:1, not more than 3.5:1, not more than 3:1, not more than 2.5:1, not more than 2:1, not more than 1.5:1, not more than 1.25:1, or not more than 1:1, or it can be in the range of 0.5:1 to 5:1, or 0.75:1 to 3.5:1, or 0.95:1 to 1.25:1.

In one embodiment or in combination with any of the mentioned embodiments, the bottoms (or glycol sludge) coproduct stream 228 (or, in the case of methanolysis, the EG bottoms or EG sludge stream 328) withdrawn from the solvolysis facility 230 (or the methanolysis facility 330) and/or introduced into one or more of the downstream facilities shown in FIG. 1 can have a temperature of at least 150, at least 155, at least 160, at least 165, at least 170, at least 175, at least 180, at least 185, at least 190, or at least 195 and/or not more than 260, not more than 255, not more than 250, not more than 245, not more than 240, not more than 235, not more than 230, or not more than 225°) C. when withdrawn from the solvolysis facility 230 (or methanolysis facility 330), or it can be in the range of from 150 to 260° C., 175 to 250° C., or 190 to 240° C. The stream 228 (or 328) can be in the form of a liquid, a melt, a slurry, or a plurality of solid particles.

Turning again to FIG. 2, a stream predominantly comprising the principal terephthalyl 226 can be passed from the product separation zone 250 to a terephthalyl separation zone 270, wherein at least 50 weight percent of the principal terephthalyl in the stream introduced into the terephthalyl separation zone is separated out. When the facility is a methanolysis facility as shown in FIG. 3, a stream comprising predominantly DMT 326 can be passed from the product separation zone 350 to a DMT separation zone 370. The terephthalyl separation zone 270 of the solvolysis facility 230 (or the DMT separation zone 370 of the methanolysis facility 330) can include any suitable device or employ any suitable method needed to carry out the separation including, but not limited to, distillation (including azeotropic distillation), extraction, filtration, crystallization, washing, drying, and combinations thereof.

As shown in FIGS. 2 and 3, the terephthalyl separation zone 270 (or DMT separation zone 370) may be configured to provide a stream enriched in principal terephthalyl 208 (or a stream enriched in DMT 308). In one embodiment or in combination with any of the mentioned embodiments, the terephthalyl stream 208 (or DMT stream 308) can include at least 50, at least 55, at least 60, at least 65, at least 70, at least 75, at least 80, at least 85, at least 90, at least 95, or at least 97 weight percent of terephthalyl (or DMT), based on the total weight of the stream. This may correspond to at least 70, at least 75, at least 80, at least 85, at least 90, at least 95, at least 97, or at least 99 weight percent of the total amount of terephthalyl (or DMT) produced in the solvolysis facility 230 (or methanolysis facility 330). In one embodiment or in combination with any of the mentioned embodiments, the terephthalyl stream 208 (or DMT stream 308) withdrawn from the terephthalyl separation zone may comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of recycle content terephthalyl, based on the total weight of the stream. The terephthalyl stream 208 (or DMT stream 308) may be routed to further processing, storage, and/or use.

When the solvolysis facility is a methanolysis facility 330 as shown in FIG. 3, DMT separation zone 370 is configured to provide a stream enriched in recycle content DMT (r-DMT) 308. In one embodiment or in combination with any of the mentioned embodiments, the r-DMT stream 308 can include at least 50, at least 55, at least 60, at least 65, at least 70, at least 75, at least 80, at least 85, at least 90, at least 95, or at least 97 weight percent of r-DMT, based on the total weight of the stream. This may correspond to at least 70, at least 75, at least 80, at least 85, at least 90, at least 95, at least 97, or at least 99 weight percent of the total amount of r-DMT produced in the methanolysis facility 330.

In one embodiment or in combination with any of the mentioned embodiments, the DMT stream 308 withdrawn from the DMT separation zone 370 may comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of recycle content DMT, based on the total weight of the stream. The r-DMT stream 308 may be routed to further processing, storage, and/or use.

As shown in FIG. 2, the terephthalyl separation zone 270 may also be configured to provide a terephthalyl bottoms (or terephthalyl sludge) coproduct stream 232. The term "terephthalyl bottoms" or "terephthalyl column bottoms" or "terephthalyl sludge" refers to components other than the principal terephthalyl that have a boiling point (or azeotrope) higher than the boiling point of the principal terephthalyl. Similarly, the DMT separation zone 370 shown in the methanolysis facility 330 in FIG. 3 may also be configured to provide a DMT bottoms (or DMT sludge) coproduct stream 332. The term "terephthalyl bottoms" or "terephthalyl column bottoms" or "terephthalyl sludge" refers to components other than the principal terephthalyl that have a boiling point (or azeotrope) higher than the boiling point of the principal terephthalyl.

In one embodiment or in combination with any of the mentioned embodiments, the terephthalyl bottoms or sludge coproduct stream 232 (or the DMT bottoms or sludge coproduct stream 332) can comprise at least 40, at least 45, at least 50, at least 55, at least 60, at least 65, at least 70, at least 75, at least 80, at least 85, at least 90, or at least 95 weight percent of components with a boiling point higher than the boiling point of the principal terephthalyl (or DMT). In one embodiment or in combination with any of the mentioned embodiments, the terephthalyl bottoms or sludge coproduct stream 232 (or the DMT bottoms or sludge coproduct stream 332) can comprise not more than 60, not more than 55, not more than 50, not more than 45, not more than 40, not more than 35, not more than 30, not more than 25, not more than 20, not more than 15, not more than 10, not more than 5, not more than 3, not more than 2, not more than 1 weight percent of components with a boiling point lower than the boiling point of DMT. The terephthalyl bottoms or sludge coproduct stream 232 (or the DMT bottoms or sludge coproduct stream 332) can have a mid-range boiling point higher than the boiling point of the principal terephthalyl (or DMT).

In one embodiment or in combination with any of the mentioned embodiments, the terephthalyl bottoms or sludge coproduct stream 232 (or the DMT bottoms or sludge coproduct stream 332) has a viscosity of at least 0.01, at least 0.05, at least 0.10, at least 0.25, at least 0.50, at least 1, at least 2, at least 3, at least 5, at least 6, or at least 8 poise (P) and/or not more than 10, not more than 8, not more than 6, not more than 5, not more than 3, not more than 2, not more than 1, not more than 0.5, not more than 0.1, not more than 0.05, or not more than 0.025 P, measured using a Brookfield R/S rheometer with V80-40 vane spindle operating at a shear rate of 10 rad/s and a temperature of 250° C., or it can have a viscosity in the range of from 0.01 to 10 P, 0.05 to 6 P, or 1 to 5 P.

The total solids content of the terephthalyl bottoms or sludge coproduct stream 232 (or the DMT bottoms or sludge coproduct stream 332) can be no more than 10, not more than 8, not more than 6, not more than 5, not more than 3, not more than 2, not more than 1, not more than 0.5 weight percent, based on the total weight of the stream. In one embodiment or in combination with any of the mentioned embodiments, the terephthalyl sludge coproduct stream 232 (or DMT sludge coproduct stream 332) can comprise particles of DMT, formed by pastillation, pelletization, or flaking. The particles, when present, may be transported as particles, or may be combined with a liquid to form a slurry.

In one embodiment or in combination with any of the mentioned embodiments, the terephthalyl bottoms or sludge coproduct stream 232 (or the DMT bottoms or sludge coproduct stream 332) can comprise at least 60, at least 65, at least 70, at least 75, at least 80, at least 85, at least 90, at least 92, at least 95, at least 97, at least 98, at least 99, or at least 99.5 weight percent of oligomers comprising moieties of the polyester, based on the total weight of the stream. The oligomers can have a chain length of at least 2, at least 3, at least 4, at least 5, at least 6, at least 7, or at least 8 monomer units and/or not more than 30, not more than 27, not more than 25, not more than 22, not more than 20, not more than 17, not more than 15, not more than 12, or not more than 10 monomer units, or it can be in the range of from 2 to 30 monomer units, 4 to 25 monomer units, or 5 and 20 monomer units.

The oligomers may comprise moieties of the polyester being processed such as, for example, PET. In one embodiment or in combination with any of the mentioned embodiments, the terephthalyl bottoms coproduct stream comprises at least 0.01, at least 0.05, at least 0.10, at least 0.50, at least 1, or at least 1.5 weight percent and/or not more than 40, not more than 35, not more than 30, not more than 25, not more than 20, not more than 15, not more than 10, not more than 5, or not more than 2 weight percent of components other than oligomer, based on the total weight of the stream, or it can be in the range of from 0.01 to 40 weight percent, 0.10 to 30 weight percent, or 1 to 10 weight percent, based on the total weight of the stream.

In one embodiment or in combination with any of the mentioned embodiments, the oligomers further comprise moieties of at least one ester other than dimethyl terephthalate, at least one carboxylic acid other than terephthalic acid or DMT, and/or at least one glycol other than ethylene glycol. For example, the oligomers may further comprise moieties of one or more of diethylene glycol, triethylene glycol, 1,4-cyclohexane-dimethanol, propane-1,3-diol, butane-1,4-diol, pentane-1,5-diol, hexane-1,6-diol, neopentyl glycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4 tetramethylcyclobutanediol, 2,2-bis-(3-hydroxyethoxyphenyl)-propane, 2,2-bis-(4-hydroxypropoxyphenyl)-propane, isosorbide, hydroquinone, BDS-(2,2-(sulfonylbis)4,1-phenyleneoxy))bis(ethanol), phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, 2,2,-dimethyl-1,3-propandiol, dicarboxylic acid, succinic acid, glutaric acid, adipic acid, azelaic acid, sebacic acid, and combinations thereof.

The terephthalyl bottoms or sludge coproduct stream 232 (or the DMT bottoms or sludge coproduct stream 332) may also comprise principal terephthalyl or, in the case of methanolysis, DMT, in an amount of at least 35, at least 40, at least 45, at least 50, at least 55, at least 60, at least 65, at least 70, at least 75, at least 80, at least 85, at least 90, or at least 95 weight percent and/or not more than 99, not more than 95, not more than 90, not more than 85, not more than 80, not more than 75, not more than 70, not more than 65, not more than 60, not more than 55, not more than 50, not more than 45, or not more than 40 weight percent, based on the total weight of the coproduct stream, or it can be present in an amount of 40 to 99 weight percent, 50 to 90 weight percent, or 55 to 90 weight percent, based on the total weight of the stream.

Additionally, the terephthalyl bottoms or sludge coproduct stream 232 (or the DMT bottoms or sludge coproduct stream 332) can include a minor amount of the principal glycol (or ethylene glycol in the case of methanolysis). Examples of possible principal glycols (depending on the PET or other polymer being processed) may include, but are not limited to, diethylene glycol, neopentyl glycol, 1,4-cyclohexanedimethanol, and 2,2,4,4-tetramethyl-1,3-cyclobutanediol. In one embodiment or in combination with any of the mentioned embodiments, the terephthalyl bottoms or sludge coproduct stream 232 (or the DMT bottoms or sludge coproduct stream 332) can comprise not more than 10, not more than 8, not more than 6, not more than 5, not more than 4, not more than 2, not more than 1, not more than 0.5 weight percent of principal glycol (or ethylene glycol), based on the total weight of the stream.

In one embodiment or in combination with any of the mentioned embodiments, the terephthalyl bottoms or sludge coproduct stream 232 (or the DMT bottoms or sludge coproduct stream 332) can comprise not more than 10, not more than 8, not more than 6, not more than 5, not more than 4, not more than 2, not more than 1, not more than 0.5 weight percent of terephthalyls (or carboxyls) other than the principal terephthalyl (or DMT), based on the total weight of the stream.

In one embodiment or in combination with any of the mentioned embodiments, the terephthalyl bottoms or sludge coproduct stream 232 (or the DMT bottoms or sludge coproduct stream 332) may further comprise at least one substituted terephthalyl component. As used herein, the term "substituted terephthalyl" refers to a terephthalyl component having at least one substituted atom or group. In one embodiment or in combination with any of the mentioned embodiments, the terephthalyl bottoms or sludge coproduct stream 232 (or the DMT bottoms or sludge coproduct stream 332) can include at least 1, at least 100, at least 500 parts per billion by weight, or at least 1, at least 50, at least 1000, at least 2500, at least 5000, at least 7500, or at least 10,000 parts per million by weight, or at least 1, at least 2, or at least 5 weight percent and/or not more than 25, not more than 20, not more than 15, not more than 10, not more than 5, not more than 2, not more than 1, not more than 0.5, not more than 0.1, not more than 0.05, or not more than 0.01 weight percent of substituted terephthalyl components, based on the total weight of the terephthalyl bottoms or sludge coproduct stream 232 (or the DMT bottoms or sludge coproduct stream 332) or it can be present in an amount in the range of from 100 ppb to 20 weight percent, 100 ppm to 10 weight percent, or 2500 ppm to 5 weigh percent, based on the total weight of the stream.

In one embodiment or in combination with any of the mentioned embodiments, the terephthalyl other than the principal terephthalyl (or DMT in the case of methanolysis) can be present in the terephthalyl bottoms or sludge coproduct stream 232 (or the DMT bottoms or sludge coproduct stream 332) in an amount of at least 15, at least 20, at least 25, at least 30, at least 35, at least 40, at least 45, at least 50, at least 55, at least 60, at least 65, at least 70, or at least 75 and/or not more than 99, not more than 95, not more than 90, not more than 85, not more than 80, not more than 75, not more than 70, not more than 65, not more than 60, not more than 55, not more than 50, not more than 45, not more than 40, or not more than 35 weight percent, based on the total weight of terephthalyl in the stream, or it can be present in an amount of 15 to 75 weight percent, 20 to 65 weight percent, or 25 to 50 weight percent, based on the total weight of the stream.

In one embodiment or in combination with any of the mentioned embodiments, the weight ratio of the at least one terephthalyl other than the principal terephthalyl to the principal terephthalyl is at least 0.5:1, at least 0.55:1, at least 0.65:1, at least 0.70:1, at least 0.75:1, at least 0.80:1, at least 0.85:1, at least 0.90:1, at least 0.95:1, at least 0.97:1, at least 0.99:1, at least 1:1, at least 1.05:1, at least 1.1:1, at least 1.15:1, at least 1.2:1, or at least 1.25:1. Additionally, or in the alternative, the weight ratio of the at least one terephthalyl other than the principal terephthalyl to the principal terephthalyl is not more than 5:1, not more than 4.5:1, not more than 4:1, not more than 3.5:1, not more than 3:1, not more than 2.5:1, not more than 2:1, not more than 1.5:1, not more than 1.25:1, or not more than 1:1, or it can be in the range of from 0.5:1 to 5:1, 0:75:1 to 3.5:1, or 1:1 to 2.5:1.

In one embodiment or in combination with any of the mentioned embodiments, the terephthalyl bottoms or sludge coproduct stream 232 (or the DMT bottoms or sludge coproduct stream 332) withdrawn from the solvolysis facility 230 (or methanolysis facility 330), and/or the terephthalyl bottoms or sludge coproduct stream 232 (or the DMT bottoms or sludge coproduct stream 332) introduced into one or more of the downstream facilities shown in FIG. 1 can have a temperature of at least 150 at least 155, at least 160, at least 165, at least 170, at least 175, at least 180, at least 185, at least 190, or at least 195° C. and/or not more than 260, not more than 255, not more than 250, not more than 245, not more than 240, not more than 235, not more than 230, or not more than 225° C. when withdrawn from the solvolysis facility 230 (or methanolysis facility 330), or it can be in the range of from 150 to 260° C., 175 to 250° C., or 195 to 225° C.

In one embodiment or in combination with any of the mentioned embodiments, the terephthalyl bottoms or sludge coproduct stream 232 (or the DMT bottoms or sludge coproduct stream 332) can comprise at least 50, at least 55, at least 60, at least 65, at least 70, at least 75, at least 80, at least 85, at least 90, or at least 95 weight percent of components with a boiling point higher than the boiling point of DMT. In one embodiment or in combination with any of the mentioned embodiments, the terephthalyl bottoms or sludge coproduct stream 232 (or the DMT bottoms or sludge coproduct stream 332) can comprise not more than 25, not more than 20, not more than 15, not more than 10, not more than 5, not more than 2, not more than 1 weight percent of components with a boiling point lower than the boiling point of DMT.

In one embodiment or in combination with any of the mentioned embodiments, one or more of the above coproduct streams withdrawn from the solvolysis facility 230 (or methanolysis facility 330), including the polyolefin-containing coproduct stream 216*a,b* (or 316), the terephthalyl (or DMT) sludge stream 232 (or 332), and the reactor purge coproduct stream 218 (or 318) can be or comprise solids. Examples of such streams can include solid particles transportable by solids transport devices and systems, as well as melts and slurries.

In one embodiment or in combination with any of the mentioned embodiments, the polyolefin-containing coproduct stream 216*a,b* (or 316) may be pelletized or micropelletized and sent to a gasifier or sold as a product stream.

In one embodiment or in combination with any of the mentioned embodiments, the terephthalyl sludge 232 (or DMT sludge 332) may be formed into pastilles or flakes (by a drum flaker, for example) by any suitable method, and the pastilles or flakes may be transported to a POX gasification facility 50 and/or to further transportation, storage, use, and/or disposal. In one embodiment or in combination with any of the mentioned embodiments, the terephthalyl sludge 232 (or DMT sludge 332) may be transported as a liquid phase stream (e.g., as a melt or a slurry) to a POX gasification facility 50 and/or to an energy generation/production facility 80.

In one embodiment or in combination with any of the mentioned embodiments, the reactor purge coproduct stream

218 (or 318) may be formed into pastilles or flakes (by a drum flaker, for example) by any suitable method, and the pastilles or flakes may be transported to a POX gasification facility 50 and/or to further transportation, storage, use, and/or disposal. In one embodiment or in combination with any of the mentioned embodiments, the reactor purge coproduct stream 218 (or 318) may be transported as a liquid phase stream (e.g., as a melt or a slurry) to a POX gasification facility 50 and/or to an energy generation/production facility 80. One or more of the above may occur when the purge from the reactor is continuous. This may occur when, for example, the total content of inert components in the feed to the solvolysis (or methanolysis) facility 30 or chemical recycling facility 10 as shown in FIG. 1 is less than 0.40, not more than 0.35, not more than 0.30, not more than 0.25, not more than 0.20, not more than 0.15, or not more than 0.10 weight percent, based on the total content of the feed stream.

In one embodiment or in combination with any of the mentioned embodiments, the reactor purge coproduct stream 218 (or 318) may be formed into pellets or micro-pellets by any suitable method, and the pellets may be transported to a POX gasification facility 50 and/or to further transportation, storage, use, and/or disposal. One or more of the above may occur when the purge from the reactor is batch. This may occur when, for example, the total content of inert components in the feed to the solvolysis (or methanolysis) facility 30 or chemical recycling facility 10 as shown in FIG. 1 is at least 0.40, at least 0.45, at least 0.50, at least 0.55, or at least 0.60 weight percent, based on the total content of the feed stream.

In one embodiment or in combination with any of the mentioned embodiments, the glycol sludge 228 (or EG sludge 328) may be transported as a liquid phase stream to a POX gasification facility 50 and/or to an energy generation/production facility 80. One or more of the above may occur when the purge from the reactor is continuous.

In one embodiment or in combination with any of the mentioned embodiments, all or a portion of one or more of the solvolysis coproduct streams may be withdrawn from solvolysis facility 30 and routed to further processing, storage, sale, and/or disposal. This can include one or more of the polyolefin-containing coproduct stream, the reactor purge coproduct stream, the glycol column bottoms coproduct stream, and the terephthalyl column bottoms stream as discussed above.

Solidification Facility

Referring again to FIG. 1, the chemical recycling facility 10 may also comprise a solidification facility 40. As used herein, the term "solidification" refers to causing a non-solid material to become a solid material through a physical means (e.g., cooling) and/or chemical means (e.g., precipitation). A "solidification facility" is a facility that includes all equipment, lines, and controls necessary to carry out solidification of a feedstock derived from waste plastic.

Figure 4:
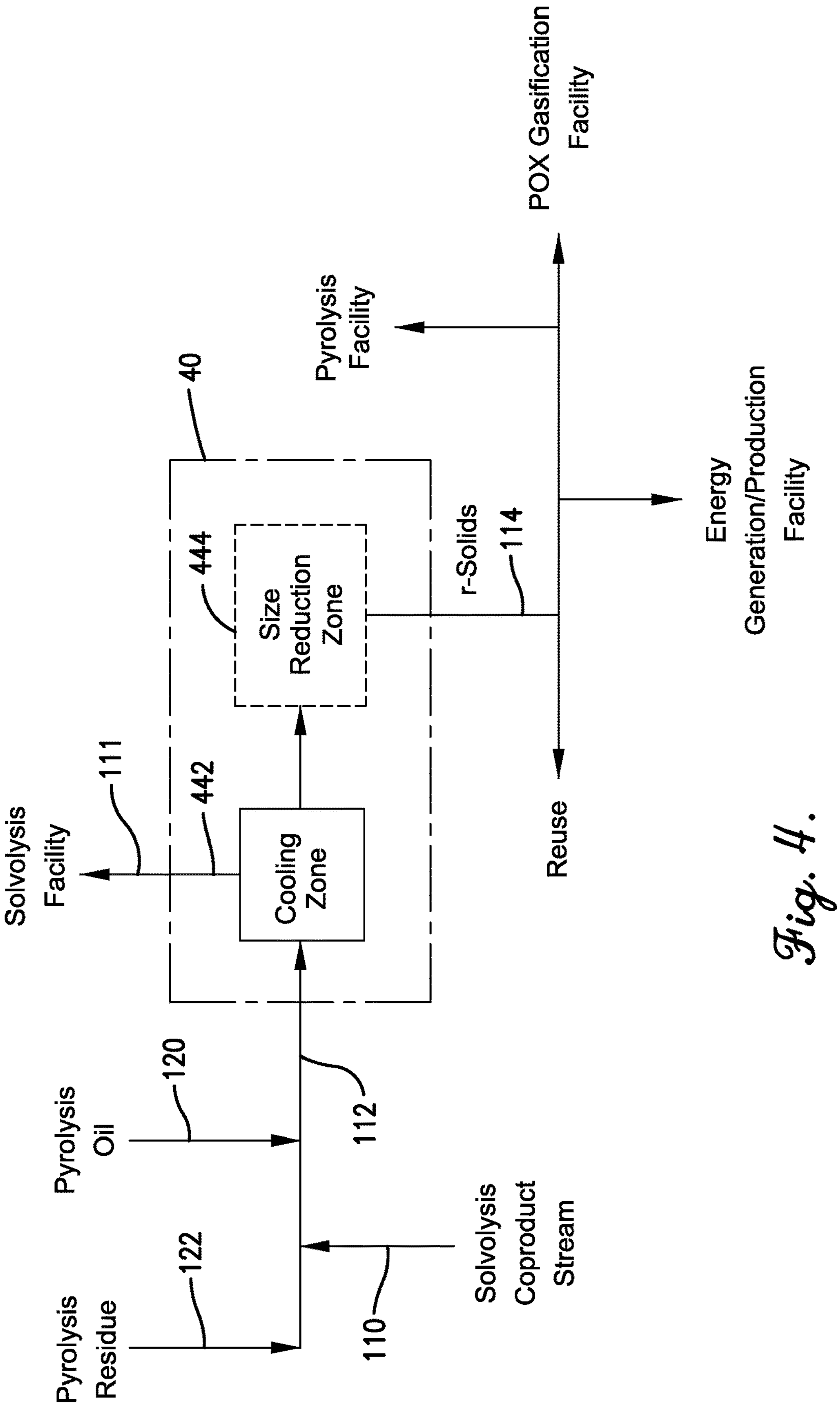
FIG. 4 is a schematic block flow diagram illustrating the main steps of a solidification facility according to embodiments of the present technology.

Turning now to FIG. 4, a schematic diagram of a solidification facility 40 suitable for use in a chemical recycling facility 10 as generally shown in FIG. 1 is provided. As shown in FIG. 4, the feed stream 112 introduced into the solidification facility 40 may originate from one or more locations within the chemical recycling facility. In one embodiment or in combination with any of the mentioned embodiments, the feed stream to the solidification facility 40 may comprise at least one of (i) one or more solvolysis (or methanolysis) coproduct streams 110 as described previously, (ii) a stream of pyrolysis oil (pyoil) 120, and (iii) a stream of pyrolysis residue 122. Definitions for pyrolysis oil and pyrolysis residue are provided in a subsequent section herein, and definitions for solvolysis (or methanolysis) coproducts are provided in a previous section.

In one embodiment or in combination with any of the mentioned embodiments, one or more of these streams 110, 120, 122 may be introduced into the solidification facility 40 continuously, and/or one or more of these streams 110, 120, 122 may be introduced intermittently. When multiple types of feed streams are present, each may be introduced separately, or all, or a portion, of the streams may be combined so that the combined stream may be introduced into the solidification facility 40. The combining, when performed, may take place in a continuous or batch (intermittent) manner.

In one embodiment or in combination with any of the mentioned embodiments, the feed stream 112 to the solidification facility 40 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of one or more solvolysis coproduct streams 110, based on the total weight of the feed stream introduced into the solidification facility 40. Additionally, or in the alternative, the feed stream to the solidification facility 40 can comprise not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of one or more solvolysis coproduct streams 110, based on the total weight of the feed stream introduced into the solidification facility 40, or it can include one or more solvolysis streams in an amount in the range of from 1 to 99 weight percent, 10 to 90 weight percent, or 20 to 80 weight percent, based on the total weight of the stream.

The solvolysis coproduct stream 110 introduced into the solidification facility 40 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of solvolysis coproduct stream or streams introduced into the solidification facility 40.

In one embodiment or in combination with any of the mentioned embodiments, the feed stream 112 to the solidification facility 40 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of pyrolysis oil, based on the total weight of the feed stream introduced into the solidification facility 40.

Additionally, or in the alternative, the feed stream 112 to the solidification facility 40 can comprise not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of pyrolysis oil, based on the total weight of the feed stream 112 introduced into the solidification facility 40. The pyrolysis oil 120 introduced into the solidification facility 40 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of pyrolysis oil 120 introduced into the solidification facility 40.

In one embodiment or in combination with any of the mentioned embodiments, the feed stream 112 to the solidification facility 40 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of pyrolysis residue 122, based on the total weight of the feed stream 112 introduced into the solidification facility 40.

Additionally, or in the alternative, the feed stream 112 to the solidification facility 40 may comprise not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of pyrolysis residue 122, based on the total weight of the feed stream introduced into the solidification facility 40. The pyrolysis residue 122 introduced into the solidification facility 40 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of pyrolysis residue 122 introduced into the solidification facility 40.

In one embodiment or in combination with any of the mentioned embodiments, the weight ratio of any one of the streams to another in the combined feed stream 112 can be at least 1:10, at least 1:9, at least 1:8, at least 1:7, at least 1:6, at least 1:5, at least 1:4, at least 1:3, at least 1:2, at least 1:1.5, or at least 1:1 and/or not more than 10:1, not more than 9:1, not more than 8:1, not more than 7:1, not more than 6:1, not more than 5:1, not more than 4:1, not more than 3:1, not more than 2:1, not more than 1.5:1, or not more than 1:1, or it could be in the range of from 1:10 to 10:1, 1:5 to 5:1, or 1:3 to 3:1.

The solidification facility 40 generally depicted in FIG. 4 includes a cooling zone 442 for cooling and at least partially solidifying the feed stream 112, followed by an optional size reduction zone 444. Upon leaving the cooling zone 442, all or a portion of stream may be a solidified material. In some cases, the solidified material can be in the form of sheets, blocks, or chunks, or it may be in the form of particles, pellets, micropellets, or a powder. In one or more embodiments when the feed stream is only partially solidified, the stream withdrawn from the cooling zone may comprise both a solid and a liquid phase. In one embodiment or in combination with any of the mentioned embodiments, at least a portion of the solid phase may be removed and all or a portion of the liquid phase may be withdrawn from the solidification facility 40 and introduced into another facility, optionally within the chemical recycling facility (such as, for example, the solvolysis facility 30). In some embodiments (not shown), the solidification facility 40 may also include a precipitation zone for chemically precipitating (solidifying) certain components out of a liquid stream in addition, or alternatively, to the cooling zone 442.

As shown in FIG. 4, the solidification facility 40 may also include a size reduction zone 444 for reducing the size of the solid material withdrawn from the cooling zone 442 (and/or precipitation zone, not shown) and for forming a plurality of particles. In one embodiment or in combination with any of the mentioned embodiments, the size reduction steps performed in size reduction zone 444 may include comminuting, smashing, breaking, or grinding larger pieces or chunks of solidified material to form the particles. In other embodiments, at least a portion of the feed stream to the solidification facility 40 may be at least partially cooled before being pelletized via conventional pelletization devices utilized in the size reduction zone 444.

Regardless of how the particles are formed, the resulting solids withdrawn from the solidification facility 40 can have an average particle size of at least 50, at least 75, at least 100, at least 150, at least 250, at least 350, at least 450, at least 500, at least 750 microns, or at least 0.5, at least 1, at least 2, at least 5, or at least 10 mm and/or not more than 50, not more than 45, not more than 40, not more than 30, not more than 35, not more than 30, not more than 25, not more than 20, not more than 15, not more than 10, not more than 5, not more than 2, not more than 1 mm or not more than 750, not more than 500, not more than 250, or not more than 200 microns, or it can be in the range of from 50 to 750 microns, or 100 to 500 microns, or 150 to 250 microns, or 0.5 to 50 mm, or 1 to 35 mm, or 5 to 25 mm.

In one embodiment or in combination with any of the mentioned embodiments, the solids may comprise a powder. In one embodiment or in combination with any of the mentioned embodiments, the solids may comprise pellets of any shape. The solids can have a recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of the solids.

As shown in FIG. 4, the solids withdrawn from the solidification facility 40 may be routed to at least one of (i) a pyrolysis facility 60, (ii) an energy generation/production facility 80, (iii) a POX gasification facility 50 and (iv) a reuse or recycle facility 90. In one embodiment or in combination with any of the mentioned embodiments, the solids may only be routed to one of the facilities (i) through (iv), while, in other embodiments, the solids may be routed to two or more, or three or more of the facilities (i) through (iv).

When routed to one or more downstream facilities, the solids in line 114 may be transported or introduced to the facilities as a solid (e.g., powder or pellets), or may be combined with a liquid stream (not shown) to form a slurry. Examples of suitable liquids can include, but are not limited to, water, alcohols, and combinations thereof. In one embodiment or in combination with any of the mentioned embodiments, at least a portion of the solids can be heated to at least partially melt the solids and the resulting melt can be introduced into one or more of facilities described above. Optionally, at least a portion of the solids may be sent to an industrial landfill (not shown).

Pyrolysis Facility

As shown in FIG. 1, In one embodiment or in combination with any of the mentioned embodiments, the chemical recycling facility 10 may comprise a pyrolysis facility 60. As used herein the term "pyrolysis" refers to the thermal decomposition of one or more organic materials at elevated temperatures in an inert (i.e., substantially oxygen free) atmosphere. A "pyrolysis facility" is a facility that includes all equipment, lines, and controls necessary to carry out pyrolysis of waste plastic and feedstocks derived therefrom.

Figure 5:
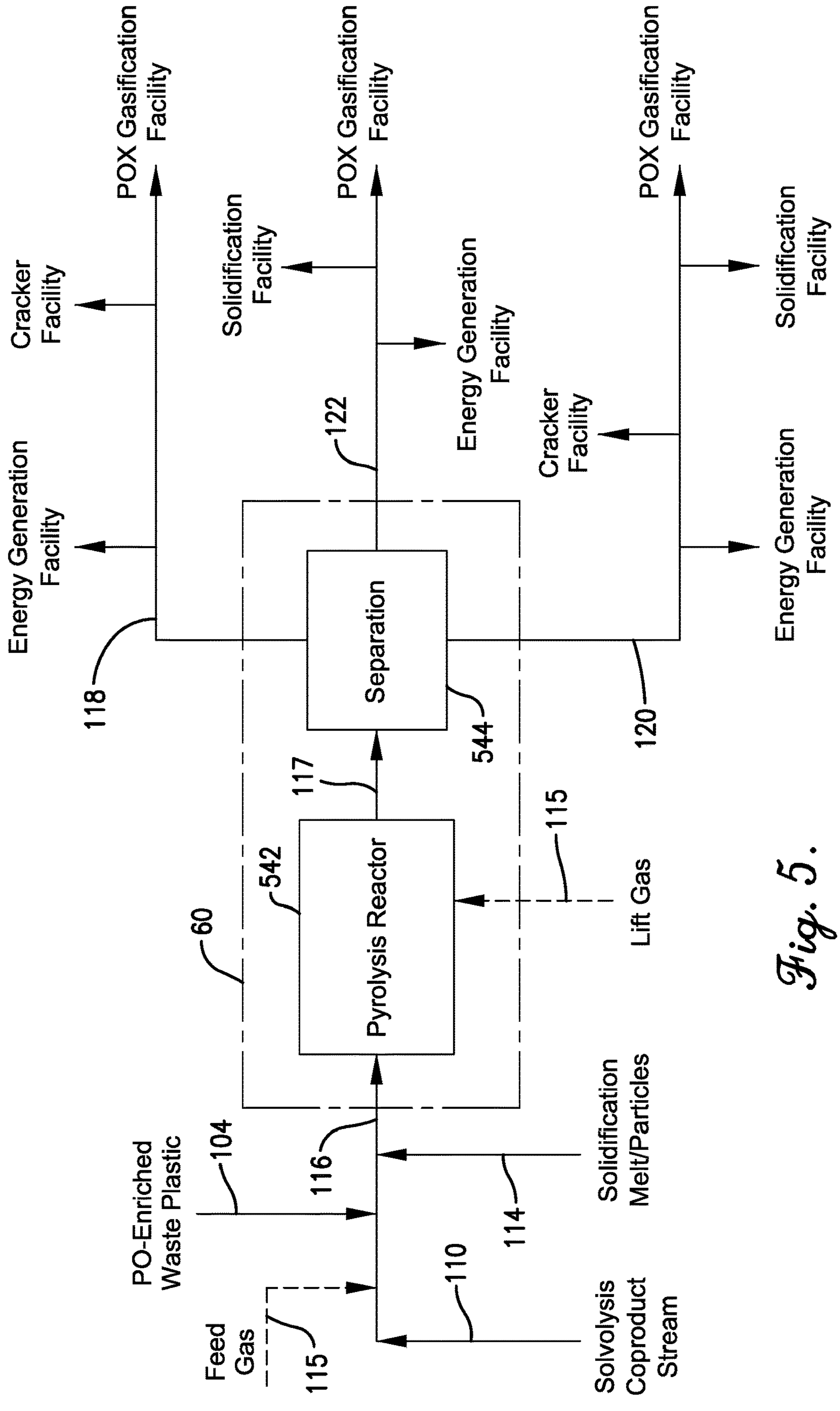
FIG. 5 is a schematic block flow diagram illustrating the main steps of a pyrolysis facility according to embodiments of the present technology.

Turning now to FIG. 5, a schematic diagram of a pyrolysis facility 60 suitable for use in a chemical recycling facility according to one or more embodiments of the present technology is provided. As shown in FIG. 5, a feed stream 116 may be introduced into the inlet of a pyrolysis facility 60, wherein it may be thermally decomposed at elevated temperatures in an inert environment. In one embodiment or in combination with any of the mentioned embodiments, a feed stream 116 to the pyrolysis facility 60 may comprise at least one of (i) at least one solvolysis coproduct stream 110 as described previously, (ii) a PO-enriched stream of waste plastic 104, and (iii) particles and/or melt from a solidification facility 40.

One or more of these streams may be introduced into the pyrolysis facility 60 continuously or one or more of these streams may be introduced intermittently. When multiple types of feed streams are present, each may be introduced separately, or all or a portion of the streams may be combined so that the combined stream may be introduced into the pyrolysis facility 60. The combining, when performed, may take place in a continuous or batch manner.

In one embodiment or in combination with any of the mentioned embodiments, the feed stream to the pyrolysis facility 60 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of at least one solvolysis coproduct stream 110, based on the total weight of the feed stream 116 introduced into the pyrolysis facility 60. Additionally, or in the alternative, the feed stream 116 to the pyrolysis facility 60 can comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of at least one solvolysis coproduct stream 110, based on the total weight of the feed stream 116 introduced into the pyrolysis facility 60, or it can be in the range of from 1 to 99 weight percent, 10 to 90 weight percent, 20 to 80 weight percent, or 25 to 75 weight percent, based on the total weight of the stream.

The at least one solvolysis coproduct stream 110 introduced into the pyrolysis facility 60 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of solvolysis coproduct stream or streams introduced into the pyrolysis facility 60 and/or based on the total weight of the feed stream 116.

In one embodiment or in combination with any of the mentioned embodiments, the feed stream 116 to the pyrolysis facility 60 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of PO-enriched waste plastic, based on the total weight of the feed stream 116 introduced into the pyrolysis facility 60. Additionally, or in the alternative, the feed stream 116 to the pyrolysis facility 60 may comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of PO-enriched waste plastic, based on the total weight of the feed stream 116 introduced into the pyrolysis facility 60, or it can include an amount in the range of from 1 to 95 weight percent, 5 to 85 weight percent, or 10 to 75 weight percent, based on the total weight of the feed stream.

The PO-enriched waste plastic introduced into the pyrolysis facility 60 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of PO-enriched waste plastic 104 introduced into the pyrolysis facility 60. The PO-enriched plastic stream 104 may originate from the pre-processing facility 20 as shown in FIG. 1 and/or from another source of PO-enriched waste plastic (not shown). The stream may be in the form of a plastic melt, or in the form of particulates, or it may comprise a slurry.

In one embodiment or in combination with any of the mentioned embodiments, the feed stream 116 to the pyrolysis facility 60 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of a solid-containing stream 114 (e.g., particles, a slurry, and/or a melt) from a solidification facility 40, based on the total weight of the feed stream 116 introduced into the pyrolysis facility 60.

Additionally, or in the alternative, the feed stream 116 to the pyrolysis facility 60 may comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of a solid-containing stream 114 from a solidification facility 40, based on the total weight of the feed stream 116 introduced into the pyrolysis facility 60.

The PO-enriched waste plastic stream 104 introduced into the pyrolysis facility 60 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of the solid-containing stream 114 (e.g., particles, slurry, and/or melt) from a solidification facility 40 introduced into pyrolysis facility 60. The solid-containing stream may be in the form of particles, a slurry, or a melt and may originate from the solidification facility 40 as shown in FIG. 1 and/or from another source (not shown). In one embodiment or in combination with any of the mentioned embodiments, the particles may be present in a liquid so that the feed is in the form of a slurry.

As shown in FIG. 5, In one embodiment or in combination with any of the mentioned embodiments, a stream of PO-enriched waste plastic 104 can be combined with one or more of the other streams including, for example, a coproduct stream 110 from a solvolysis facility 30, a solids-containing stream 114 from a solidification facility 40 to form a combined pyrolysis feed stream 116. The combined stream 116 may include at least 5, at least 10, at least 15, at least 20, at least 25, at least 30, at least 35, at least 40, at least 45, at least 50, at least 55, at least 60, at least 65, at least 70, at least 75, at least 80 weight percent and/or not more than 99, not more than 90, not more than 95, not more than 90, not more than 85, not more than 80, not more than 75, not more than 70, not more than 65, not more than 60, not more than 55, not more than 50, not more than 45, or not more than 40 weight percent of PO or the PO-enriched stream 104, based on the total weight of the combined stream 116, or it can include an amount in the range of from 5 to 95 weight percent, 10 to 90 weight percent, 20 to 80 weight percent, or 25 to 75 weight percent, based on the total weight of the stream.

Additionally, or in the alternatively, the combined stream of PO-enriched waste plastic and at least one other process stream from a portion of the chemical recycling facility 10 can comprises at least 1, at least 2, at least 5, at least 10, at least 15, at least 20, at least 25, at least 30 weight percent and/or not more than 50, not more than 45, not more than 40, not more than 35, not more than 30, not more than 25, not more than 20, not more than 15, not more than 10, not more than 5, not more than 2, not more than 1 weight percent of components other than polyolefin, based on the total weight of the feed stream 116.

In one embodiment or in combination with any of the mentioned embodiments, the weight ratio of any one of the streams 104, 110, 114 to another in the combined stream can be at least 1:10, at least 1:9, at least 1:8, at least 1:7, at least 1:6, at least 1:5, at least 1:4, at least 1:3, at least 1:2, at least 1:1.5, or at least 1:1 and/or not more than 10:1, not more than 9:1, not more than 8:1, not more than 7:1, not more than 6:1, not more than 5:1, not more than 4:1, not more than 3:1, not more than 2:1, not more than 1.5:1, or not more than 1:1, or an amount in the range of from 1:10 to 10:1, 1:5 to 5:1, or 1:3 to 3:1.

As generally depicted in FIG. 5, the pyrolysis facility 60 includes a pyrolysis reactor 542 and a separation zone 544 for separating the product streams from the reactor effluent stream 117. While in the pyrolysis reactor, at least a portion of the feed may be subjected to a pyrolysis reaction that produces a pyrolysis effluent stream 117 comprising pyrolysis oil, pyrolysis gas, and pyrolysis residue. As used herein, the term "pyrolysis gas" refers to a composition obtained from pyrolysis that is gaseous at 25° C. As used herein, the term "pyrolysis oil" or "pyoil" refers to a composition obtained from pyrolysis that is liquid at 25° C. and 1 atm. As used herein, the term "pyrolysis residue" refers to a composition obtained from pyrolysis that is not pyrolysis gas or pyrolysis oil and that comprises predominantly pyrolysis char and pyrolysis heavy waxes. As used herein, the term "pyrolysis char" refers to a carbon-containing composition obtained from pyrolysis that is solid at 200° C. and 1 atm. As used herein, the term "pyrolysis heavy waxes," refers to C20+ hydrocarbons obtained from pyrolysis that are not pyrolysis char, pyrolysis gas, or pyrolysis oil.

Generally, pyrolysis is a process that involves the chemical and thermal decomposition of the introduced feed. Although all pyrolysis processes may be generally characterized by a reaction environment that is substantially free of oxygen, pyrolysis processes may be further defined, for example, by the pyrolysis reaction temperature within the reactor, the residence time in the pyrolysis reactor, the reactor type, the pressure within the pyrolysis reactor, and the presence or absence of pyrolysis catalysts.

In one embodiment or in combination with any of the mentioned embodiments, the pyrolysis reactor 542 can be, for example, a screw extruder, a tubular reactor, a tank, a stirred tank reactor, a riser reactor, a fixed bed reactor, a fluidized bed reactor, a rotary kiln, a vacuum reactor, a microwave reactor, or an autoclave. The pyrolysis reactor 542 can include a single reaction vessels, or two or more reaction vessels, of the same or different types, arranged in series or parallel.

In one embodiment or in combination with any of the mentioned embodiments, the pyrolysis reaction can involve heating and converting the feedstock in an atmosphere that is substantially free of oxygen or in an atmosphere that contains less oxygen relative to ambient air. For example, the atmosphere within the pyrolysis reactor 542 may comprise not more than 5, not more than 4, not more than 3, not more than 2, not more than 1, or not more than 0.5 volume percent of oxygen gas, based on the interior volume of the reactor.

In one embodiment or in combination with any of the mentioned embodiments, the feed stream 116 introduced into the pyrolysis reactor 542 may include a lift gas stream and/or a feed gas stream 115, which may be used to introduce the feedstock or feed stream 116 into the pyrolysis reactor 542 and/or facilitate various reactions within the pyrolysis reactor 542. For instance, the lift gas and/or the feed gas 115 may comprise, consist essentially of, or consist of nitrogen, carbon dioxide, and/or steam. The lift gas and/or feed gas may be added with the waste plastic or combined feed stream 116 prior to introduction into the pyrolysis reactor 542 and/or may be added directly to the pyrolysis reactor 542.

In one embodiment or in combination with any of the mentioned embodiments, pyrolysis may be carried out in the presence of a lift gas and/or a feed gas comprising, consisting essentially of, or consisting of steam. For example, pyrolysis may be carried out in the presence of a feed gas and/or lift gas comprising at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of steam, based on the total weight of the lift gas.

Additionally, or alternatively, in one embodiment or in combination with any of the mentioned embodiments, pyrolysis is carried out in the presence of a feed gas and/or a lift gas comprising not more than 99, not more than 90, not more than 80, not more than 70, not more than 60, not more than 50, not more than 40, not more than 30, or not more than 20 weight percent of steam, based on the total weight of the lift gas. Although not wishing to be bound by theory, it is believed that the presence of steam in the pyrolysis reactor 542 can facilitate the water-gas shift reaction, which can facilitate the removal of any halogen compounds that may be produced during the pyrolysis reaction. The steam may be added with the waste plastic or waste-plastic derived feed stream 116 prior to introduction into the pyrolysis reactor 542 and/or may be added directly to the pyrolysis reactor 542.

Additionally or alternatively, in one embodiment or in combination with any of the mentioned embodiments, pyrolysis may be carried out in the presence of a lift gas and/or a feed gas comprising, consisting essentially of, or consisting of a reducing gas, such as hydrogen, carbon monoxide, or a combination thereof. The reducing gas may function as a feed gas and/or a lift gas and may facilitate the introduction of the feed into the pyrolysis reactor. The reducing gas may be added with the waste plastic or waste-plastic derived feed stream 116 prior to introduction into the pyrolysis reactor 542 and/or may be added directly to the pyrolysis reactor 542.

In one embodiment or in combination with any of the mentioned embodiments, pyrolysis may be carried out in the presence of a feed gas and/or lift gas comprising at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of at least one reducing gas. Additionally or alternatively, in one embodiment or in combination with any of the mentioned embodiments, pyrolysis is carried out in the presence of a feed gas and/or a lift gas comprising not more than 99, not more than 90, not more than 80, not more than 70, not more than 60, not more than 50, not more than 40, not more than 30, or not more than 20 weight percent of at least one reducing gas, or it can be present in an amount in the range of from 5 to 99, 15 to 90, or 20 to 75 weight percent, based on the total weight of the stream.

In one embodiment or in combination with any of the mentioned embodiments, pyrolysis may be carried out in the presence of a feed gas and/or lift gas 115 comprising at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of hydrogen. Additionally, or alternatively, in one embodiment or in combination with any of the mentioned embodiments, pyrolysis is carried out in the presence of a feed gas and/or a lift gas comprising not more than 99, not more than 90, not more than 80, not more than 70, not more than 60, not more than 50, not more than 40, not more than 30, or not more than 20 weight percent of hydrogen, or it can be present in an amount in the range of from 5 to 70 weight percent, 10 to 60 weight percent, or 15 to 50 weight percent, based on the total weight of the stream.

In one embodiment or in combination with any of the mentioned embodiments, pyrolysis may be carried out in the presence of a feed gas and/or lift gas comprising at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of carbon monoxide. Additionally or alternatively, in one embodiment or in combination with any of the mentioned embodiments, pyrolysis is carried out in the presence of a feed gas and/or a lift gas comprising not more than 99, not more than 90, not more than 80, not more than 70, not more than 60, not more than 50, not more than 40, not more than 30, or not more than 20 weight percent of carbon monoxide, or it can be present in an amount in the range of from 5 to 70 weight percent, 10 to 60 weight percent, or 15 to 50 weight percent, based on the total weight of the stream.

Furthermore, the temperature in the pyrolysis reactor can be adjusted so as to facilitate the production of certain end products. In one embodiment or in combination with any of the mentioned embodiments, the pyrolysis temperature in the pyrolysis reactor can be at least 325° C., at least 350° C., at least 375° C., at least 400° C., at least 425° C., at least 450° C., at least 475° C., at least 500° C., at least 525° C., at least 550° C., at least 575° C., at least 600° C., at least 625° C., at least 650° C., at least 675° C., at least 700° C., at least 725° C., at least 750° C., at least 775° C., or at least 800° C.

Additionally or alternatively, in one embodiment or in combination with any of the mentioned embodiments, the pyrolysis temperature in the pyrolysis reactor can be no more than 1,100° C., not more than 1,050° C., not more than 1,000° C., not more than 950° C., not more than 900° C., not more than 850° C., not more than 800° C., not more than 750° C., not more than 700° C., not more than 650° C., not more than 600° C., not more than 550° C., not more than 525° C., not more than 500° C., not more than 475° C., not more than 450° C., not more than 425° C., or not more than 400° C.

More particularly, In one embodiment or in combination with any of the mentioned embodiments, the pyrolysis temperature in the pyrolysis reactor can range from 325 to 1,100° C., 350 to 900° C., 350 to 700° C., 350 to 550° C., 350 to 475° C., 425 to 1,100° C., 425 to 800° C., 500 to 1,100° C., 500 to 800° C., 600 to 1,100° C., 600 to 800° C., 650 to 1,000° C., or 650 to 800° C.

In one embodiment or in combination with any of the mentioned embodiments, the residence times of the feedstocks within the pyrolysis reactor can be at least 0.1, at least 0.2, at least 0.3, at least 0.5, at least 1, at least 1.2, at least 1.3, at least 2, at least 3, or at least 4 seconds. Alternatively, in one embodiment or in combination with any of the mentioned embodiments, the residence times of the feedstocks within the pyrolysis reactor can be at least 1, at least 2, at least 3, at least 4, at least 5, at least 6, at least 7, at least 8, at least 9, at least 10, at least 20, at least 30, at least 45, at least 60, at least 75, or at least 90 minutes. Additionally, or alternatively, in one embodiment or in combination with any of the mentioned embodiments, the residence times of the feedstocks within the pyrolysis reactor can be no more than 6, not more than 5, not more than 4, not more than 3, not more than 2 hours, not more than 90 minutes, not more than 60 minutes, not more than 45 minutes, or not more than 30 minutes, not more than 15 minutes, or not more than 45, not more than 30, not more than 25, or not more than 20 seconds, or it can be in the range of from about 0.1 to 45 seconds, 0.5 to 30 seconds, or 1 to 20 seconds, or 1 to 90 minutes, 5 to 45 minutes, or 7 to 15 minutes.

Furthermore, in one embodiment or in combination with any of the mentioned embodiments, the residence times of the feedstocks within the pyrolysis reactor can be no more than 100, not more than 90, not more than 80, not more than 70, not more than 60, not more than 50, not more than 40, not more than 30, not more than 20, not more than 10, not more than 9, not more than 8, not more than 7, not more than 6, not more than 5, not more than 4, not more than 3, not more than 2, or not more than 1 seconds. More particularly, in one embodiment or in combination with any of the mentioned embodiments, the residence times of the feedstocks within the pyrolysis reactor can range from 0.1 to 10 seconds, 0.5 to 10 seconds, 30 minutes to 4 hours, or 30 minutes to 3 hours, or 1 hour to 3 hours, or 1 hour to 2 hours.

In one embodiment or in combination with any of the mentioned embodiments, the pressure within the pyrolysis reactor can be maintained at a pressure of at least 0.1, at least 0.2, at least or 0.3 bar and/or not more than 60, not more than 50, not more than 40, not more than 30, not more than 20, not more than 10, not more than 8, not more than 5, not more than 2, not more than 1.5, or not more than 1.1 bar. As used herein, the term "bar" refers to gauge pressure, unless otherwise noted. In one embodiment or in combination with any of the mentioned embodiments, the pressure within the pyrolysis reactor can be at least about 10, at least 20, at least 30, at least 40, at least 50, at least 60, or at least 70 bar and/or not more than 100, not more than 95, not more than 90, not more than 85, not more than 80, not more than 75, not more than 70, not more than 65, or not more than 60 bar, or it can be in the range of from 10 to 100 bar, 20 to 80 bar, or 30 to 75 bar.

In one embodiment or in combination with any of the mentioned embodiments, the pressure within the pyrolysis reactor can be maintained at atmospheric pressure or within the range of 0.1 to 100 bar, or 0.1 to 60 bar, or 0.1 to 30 bar, or 0.1 to 10 bar, or 1.5 bar, 0.2 to 1.5 bar, or 0.3 to 1.1 bar.

In one embodiment or in combination with any of the mentioned embodiments, a pyrolysis catalyst may be introduced into the feedstock prior to introduction into the pyrolysis reactor 542 and/or introduced directly into the pyrolysis reactor 542. Furthermore, In one embodiment or in combination with any of the mentioned embodiments, the catalyst can comprise: (i) a solid acid, such as a zeolite (e.g., ZSM-5, Mordenite, Beta, Ferrierite, and/or zeolite-Y); (ii) a super acid, such as sulfonated, phosphated, or fluorinated forms of zirconia, titania, alumina, silica-alumina, and/or clays; (iii) a solid base, such as metal oxides, mixed metal oxides, metal hydroxides, and/or metal carbonates, particularly those of alkali metals, alkaline earth metals, transition metals, and/or rare earth metals; (iv) hydrotalcite and other clays; (v) a metal hydride, particularly those of alkali metals, alkaline earth metals, transition metals, and/or rare earth metals; (vi) an alumina and/or a silica-alumina; (vii) a homogeneous catalyst, such as a Lewis acid, a metal tetrachloroaluminate, or an organic ionic liquid; (viii) activated carbon; or (ix) combinations thereof.

In one embodiment or in combination with any of the mentioned embodiments, the pyrolysis catalyst can comprise a homogeneous catalyst or a heterogeneous catalyst.

In one embodiment or in combination with any of the mentioned embodiments, the pyrolysis catalyst can comprise a mesostructured catalyst, such as MCM-41, FSM-16, Al-SBA-15, or combinations thereof.

In one embodiment or in combination with any of the mentioned embodiments, the pyrolysis catalyst can comprise a silica-alumina, an alumina, a mordenite, a zeolite, a microporous catalyst, a macroporous catalyst, or a combination thereof.

In one embodiment or in combination with any of the mentioned embodiments, the pyrolysis reaction in the pyrolysis reactor occurs in the substantial absence of a catalyst. In such embodiments, a non-catalytic, heat-retaining inert additive may still be introduced into the pyrolysis reactor, such as sand, in order to facilitate the heat transfer within the reactor. Such catalyst-free pyrolysis processes may be referred to as "thermal pyrolysis."

In one embodiment or in combination with any of the mentioned embodiments, the pyrolysis reaction in the pyrolysis reactor 542 may occur in the substantial absence of a pyrolysis catalyst, at a temperature in the range of 350 to 550° C., at a pressure ranging from 0.1 to 100 bar, and at a residence time of 0.2 seconds to 4 hours, or 0.5 hours to 3 hours.

In one embodiment or in combination with any of the mentioned embodiments, the pyrolysis effluent 117 withdrawn from the reactor 542 may comprise at least 1, at least 5, at least 10, at least 15, at least 20, at least 25, at least 30, at least 35, at least 40, at least 45, at least 50, at least 55, at least 60, at least 65, at least 70, or at least 75 weight percent of the pyrolysis oil, which may be in the form of vapors in the pyrolysis effluent 117 upon exiting the heated reactor 542. Such vapors may be subsequently condensed into the resulting pyrolysis oil.

Additionally or alternatively, in one embodiment or in combination with any of the mentioned embodiments, the pyrolysis effluent 117 may comprise not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, or not more than 25 weight percent of the pyrolysis oil, which may be in the form of vapors in the pyrolysis effluent upon exiting the heated reactor. In one embodiment or in combination with any of the mentioned embodiments, the pyrolysis effluent may comprise in the range of 20 to 99 weight percent, 25 to 80 weight percent, 30 to 85 weight percent, 30 to 80 weight percent, 30 to 75 weight percent, 30 to 70 weight percent, or 30 to 65 weight percent of the pyrolysis oil.

In one embodiment or in combination with any of the mentioned embodiments, the pyrolysis effluent 117 may comprise at least 1, at least 5, at least 10, at least 15, at least 20, at least 25, at least 30, at least 35, at least 40, at least 45, at least 50, at least 55, at least 60, at least 65, at least 70, at least 75, or at least 80 weight percent of the pyrolysis gas. Additionally, or alternatively, in one embodiment or in combination with any of the mentioned embodiments, the pyrolysis effluent 117 may comprise not more than 99, not more than 95, not more than 90, not more than 85, not more than 80, not more than 75, not more than 70, not more than 65, not more than 60, not more than 55, not more than 50, or not more than 45 weight percent of the pyrolysis gas.

In one embodiment or in combination with any of the mentioned embodiments, the pyrolysis effluent 117 may comprise 1 to 90, 10 to 85 weight percent, 15 to 85 weight percent, 20 to 80 weight percent, 25 to 80 weight percent, 30 to 75 weight percent, or 35 to 75 weight percent of the pyrolysis gas.

In one embodiment or in combination with any of the mentioned embodiments, the pyrolysis effluent 117 may comprise at least 0.5, at least 1, at least 2, at least 3, at least 4, at least 5, at least 6, at least 7, at least 8, at least 9, or at least 10 weight percent of the pyrolysis residue. Additionally, or alternatively, in one embodiment or in combination with any of the mentioned embodiments, the pyrolysis effluent 117 may comprise not more than 60, not more than 50, not more than 40, not more than 30, not more than 25, not more than 20, not more than 15, not more than 10, not more than 9, not more than 8, not more than 7, not more than 6, or not more than 5 weight percent of the pyrolysis residue. In one embodiment or in combination with any of the mentioned embodiments, the pyrolysis effluent 117 may comprise in the range of 0.1 to 25 weight percent, 1 to 15 weight percent, 1 to 8 weight percent, or 1 to 5 weight percent of the pyrolysis residue.

In one embodiment or in combination with any of the mentioned embodiments, the pyrolysis effluent 117 may comprise not more than 15, not more than 14, not more than 13, not more than 12, not more than 11, not more than 10, not more than 9, not more than 8, not more than 7, not more than 6, not more than 5, not more than 4, not more than 3, not more than 2, not more than 1, or not more than 0.5 weight percent of free water. As used herein, "free water" refers to water previously added to the pyrolysis unit 60 and water generated in the pyrolysis unit 60.

The pyrolysis facility 60 described herein may produce a stream of pyrolysis oil 120, a stream of pyrolysis gas 118, and a stream of pyrolysis residue 122 that may be directly used in various downstream facilities and/or applications based on their formulations. The various characteristics and properties of the pyrolysis oil, pyrolysis gas, and pyrolysis residue are described below. It should be noted that, while all of the following characteristics and properties may be listed separately, it is envisioned that each of the following characteristics and/or properties of the pyrolysis gas, pyrolysis oil, and/or pyrolysis residue are not mutually exclusive and may be combined and present in any combination.

In one embodiment or in combination with any of the mentioned embodiments, the pyrolysis oil stream 120 may predominantly comprise hydrocarbons having from 4 to 30 carbon atoms per molecule (e.g., C4 to C30 hydrocarbons). As used herein, the term "Cx" or "Cx hydrocarbon," refers to a hydrocarbon compound including "x" total carbons per molecule, and encompasses all olefins, paraffins, aromatics, heterocyclic, and isomers having that number of carbon atoms. For example, each of normal, and isobutane, as well as butenes and butadiene molecules would fall under the general description "C4."

In one embodiment or in combination with any of the mentioned embodiments, the pyrolysis oil stream 120 may have a C4-C30 hydrocarbon content of at least 55, at least 60, at least 65, at least 70, at least 75, at least 80, at least 85, at least 90, or at least 95 weight percent based on the total weight of the pyrolysis oil stream 120.

In one embodiment or in combination with any of the mentioned embodiments, the pyrolysis oil stream 120 can predominantly comprise C5 to C25 hydrocarbons, C5 to C22 hydrocarbons, or C5 to C20 hydrocarbons. For example, In one embodiment or in combination with any of the mentioned embodiments, the pyrolysis oil stream 120 may comprise at least 55, at least 60, at least 65, at least 70, at least 75, at least 80, at least 85, at least 90, or at least 95 weight percent of C5 to C25 hydrocarbons, C5 to C22 hydrocarbons, or C5 to C20 hydrocarbons, based on the total weight of the pyrolysis oil stream 120.

In one embodiment or in combination with any of the mentioned embodiments, the pyrolysis oil stream 120 may have a C5-C12 hydrocarbon content of at least 5, at least 10, at least 15, at least 20, at least 25, at least 30, at least 35, at least 40, at least 45, at least 50, or at least 55 weight percent based on the total weight of the pyrolysis oil stream 120. Additionally or alternatively, in one embodiment or in combination with any of the mentioned embodiments, the pyrolysis oil stream 120 may have a C5-C12 hydrocarbon content of not more than 95, not more than 90, not more than 85, not more than 80, not more than 75, not more than 70, not more than 65, not more than 60, not more than 55, or not more than 50 weight percent. In one embodiment or in combination with any of the mentioned embodiments, the pyrolysis oil stream 120 may have a C5-C12 hydrocarbon content in the range of 10 to 95 weight percent, 20 to 80 weight percent, or 35 to 80 weight percent.

In one embodiment or in combination with any of the mentioned embodiments, the pyrolysis oil stream 120 may have a C13-C23 hydrocarbon content of at least 1, at least 5, at least 10, at least 15, at least 20, at least 25, or at least 30 weight percent based on the total weight of the pyrolysis oil stream 120. Additionally, or alternatively, in one embodiment or in combination with any of the mentioned embodiments, the pyrolysis oil stream 120 may have a C13-C23 hydrocarbon content of not more than 80, not more than 75, not more than 70, not more than 65, not more than 60, not more than 55, not more than 50, not more than 45, or not more than 40 weight percent. In one embodiment or in combination with any of the mentioned embodiments, the pyrolysis oil stream 120 may have a C13-C23 hydrocarbon content in the range of 1 to 80 weight percent, 5 to 65 weight percent, or 10 to 60 weight percent.

In one embodiment or in combination with any of the mentioned embodiments, the pyrolysis oil stream 120 may have a C24+ hydrocarbon content of at least 1, at least 2, at least 3, at least 4, or at least 5 and/or not more than 15, not more than 10, not more than 9, not more than 8, not more than 7, or not more than 6 weight percent based on weight of the pyrolysis oil. In one embodiment or in combination with any of the mentioned embodiments, the pyrolysis oil stream 120 may have a C24+ hydrocarbon content in the range of 1 to 15 weight percent, 3 to 15 weight percent, or 5 to 10 weight percent.

In one embodiment or in combination with any of the mentioned embodiments, the two aliphatic hydrocarbons (branched or unbranched alkanes and alkenes, and alicyclics) having the highest concentration in the pyrolysis oil stream 120 are in a range of C5-C18, C5-C16, C5-C14, C5-C10, or C5-C8, inclusive.

In one embodiment or in combination with any of the mentioned embodiments, the pyrolysis oil stream 120 may also include various amounts of olefins and aromatics. In one embodiment or in combination with any of the mentioned embodiments, the pyrolysis oil stream 120 comprises at least 1, at least 5, at least 10, at least 15, at least 20, at least 25, at least 30, at least 35, or at least 40 weight percent of olefins and/or aromatics based on the total weight of the pyrolysis oil. Additionally, or alternatively, in one embodiment or in combination with any of the mentioned embodiments, the pyrolysis oil stream 120 may include not more than 90, not more than 80, not more than 70, not more than 60, not more than 50, not more than 45, not more than 40, not more than 35, not more than 30, not more than 25, not more than 20, not more than 15, not more than 10, not more than 5, or not more than 1 weight percent of olefins and/or aromatics.

In one embodiment or in combination with any of the mentioned embodiments, the pyrolysis oil stream 120 may also include various amounts of olefins. In one embodiment or in combination with any of the mentioned embodiments, the pyrolysis oil stream 120 comprises at least 1, at least 5, at least 10, at least 15, at least 20, at least 25, at least 30, at least 35, at least 40, at least 45, at least 50, at least 55, at least 60, or at least 65 weight percent of olefins based on the total weight of the pyrolysis oil stream 120. Additionally or alternatively, in one embodiment or in combination with any of the mentioned embodiments, the pyrolysis oil stream 120 may include not more than 90, not more than 80, not more than 70, not more than 60, not more than 50, not more than 45, not more than 40, not more than 35, not more than 30, not more than 25, not more than 20, not more than 15, not more than 10, not more than 5, or not more than 1 weight percent of olefins, or olefins may be present in an amount in the range of from 1 to 90 weight percent, 5 to 80 weight percent, or 15 to 70 weight percent, based on the total weight of the stream.

In one embodiment or in combination with any of the mentioned embodiments, the pyrolysis oil stream 120 may have an aromatic content of not more than 25, not more than 20, not more than 15, not more than 10, not more than 9, not more than 8, not more than 7, not more than 6, not more than 5, not more than 4, not more than 3, not more than 2, or not more than 1 weight percent based on the total weight of the pyrolysis oil stream 120. As used herein, the term "aromatics" refers to the total amount (in weight) of any compounds containing an aromatic moiety, such as benzene, toluene, xylene, and styrene.

In one embodiment or in combination with any of the mentioned embodiments, the pyrolysis oil stream 120 may have a naphthene (e.g., cyclic aliphatic hydrocarbons) content of at least 1, at least 2, at least 3, at least 4, at least 5, at least 6, at least 7, at least 8, at least 9, at least 10, at least 11, at least 12, at least 13, at least 14, or at least 15 and/or not more than 50, not more than 45, not more than 40, not more than 35, not more than 30, not more than 25, or not more than 20 weight percent based on the total weight of the pyrolysis oil stream 120, or an amount in the range of from 1 to 50 weight percent, 2 to 40 weight percent, or 5 to 25 weight percent, based on the total weight of the stream.

In one embodiment or in combination with any of the mentioned embodiments, the pyrolysis oil stream 120 may have a paraffin (e.g., linear or branch alkanes) content of at least 5, at least 10, at least 15, at least 20, at least 25, at least 30, at least 35, at least 40, at least 45, at least 50, at least 55, at least 60, or at least 65 weight percent based on the total weight of the pyrolysis oil stream 120. Additionally, or alternatively, in one embodiment or in combination with any of the mentioned embodiments, the pyrolysis oil stream 120 may have a paraffin content of not more than 99, not more than 97, not more than 95, not more than 93, not more than 90, not more than 85, not more than 80, not more than 75, not more than 70, not more than 65, not more than 60, not more than 55, not more than 50, not more than 45, not more than 40, not more than 35, or not more than 30 weight percent. In one embodiment or in combination with any of the mentioned embodiments, the pyrolysis oil stream 120 may have a paraffin content in the range of 25 to 90 weight percent, 35 to 90 weight percent, or 50 to 80 weight percent, based on the total weight of the stream.

In one embodiment or in combination with any of the mentioned embodiments, the weight ratio of paraffin to naphthene can be at least 1:1, at least 1.5:1, at least 2:1, at least 2.2:1, at least 2.5:1, at least 2.7:1, at least 3:1, at least 3.3:1, at least 3.5:1, at least 3.75:1, at least 4:1, at least 4.25:1, at least 4.5:1, at least 4.75:1, at least 5:1, at least 6:1, at least 7:1, at least 8:1, at least 9:1, at least 10:1, at least 13:1, at least 15:1, or at least 17:1 based on the total weight of the pyrolysis oil.

In one embodiment or in combination with any of the mentioned embodiments, the weight ratio of paraffin and naphthene combined to aromatics can be at least 1:1, at least 1.5:1, at least 2:1, at least 2.5:1, at least 2.7:1, at least 3:1, at least 3.3:1, at least 3.5:1, at least 3.75:1, at least 4:1, at least 4.5:1, at least 5:1, at least 7:1, at least 10:1, at least 15:1, at least 20:1, at least 25:1, at least 30:1, at least 35:1, or at least 40:1 based on the total weight of the pyrolysis oil stream 120.

In one embodiment or in combination with any of the mentioned embodiments, the pyrolysis oil stream 120 may have a combined paraffin and olefin content of at least 5, at least 10, at least 15, at least 20, at least 25, at least 30, at least 35, at least 40, or at least 45 and/or not more than 99, not more than 90, not more than 85, not more than 80, not more than 75, or not more than 70 weight percent based on the total weight of the pyrolysis oil stream 120. In one embodiment or in combination with any of the mentioned embodiments, the pyrolysis oil stream 120 may have a combined paraffin and olefin content in the range of 25 to 90 weight percent, 35 to 90 weight percent, or 50 to 80 weight percent, based on the total weight of the stream.

In one embodiment or in combination with any of the mentioned embodiments, the pyrolysis oil stream 120 can include oxygenated compounds or polymers in amount of at least 0.01, at least 0.1, at least 1, at least 2, or at least 5 and/or not more than 20, not more than 15, not more than 14, not more than 13, not more than 12, not more than 11, not more than 10, not more than 9, not more than 8, not more than 7, or not more than 6 weight percent based on the total weight of a pyrolysis oil stream 120, or it can be in the range of from 0.01 to 20 weight percent, 0.1 to 15 weight percent, or 1 to 10 weight percent, based on the total weight of the stream. Oxygenated compounds and polymers are those containing an oxygen atom.

In one embodiment or in combination with any of the mentioned embodiments, the pyrolysis oil stream 120 can include heteroatom compounds or polymers in amount of not more than 20, not more than 15, not more than 10, not more than 9, not more than 8, not more than 7, not more than 6, not more than 5, not more than 4, not more than 3, not more than 2, not more than 1, not more than 0.5, or not more than 0.1 weight percent based on the total weight of a pyrolysis oil stream 120. A heteroatom compound or polymer includes any compound or polymer containing nitrogen, sulfur, or phosphorus. Any other atom is not regarded as a heteroatom for purposes of determining the quantity of heteroatoms, heterocompounds, or heteropolymers present in the pyrolysis oil stream 120.

In one embodiment or in combination with any of the mentioned embodiments, the pyrolysis oil stream 120 comprises not more than 5, not more than 4, not more than 3, not more than 2, not more than 1, or not more than 0.5 weight percent of water based on the total weight of the pyrolysis oil stream 120.

In one embodiment or in combination with any of the mentioned embodiments, the pyrolysis oil stream 120 comprises less than 5, not more than 4, not more than 3, not more than 2, not more than 1, not more than 0.5, not more than 0.4, not more than 0.3, not more than 0.2, or not more than 0.1 weight percent of solids based on the total weight of the pyrolysis oil stream 120.

In one embodiment or in combination with any of the mentioned embodiments, the pyrolysis oil comprises at least 50, at least 55, at least 60, at least 65, at least 70, at least 75, at least 80, or at least 85 and/or not more than 99, not more than 95, not more than 90, not more than 85, not more than 80, not more than 75, not more than 70, not more than 65, or not more than 60 weight percent of atomic carbon based on the total weight of the pyrolysis oil stream 120.

In one embodiment or in combination with any of the mentioned embodiments, the pyrolysis oil stream 120 comprises at least at least 5, at least 6, at least 7, at least 8, at least 9, or at least 10 and/or not more than 30, not more than 25, not more than 20, not more than 15, not more than 14, not more than 13, not more than 12, or not more than 11 weight percent of atomic hydrogen based on the total weight of the pyrolysis oil stream 120, or it can be present in an amount in the range of from 5 to 30 weight percent, 7 to 20 weight percent, or 10 to 15 weight percent, based on the total weight of the stream.

In one embodiment or in combination with any of the mentioned embodiments, the pyrolysis oil stream 120 comprises not more than 10, not more than 9, not more than 8, not more than 7, not more than 6, not more than 5, not more than 4, not more than 3, not more than 2, not more than 1, or not more than 0.5 weight percent of atomic oxygen based on the total weight of the pyrolysis oil stream 120.

In one embodiment or in combination with any of the mentioned embodiments, the pyrolysis oil stream 120 comprises less than 1,000, not more than 500, not more than 400, not more than 300, not more than 200, not more than 100, or not more than 50 ppm of atomic sulfur based on the total weight of the pyrolysis oil stream 120.

In one embodiment or in combination with any of the mentioned embodiments, the pyrolysis oil stream 120 comprises less than 1,000, not more than 500, not more than 400, not more than 300, not more than 200, not more than 100, not more than or not more than 50 ppm of metals based on the total weight of the pyrolysis oil stream 120.

In one embodiment or in combination with any of the mentioned embodiments, the pyrolysis oil stream 120 comprises less than 1,000, not more than 500, not more than 400, not more than 300, not more than 200, not more than 100, or not more than 50 ppm of metals based on the total weight of the pyrolysis oil stream 120.

In one embodiment or in combination with any of the mentioned embodiments, the pyrolysis oil stream 120 comprises less than 1,000, not more than 500, not more than 400, not more than 300, not more than 200, not more than 100, or not more than 50 ppm of alkali metals and/or alkaline earth metals based on the total weight of the pyrolysis oil stream 120.

It should be noted that all of the disclosed hydrocarbon weight percentages may be determined using gas chromatography-mass spectrometry (GC-MS).

In one embodiment or in combination with any of the mentioned embodiments, the pyrolysis oil stream 120 may have a density at 15° C. of at least 0.6, at least 0.65, or at least 0.7 and/or not more than 1, not more than 0.95, not more than 0.9, or not more than 0.9 g/cm3. In one embodiment or in combination with any of the mentioned embodiments, the pyrolysis oil stream 120 has a density at 15° C. at a range of 0.6 to 1 g/cm3, 0.65 to 0.95 g/cm3, or 0.7 to 0.9 g/cm3.

In one embodiment or in combination with any of the mentioned embodiments, the pyrolysis oil stream 120 may have an API gravity at 15° C. of at least 28, at least 29, at least 30, at least 31, at least 32, or at least 33 and/or not more than 50, not more than 49, not more than 48, not more than 47, not more than 46, or not more than 45. In one embodiment or in combination with any of the mentioned embodiments, the pyrolysis oil stream 120 has an API gravity at 15° C. at a range of 28 to 50, 29 to 58, or 30 to 44.

In one embodiment or in combination with any of the mentioned embodiments, the pyrolysis oil stream 120 may have a mid-boiling point of at least 75° C., at least 80° C., at least 85° C., at least 90° C., at least 95° C., at least 100° C., at least 105° C., at least 110° C., or at least 115° C. and/or not more than 250° C., not more than 245° C., not more than 240° C., not more than 235° C., not more than 230° C., not more than 225° C., not more than 220° C., not more than 215° C., not more than 210° C., not more than 205° C., not more than 200° C., not more than 195° C., not more than 190° C., not more than 185° C., not more than 180° C., not more than 175° C., not more than 170° C., not more than 165° C., not more than 160° C., not more than 155° C., not more than 150° C., not more than 145° C., not more than 140° C., not more than 135° C., not more than 130° C., not more than 125° C., or not more than 120° C., as measured according to ASTM D-5399. In one embodiment or in combination with any of the mentioned embodiments, the pyrolysis oil stream 120 may have a mid-boiling point in the range of 75 to 250° C., 90 to 225° C., or 115 to 190° C. As used herein, "mid-boiling point" refers to the median boiling point temperature of the pyrolysis oil, where 50 percent by volume of the pyrolysis oil boils above the mid-boiling point and 50 percent by volume boils below the mid-boiling point.

In one embodiment or in combination with any of the mentioned embodiments, the boiling point range of the pyrolysis oil stream 120 may be such that not more than 10 percent of the pyrolysis oil has a final boiling point (FBP) of at least 250° C., at least 280° C., at least 290° C., at least 300° C., or at least 310° C., as measured according to ASTM D-5399.

Turning to the pyrolysis gas stream 118, the pyrolysis gas stream 118 can have a methane content of at least 1, at least 2, at least 3, at least 4, at least 5, at least 6, at least 7, at least 8, at least 9, at least 10, at least 11, at least 12, at least 13, at least 14, or at least 15 and/or not more than 50, not more than 45, not more than 40, not more than 35, not more than 30, not more than 25, or not more than 20 weight percent based on the total weight of the pyrolysis gas. In one embodiment or in combination with any of the mentioned embodiments, the pyrolysis gas stream 118 can have a methane content in the range of 1 to 50 weight percent, 5 to 50 weight percent, or 15 to 45 weight percent.

In one embodiment or in combination with any of the mentioned embodiments, the pyrolysis gas stream 118 can have a C3 hydrocarbon content of at least 1, at least 2, at least 3, at least 4, at least 5, at least 6, at least 7, at least 8, at least 9, at least 10, at least 15, at least 20, or at least 25 and/or not more than 50, not more than 45, not more than 40, not more than 35, or not more than 30 weight percent based on the total weight of the pyrolysis gas. In one embodiment or in combination with any of the mentioned embodiments, the pyrolysis gas stream 118 can have a C3 hydrocarbon content in the range of 1 to 50 weight percent, 5 to 50 weight percent, or 20 to 50 weight percent.

In one embodiment or in combination with any of the mentioned embodiments, the pyrolysis gas stream 118 can have a C4 hydrocarbon content of at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or at least 25 and/or not more than 50, not more than 45, not more than 40, not more than 35, or not more than 30 weight percent based on the total weight of the pyrolysis gas stream 118. In one embodiment or in combination with any of the mentioned embodiments, the pyrolysis gas stream 118 can have a C4 hydrocarbon content in the range of 1 to 50 weight percent, 5 to 50 weight percent, or 20 to 50 weight percent.

In one embodiment or in combination with any of the mentioned embodiments, the pyrolysis gas stream 118 can have a combined C3 and C4 hydrocarbon content (including all hydrocarbons having carbon chain lengths of C3 or C4) of at least 5, at least 10, at least 15, at least 20, at least 25, at least 30, at least 35, at least 40, at least 45, at least 50, at least 55, or at least 60 and/or not more than 99, not more than 95, not more than 90, not more than 85, not more than 80, not more than 75, not more than 70, or not more than 65 weight percent based on the total weight of the pyrolysis gas. In one embodiment or in combination with any of the mentioned embodiments, the pyrolysis gas stream 118 can have a combined C3/C4 hydrocarbon content in the range of 10 to 90 weight percent, 25 to 90 weight percent, or 25 to 80 weight percent.

In one embodiment or in combination with any of the mentioned embodiments, the pyrolysis gas stream 118 comprises a sulfur content of at least 1, at least 2, at least 3, at least 4, at least 5, at least 6, at least 7, at least 8, at least 9, at least 10, at least 11, at least 12, at least 13, at least 14, or at least 15 and/or not more than 1,000, not more than 500, not more than 400, not more than 300, not more than 200, or not more than 100 ppm, or it can be in the range of from 1 to 1000 ppm, 2 to 500 ppm, or 3 to 100 ppm, based on the total weight of the stream.

Although not wishing to be bound by theory, it is believed that the production of C3 and C4 hydrocarbons may be facilitated by higher pyrolysis temperatures (e.g., those exceeding 550° C.), the selection of specific catalyst types, or the absence of specific catalysts (e.g., ZSM-5).

Turning to the pyrolysis residue stream 122, In one embodiment or in combination with any of the mentioned embodiments, the pyrolysis residue stream 122 comprises at least 20, at least 25, at least 30, at least 35, at least 40, at least 45, at least 50, at least 55, at least 60, at least 65, at least 70, at least 75, at least 80, or at least 85 weight percent of C20+ hydrocarbons based on the total weight of the pyrolysis residue stream 122. As used herein, "C20+ hydrocarbon" refers to hydrocarbon compounds containing at least 20 total carbons per molecule, and encompasses all olefins, paraffins, and isomers having that number of carbon atoms.

In one embodiment or in combination with any of the mentioned embodiments, the pyrolysis residue stream 122 comprises not more than 15, not more than 14, not more than 13, not more than 12, not more than 11, not more than 10, not more than 9, not more than 8, not more than 7, not more than 6, not more than 5, not more than 4, not more than 3, not more than 2, not more than 1, or not more than 0.5 weight percent of water based on the total weight of the pyrolysis residue stream 122.

In one embodiment or in combination with any of the mentioned embodiments, the pyrolysis residue stream 122 comprises at least 1, at least 2, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of carbon-containing solids based on the total weight of the pyrolysis residue stream 122.

Additionally, or alternatively, in one embodiment or in combination with any of the mentioned embodiments, the pyrolysis residue stream 122 comprises not more than 99, not more than 90, not more than 80, not more than 70, not more than 60, not more than 50, not more than 40, not more than 30, not more than 20, not more than 10, not more than 9, not more than 8, not more than 7, not more than 6, not more than 5, or not more than 4 weight percent of carbon-containing solids. As used herein, "carbon-containing solids" refer to carbon-containing compositions that are derived from pyrolysis and are solid at 25° C. and 1 atm. In one embodiment or in combination with any of the mentioned embodiments, the carbon-containing solids comprise at least 20, at least 30, at least 40, at least 50, at least 60, at least 70, at least 80, or at least 90 weight percent of carbon based on the total weight of the carbon-containing solids.

In one embodiment or in combination with any of the mentioned embodiments, the pyrolysis residue stream 122 comprises a C:H atomic ratio that is greater than or equal to paraffins or greater than or equal to 0.25:1, greater than or equal to 0.3:1, greater than or equal to 0.35:1, greater than or equal to 0.4:1, or greater than or equal to 0.45:1.

In one embodiment or in combination with any of the mentioned embodiments, the separated pyrolysis residue stream 122 comprises not more than 40, not more than 30, not more than 20, not more than 10, not more than 5, not more than 4, not more than 3, not more than 2, or not more than 1 weight percent of pyrolysis oil based on the total weight of the pyrolysis residue stream 122.

As shown in FIG. 5, the pyrolysis gas stream 118, the pyoil stream 120, and the pyrolysis residue stream 122 withdrawn from the pyrolysis facility 60 may be routed to one or more of (i) a cracker facility 70, (ii) an energy generation/production facility 80, (iii) a POX gasification facility 50; and (iv) solidification facility 40. In one embodiment or in combination with any of the mentioned embodiments, one or more of the pyrolysis oil, pyrolysis gas, and/or pyrolysis residue may only be routed to one of the facilities (i) through (iv), while, in other embodiments, one or more of the pyrolysis oil, pyrolysis gas, and/or pyrolysis residue may be routed to two or more of the facilities (i) through (iv).

In particular, as shown in FIG. 5, all, or a portion, of the pyrolysis gas 118 can be routed to at least one of (i) an energy generation/production facility 80; (ii) a cracker facility 70; and (iii) a POX gasification facility 50. In one embodiment or in combination with any of the mentioned embodiments, all, or a portion, of the pyoil 120 can be routed to at least one of (i) an energy generation/production facility 80; (ii) a cracker facility 70; (iii) a POX gasification facility 50; and (iv) a solidification facility 40. In one embodiment or in combination with any of the mentioned embodiments, all, or a portion, of the pyrolysis residue 122 can be routed to at least one of (i) an energy generation/production facility 80; (ii) a solidification facility 40; and (iii) a POX gasification facility 50.

Optionally, one or more of the pyrolysis gas stream 118, the pyoil stream 120, and pyrolysis residue steam 122 may be sent to an industrial landfill or other processing facility. In one embodiment or in combination with any of the mentioned embodiments, each of the pyrolysis gas stream 118, the pyoil stream 120, and pyrolysis residue steam 122 can have a recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 percent, based on the total weight of the respective stream.

Cracking Facility

In one embodiment or in combination with any of the mentioned embodiments, at least a portion of one or more streams from the pyrolysis facility 60 may be introduced into a cracking facility 70. As used herein, the term "cracking" refers to breaking down complex organic molecules into simpler molecules by the breaking of carbon-carbon bonds. A "cracking facility 70" is a facility that includes all equipment, lines, and controls necessary to carry out cracking of a feedstock derived from waste plastic. As used herein, the terms "cracker" and "cracking" are used interchangeably.

Figure 6:
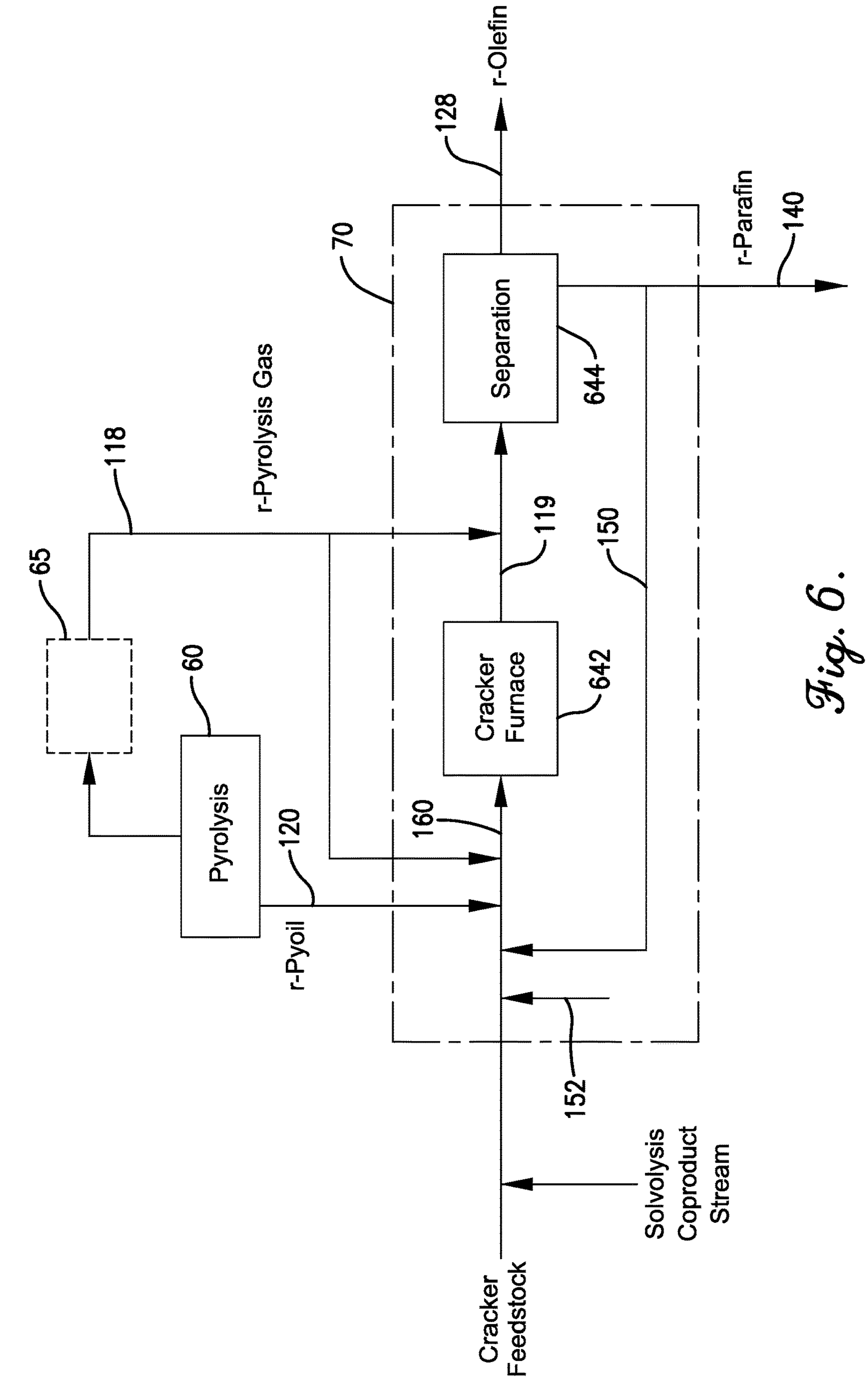
FIG. 6 is a schematic block flow diagram illustrating the main steps of a cracking facility according to embodiments of the present technology.

Turning now to FIG. 6, a cracking facility 70 configured according to one or more embodiments of the present technology is shown. As shown in FIG. 6, the cracking facility 70 includes at least one cracker furnace 642 for thermally cracking a cracker feed stream 160 to form a cracker effluent 119, as well as a downstream separation zone 644, which includes equipment used to process the effluent of the cracker furnace(s) and form at least one olefin stream 128 and at least one paraffin stream 140.

In one embodiment or in combination with any of the mentioned embodiments, at least a portion of a pyrolysis gas stream 118 from a pyrolysis facility 60 (which may be formed and/or may have a composition as discussed previously) and/or the pyoil stream 120 (which may be formed and/or may have a composition as discussed previously) can be introduced to the cracker unit 70. In one embodiment or in combination with any of the mentioned embodiments, at least a portion of the pyoil stream 120 may be introduced into at least one inlet of the cracker furnace 642, while at least a portion of the pyrolysis gas stream 118 can be introduced into a location upstream and/or downstream of the cracker furnace 642.

In one embodiment or in combination with any of the mentioned embodiments, one or more solvolysis coproduct stream 110 may also be introduced into the inlet of the cracking facility 70, alone, or in combination with one or more of the other streams. The solvolysis coproduct stream 110 may include a single solvolysis coproduct, or two or more different solvolysis coproducts, as discussed in detail previously.

As shown in FIG. 6, a stream of pyrolysis gas 118 and/or pyoil 120, and/or solvolysis coproduct stream 110 may be introduced into a cracker facility 70 along with or as the cracker feedstock to form the cracker feed stream 160. In one embodiment or in combination with any of the mentioned embodiments, the cracker feedstock can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of pyrolysis gas, pyoil, or pyrolysis gas and pyoil combined, based on the total weight of the cracker feed stream 160.

Alternatively, or in addition, the cracker feed stream 160 can comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, or not more than 20 weight percent of pyrolysis gas, pyoil, or a combination of pyrolysis gas and pyoil, based on the total weight of the cracker feed stream 160, or it can be present in an amount in the range of from 5 to 95 weight percent, 10 to 90 weight percent, 15 to 85 weight percent, or 20 to 80 weight percent, based on the total weight of the stream.

In one embodiment or in combination with any of the mentioned embodiments, the cracker feed stream 160 can include at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent and/or not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, or not more than 20 weight percent of a hydrocarbon feed other than pyrolysis gas and pyrolysis oil, based on the total weight of the cracker feed stream 160, or it can include an amount in the range of from 5 to 95 weight percent, 10 to 90 weight percent, 20 to 80 weight percent, 25 to 75 weight percent, or 30 to 70 weight percent, based on the total weight of the stream.

In one embodiment or in combination with any of the mentioned embodiments, the cracker feed stream 160 may comprise a predominantly C2 to C4 hydrocarbon containing composition, or a predominantly C5 to C22 hydrocarbon containing composition. As used herein, the term "predominantly C2 to C4 hydrocarbon," refers to a stream or composition containing at least 50 weight percent of C2 to C4 hydrocarbon components. Examples of specific types of C2 to C4 hydrocarbon streams or compositions include propane, ethane, butane, and LPG.

In one embodiment or in combination with any of the mentioned embodiments, the cracker feed stream 160 may comprise at least 50, or at least 55, or at least 60, or at least 65, or at least 70, or at least 75, or at least 80, or at least 85, or at least 90, or at least 95, in each case weight percent based on the total weight of the feed, and/or not more than 100, or not more than 99, or not more than 95, or not more than 92, or not more than 90, or not more than 85, or not more than 80, or not more than 75, or not more than 70, or not more than 65, or not more than 60, in each case weight percent C2 to C4 hydrocarbons or linear alkanes, based on the total weight of the feed. The cracker feed can comprise predominantly propane, predominantly ethane, predominantly butane, or a combination of two or more of these components.

In one embodiment or in combination with any of the mentioned embodiments, the cracker feed stream 160 may comprise a predominantly C5 to C22 hydrocarbon containing composition. As used herein, "predominantly C5 to C22 hydrocarbon" refers to a stream or composition comprising at least 50 weight percent of C5 to C22 hydrocarbon components. Examples include gasoline, naphtha, middle distillates, diesel, kerosene.

In one embodiment or in combination with any of the mentioned embodiments, the cracker feed stream 160 may comprise at least 20, or at least 25, or at least 30, or at least 35, or at least 40, or at least 45, or at least 50, or at least 55, or at least 60, or at least 65, or at least 70, or at least 75, or at least 80, or at least 85, or at least 90, or at least 95, in each case weight percent and/or not more than 100, or not more than 99, or not more than 95, or not more than 92, or not more than 90, or not more than 85, or not more than 80, or not more than 75, or not more than 70, or not more than 65, or not more than 60, in each case weight percent C5 to C22, or C5 to C20 hydrocarbons, based on the total weight of the stream 160, or it can be present in an amount in the range of from 20 to 99 weight percent, 25 to 95 weight percent, 30 to 90 weight percent, or 35 to 85 weight percent, based on the total weight of the stream In one embodiment or in combination with any of the mentioned embodiments, the cracker feed stream 160 may have a C15 and heavier (C15+) content of at least 0.5, or at least 1, or at least 2, or at least 5, in each case weight percent and/or not more than 40, or not more than 35, or not more than 30, or not more than 25, or not more than 20, or not more than 18, or not more than 15, or not more than 12, or not more than 10, or not more than 5, or not more than 3, in each case weight percent, based on the total weight of the feed, or it can be in the range of from 0.5 to 40 weight percent, 1 to 25 weight percent, or 2 to 30 weight percent, based on the total weight of the stream.

In one embodiment or in combination with any of the mentioned embodiments, the cracker feed stream 160 introduced into the cracker furnace 642 can comprise vacuum gas oil (VGO), hydrogenated vacuum gas oil (HVGO), or atmospheric gas oil (AGO). In one embodiment or in combination with any of the mentioned embodiments, the cracker feed stream 160 introduced into the cracker furnace 642 can comprise at least 5, at least 10, at least 15, at least 20, at least 25, at least 30, at least 35, at least 40, at least 45, at least 50, at least 55, at least 60, at least 65, at least 70, at least 75, at least 80, at least 85, or at least 90 and/or not more than 99, not more than 95, not more than 90, not more than 85, not more than 80, not more than 75, not more than 70, not more than 65, not more than 60, not more than 55, or not more than 50 weight percent of at least one gas oil, based on the total weight of the stream 160, or it could be present in an amount in the range of from 5 to 95 weight percent, 10 to 90 weight percent, 20 to 80 weight percent, or 25 to 75 weight percent, based on the total weight of the stream.

In one embodiment or in combination with any of the mentioned embodiments, the cracker furnace 642 can comprise a gas furnace. A gas furnace is a furnace having at least one coil which receives (or operated to receive or configured to receive), at the inlet of the coil at the entrance to the convection zone, a predominately vapor-phase feed (more than 50 percent of the weight of the feed is vapor) ("gas coil"). In one embodiment or in combination with any of the mentioned embodiments, the gas coil can receive a predominately C2-C4 feedstock, or a predominately a C2-C3 feedstock to the inlet of the coil in the convection section, or alternatively, having at least one coil receiving more than 50 weight percent ethane and/or more than 50 percent propane and/or more than 50 percent LPG, or in any one of these cases at least 60 weight percent, or at least 70 weight percent, or at least 80 weight percent, based on the weight of the cracker feed to the coil, or alternatively based on the weight of the cracker feed to the convection zone.

When the cracker furnace 642 is a gas furnace, the furnace may have more than one gas coil. In one embodiment or in combination with any of the mentioned embodiments, at least 25 percent of the coils, or at least 50 percent of the coils, or at least 60 percent of the coils, or all the coils in the convection zone or within a convection box 758 of the furnace are gas coils. In one embodiment or in combination with any of the mentioned embodiments, the gas coil receives, at the inlet of the coil at the entrance to the convection zone, a vapor-phase feed in which at least 60 weight percent, or at least 70 weight percent, or at least 80 weight percent, or at least 90 weight percent, or at least 95 weight percent, or at least 97 weight percent, or at least 98 weight percent, or at least 99 weight percent, or at least 99.5 weight percent, or at least 99.9 weight percent of feed is vapor.

In one embodiment or in combination with any of the mentioned embodiments, in the cracker furnace 642 can comprise a split furnace. A split furnace is a type of gas furnace. A split furnace contains at least one gas coil and at least one liquid coil within the same furnace, or within the same convection zone, or within the same convection box 758. A liquid coil is a coil which receives, at the inlet of coil at the entrance to the convection zone, a predominately liquid phase feed (more than 50 percent of the weight of the feed is liquid) ("liquid coil").

In one embodiment or in combination with any of the mentioned embodiments, the cracker feed stream can be cracked in a thermal gas cracker.

In one embodiment or in combination with any of the mentioned embodiments, the cracker feed stream can be cracked in a thermal steam gas cracker in the presence of steam. Steam cracking refers to the high-temperature cracking (decomposition) of hydrocarbons in the presence of steam.

In one embodiment or in combination with any of the mentioned embodiments, when the pyoil or pyrolysis gas is combined with another feed stream, such a combination may occur upstream of, or within, the cracking furnace. Alternatively, the pyoil containing feed stream and the other cracker feed may be introduced separately into the furnace, and may pass through a portion, or all, of the furnace simultaneously while being isolated from one another by feeding into separate tubes within the same furnace (e.g., a split furnace).

Figure 7:
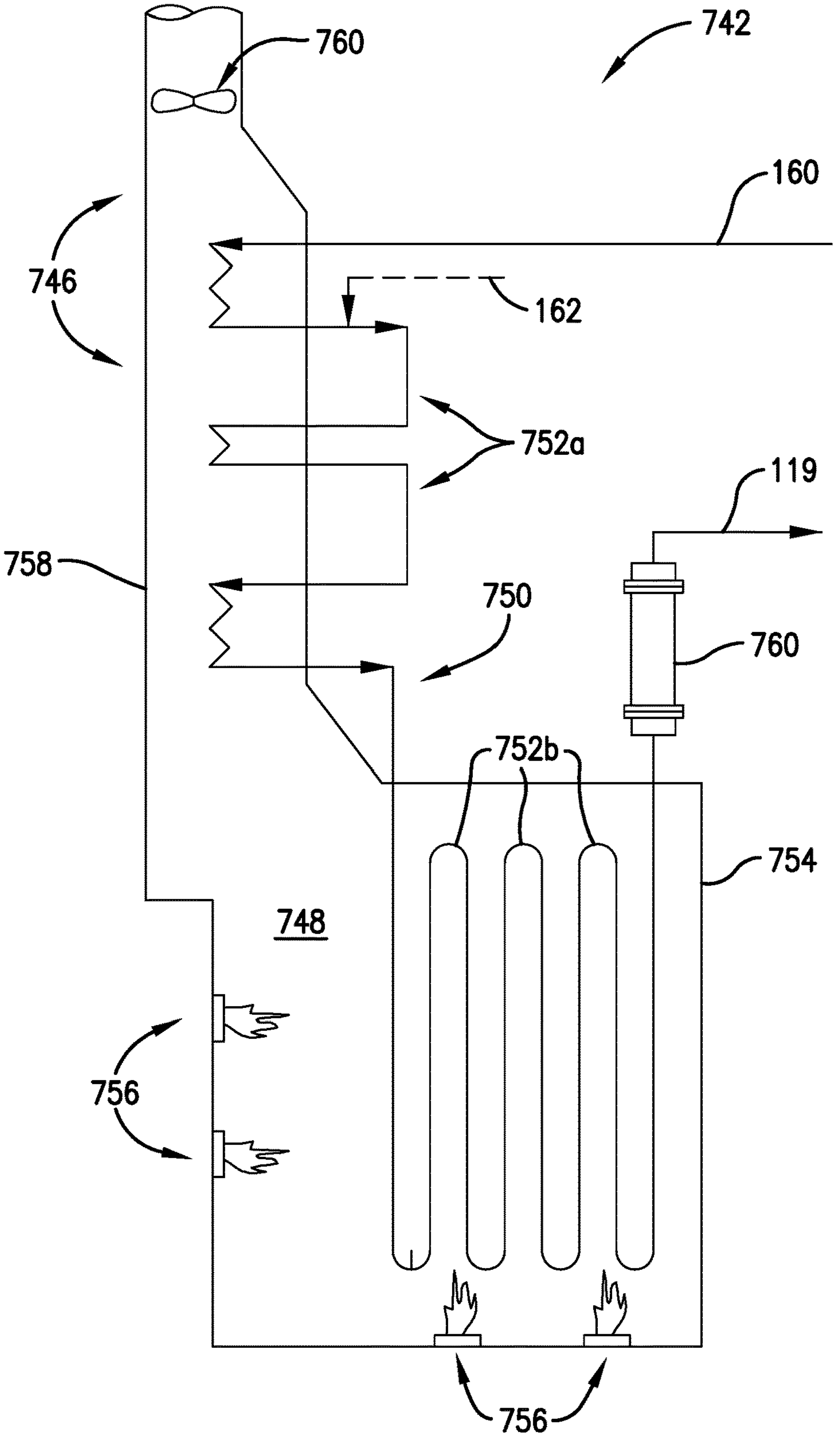
FIG. 7 is a schematic diagram of a cracker furnace configured according to embodiments of the present technology.

Turning now to FIG. 7, a schematic diagram of a cracker furnace suitable for use in one or more embodiments is shown. As shown in FIG. 7, the cracking furnace can include a convection section 746, a radiant section 748, and a cross-over section 750 located between the convection section 746 and radiant section 748. The cross-over section 750 is located between and in fluid flow communication with the convection 746 section and radiant section 748.

The convection section 746 is the portion of the furnace 742 that receives heat from hot flue gases and includes a bank of tubes or coils 752*a,b* through which a cracker stream 160 passes. In the convection section 746, the cracker stream 160 is heated by convection from the hot flue gasses passing therethrough. Although shown in FIG. 7 as including horizontally-oriented convection section tubes 752*a* and vertically-oriented radiant section tubes 752*b*, it should be understood that the tubes 752 can be oriented in any suitable configuration. For example, in one embodiment or in combination with any of the mentioned embodiments, the convection section tubes 752*a* may be vertical. In one embodiment or in combination with any of the mentioned embodiments, the radiant section tubes 752*b* may be horizontal. Additionally, although shown as a single tube, the cracker furnace may comprise one or more tubes or coils 752 that may include at least one split, bend, U, elbow, or combinations thereof. When multiple tubes or coils are present, such may be arranged in parallel and/or in series.

The radiant section 748 is the section of the furnace 742 into which heat is transferred into the heater tubes primarily by radiation from the high-temperature gas. The radiant section 748 also includes a plurality of burners 756 for introducing heat into the lower portion of the furnace 742. The furnace 742 includes a fire box 754 which surrounds and houses the tubes 752*b* within the radiant section 748 and into which the burners 756 are oriented. The cross-over section 750 includes piping for connecting the convection section 746 and radiant section 748 and may transfer the heated cracker stream 160 from one section to the other within, or external to, the interior of the furnace.

As hot combustion gases ascend upwardly through the furnace stack, the gases may pass through the convection section 746, wherein at least a portion of the waste heat may be recovered and used to heat the cracker stream 116 passing through the convection section.

In one embodiment or in combination with any of the mentioned embodiments, the cracking furnace 742 may have a single convection (preheat) section and a single radiant section, while, in other embodiments, the furnace may include two or more radiant sections sharing a common convection section. At least one induced draft (I.D.) fan 760 near the stack (not shown) may control the flow of hot flue gas through the furnace 742 and thereby control its heating profile. Additionally, in one embodiment or in combination with any of the mentioned embodiments, one or more heat exchangers 760 may be used to cool the furnace effluent 119. In one or more embodiments (not shown), a liquid quench stream may be used in addition to, or alternatively with, the exchanger (e.g., transfer line heat exchanger or TLE) on the outlet of the furnace shown in FIG. 7 for cooling the cracked olefin-containing furnace effluent 119.

In operation, the cracker feed stream 160 introduced into the inlet of furnace 742 passes through the convection section 746 and into the cross-over section 750, wherein the stream may have a temperature of at least 500, at least 510, at least 520, at least 530, at least 540, at least 550, at least 555, at least 560, at least 565, at least 570, at least 575, at least 580, at least 585, at least 590, at least 595, at least 600, at least 605, at least 610, at least 615, at least 620, at least 625, at least 630, at least 635, at least 640, at least 645, at least 650, at least 660, at least 670, or at least 680° C. and/or not more than 850, not more than 840, not more than 830, not more than 820, not more than 810, not more than 800, not more than 795, not more than 790, not more than 785, not more than 780, not more than 775, not more than 770, not more than 765, not more than 760, not more than 755, not more than 750, not more than 745, not more than 740, not more than 735, not more than 730, not more than 725, not more than 720, not more than 715, not more than 710, not more than 705, not more than 700, not more than 695, not more than 690, not more than 685, not more than 680, not more than 675, not more than 670, not more than 665, not more than 660, not more than 655, not more than 650, not more than 645, not more than 640, not more than 635, or not more than 630° C.

In operation, the cracker feed stream 160 introduced into the inlet of furnace 742 passes through the convection section 746 and into the cross-over section 750, wherein the stream may have a temperature of at least 500, at least 525, at least 550, at least 575, at least 600, at least 625, at least 650, at least 675, or at least 680° C. and/or not more than 850, not more than 825, not more than 800, not more than 775, not more than 750, not more than 725, not more than 700, not more than 675, not more than 650, or not more than 630° C., or in the range of from 500 to 850° C., 550 to 750° C., or 600 to 825° C.

The heated cracker stream 160 in the cross-over section then passes through the radiant section 748 of the furnace 742. In the radiant section 748, the stream 160 can be thermally cracked to form lighter hydrocarbons, including olefins such as ethylene, propylene, and/or butadiene. The residence time of the cracker stream 160 in the radiant section 748 of the furnace 742 can be at least 0.1, or at least 0.15, or at least 0.2, or at least 0.25, or at least 0.3, or at least 0.35, or at least 0.4, or at least 0.45, in each case seconds and/or not more than 2, or not more than 1.75, or not more than 1.5, or not more than 1.25, or not more than 1, or not more than 0.9, or not more than 0.8, or not more than 0.75, or not more than 0.7, or not more than 0.65, or not more than 0.6, or not more than 0.5, in each case seconds, or in the range of from 0.1 to 2 seconds, 0.15 to 0.65 seconds, or 0.2 to 0.6 seconds.

The temperature of the olefin-containing effluent stream withdrawn from the furnace outlet can be at least 640, or at least 650, or at least 660, or at least 670, or at least 680, or at least 690, or at least 700, or at least 720, or at least 730, or at least 740, or at least 750, or at least 760, or at least 770, or at least 780, or at least 790, or at least 800, or at least 810, or at least 820, in each case ° C. and/or not more than 1000, or not more than 990, or not more than 980, or not more than 970, or not more than 960, or not more than 950, or not more than 940, or not more than 930, or not more than 920, or not more than 910, or not more than 900, or not more than 890, or not more than 880, or not more than 875, or not more than 870, or not more than 860, or not more than 850, or not more than 840, or not more than 830, in each case ° C., in the range of from 730 to 900° C., 750 to 875° C., or 750 to 850° C.

Referring again to FIG. 6, in one embodiment or in combination with any of the mentioned embodiments, all or a portion of the pyrolysis gas 118 from a pyrolysis facility 60 may be introduced into the inlet of the cracker furnace 642, or all or a portion of the pyrolysis gas 118 may be introduced downstream of the furnace outlet, at a location upstream of or within the separation zone 644 of the cracker facility 70. In one embodiment or in combination with any of the mentioned embodiments, the separation zone 644 includes at least one fractionation column for separating out components of the furnace effluent 119 and at least one compression stage for increasing the pressure of the furnace effluent 119 prior to fractionation. When introduced into or upstream of the separation zone 644, the pyrolysis gas stream 118 can be introduced upstream of the last stage of compression, or prior to the inlet of at least one fractionation column in a fractionation section of the separation zone 644.

Prior to entering the cracker facility 70, In one embodiment or in combination with any of the mentioned embodiments, a stream of raw pyrolysis gas from a pyrolysis facility 60 may undergo one or more separation steps in a pre-treatment zone 65 to remove one or more components from the stream. Examples of such components can include, but are not limited to, aldehydes, oxygenated compounds, nitrogen-containing compounds, sulfur-containing compounds, carbon dioxide, water, vaporized metals, and combinations thereof. In one embodiment or in combination with any of the mentioned embodiments, the pyrolysis gas stream 118 introduced into the cracker facility 70 comprises at least 0.1, at least 0.5, at least 1, at least 1.5, at least 2, at least 2.5, at least 3, at least 3.5, at least 4, at least 4.5, or at least 5 and/or not more than 30, not more than 25, not more than 20, not more than 15, not more than 10, not more than 5, not more than 3, not more than 2, or not more than 1 weight percent of one or more of the above-listed components, based on the total weight of the pyrolysis gas stream 118, or it can be present in an amount in the range of 0.1 to 30 weight percent, 0.5 to 25 weight percent, or 1 to 20 weight percent, based on the total weight of the stream.

In one embodiment or in combination with any of the mentioned embodiments, the cracker facility 70 may comprise a single cracking furnace, or it can have at least 2, or at least 3, or at least 4, or at least 5, or at least 6, or at least 7, or at least 8 or more cracking furnaces operated in parallel. Any one or each furnace(s) may be gas cracker, or a liquid cracker, or a split furnace. In one embodiment or in combination with any of the mentioned embodiments, the furnace 642 can be a gas cracker receiving a cracker feed stream containing at least 50 weight percent, or at least 75 weight percent, or at least 85 weight percent or at least 90 weight percent ethane, propane, LPG, or a combination thereof through the furnace, or through at least one coil in a furnace, or through at least one tube in the furnace, based on the weight of all cracker feed to the furnace 642.

In one embodiment or in combination with any of the mentioned embodiments, the furnace 642 can be a liquid or naphtha cracker receiving a cracker feed stream 160 containing at least 50 weight percent, or at least 75 weight percent, or at least 85 weight percent liquid (when measured at 25° C. and 1 atm) hydrocarbons having a carbon number from C5-C22.

In one embodiment or in combination with any of the mentioned embodiments, the yield of olefin—ethylene, propylene, butadiene, or combinations thereof—can be at least 15, or at least 20, or at least 25, or at least 30, or at least 35, or at least 40, or at least 45, or at least 50, or at least 55, or at least 60, or at least 65, or at least 70, or at least 75, or at least 80, in each case percent. As used herein, the term "yield" refers to the mass of product produced from the mass of feedstock/mass of feedstock×100%. The olefin-containing effluent stream 119 comprises at least 30, or at least 40, or at least 50, or at least 60, or at least 70, or at least 75, or at least 80, or at least 85, or at least 90, or at least 95, or at least 97, or at least 99, in each case weight percent of ethylene, propylene, or ethylene and propylene, based on the total weight of the effluent stream.

In one embodiment or in combination with any of the mentioned embodiments, the olefin-containing effluent stream can comprise at least 10, at least 15, at least 20, at least 25, at least 30, at least 35, at least 40, at least 45, at least 50, at least 55, at least 60, at least 65, at least 70, at least 75, at least 80, at least 85, or at least 90 weight percent of C2 to C4 olefins. The stream may comprise predominantly ethylene, predominantly propylene, or predominantly ethylene and propylene, based on the total weight of the olefin-containing effluent stream 119.

The weight ratio of ethylene-to-propylene in the olefin-containing effluent stream 119 can be at least 0.2:1, at least 0.3:1, at least 0.4:1, at least 0.5:1, at least 0.6:1, at least 0.7:1, at least 0.8:1, at least 0.9:1, at least 1:1, at least 1.1:1, at least 1.2:1, at least 1.3:1, at least 1.4:1, at least 1.5:1, at least 1.6:1, at least 1.7:1, at least 1.8:1, at least 1.9:1, or at least 2:1 and/or not more than 3:1, not more than 2.9:1, not more than 2.8:1, not more than 2.7:1, not more than 2.5:1, not more than 2.3:1, not more than 2.2:1, not more than 2.1:1, not more than 2:1, not more than 1.7:1, not more than 1.5:1, or not more than 1.25:1, or it can be in the range of from 0.2:1 to 3:1, 0.4:1 to 2.5:1, or 0.7:1 to 2.2:1.

In one embodiment or in combination with any of the mentioned embodiments, upon exiting the cracker furnace outlet, the olefin-containing effluent stream 119 may be cooled rapidly (e.g., quenched) in order to prevent production of large amounts of undesirable by-products and to minimize fouling in downstream equipment. In one embodiment or in combination with any of the mentioned embodiments, the temperature of the olefin-containing effluent stream 119 from the furnace can be reduced by 35 to 485° C., 35 to 375° C., or 90 to 550° C. to a temperature of 500 to 760° C. during the quench or cooling step.

The cooling step is performed immediately after the furnace effluent stream 119 leaves the furnace such as, for example, within 1 to 30, 5 to 20, or 5 to 15 milliseconds. In one embodiment or in combination with any of the mentioned embodiments, the quench step is performed via indirect heat exchange with high-pressure water or steam in a heat exchanger, while, in other embodiments, the quench step is carried out by directly contacting the effluent with a quench liquid. The temperature of the quench liquid can be at least 65, or at least 80, or at least 90, or at least 100, in each case ° C. and/or not more than 210, or not more than 180, or not more than 165, or not more than 150, or not more than 135, in each case ° C., or it can be in the range of from 65 to 210° C., 80 to 180° C., or 90 to 165° C.

When a quench liquid is used, the contacting may occur in a quench tower and a liquid stream comprising gasoline and other similar boiling-range hydrocarbon components may be removed from the quench tower. In some cases, quench liquid may be used when the cracker feed is predominantly liquid (or C5 to C22 and heavier hydrocarbons), and a heat exchanger may be used when the cracker feed is predominantly vapor (or C2 to C4 hydrocarbons).

The resulting cooled effluent stream is then separated in a vapor-liquid separator, and the vapor is compressed in a gas compressor having, for example, between 1 and 5 compression stages with optional inter-stage cooling and liquid removal. The pressure of the gas stream at the outlet of the first set of compression stages is in the range of from 7 to 20 bar gauge(barg), 8.5 to 18 barg, or 9.5 to 14 barg.

In one embodiment or in combination with any of the mentioned embodiments, all or a portion of the pyrolysis gas stream 118 may be introduced upstream of the final stage of the compressor and downstream of one or more of the initial compression stages. For example, the pyrolysis gas 118 may be combined with the gas stream prior to the first stage, between the first and second stage, between the second and third stage, between the third and fourth stages, between the fourth and fifth stages, or after the fifth (or last) stage of the compressor (not shown) in the separation zone 644. When introduced after later stages of compression, all or a portion of the pyrolysis gas may have been compressed in a separate compressor or compression stage prior to combination with the compressed furnace effluent 119. When combined the pressure of the pyrolysis gas is within 20, within 50, within 100, or within 150 psi of the pressure of the stream with which it is being combined.

The resulting compressed stream can be treated for removal of acid gases, including CO, $CO_2$, and $H_2S$ by contact with an acid gas removal agent. Examples of acid gas removal agents can include, but are not limited to, caustic and various types of amines. In one embodiment or in combination with any of the mentioned embodiments, a single contactor may be used, while, in other embodiments, a dual column absorber-stripper configuration may be employed.

The treated compressed olefin-containing stream 119 may then be further compressed in another compressor, optionally with inter-stage cooling and liquid separation. The resulting compressed stream, which has a pressure in the range of 20 to 50 barg, 25 to 45 barg, or 30 to 40 barg. Any suitable moisture removal method can be used including, for example, molecular sieves or other similar process. The resulting stream may then be passed to the fractionation section, wherein the olefins and other components may be separated in to various high-purity product or intermediate streams. In one embodiment or in combination with any of the mentioned embodiments, all or a portion of the pyrolysis gas may be introduced prior to and/or after one or more stages of the second compressor. Similarly, the pressure of the pyrolysis gas is within 20, within 50, within 100, or within 150 psi of the pressure of the stream with which it is being combined.

In one embodiment or in combination with any of the mentioned embodiments, the suction pressure of the compression system can be at least 0.01, at least 0.05, or at least 0.1 barg and/or not more than 1.1, not more than 0.95, not more than 0.90, or not more than 0.85 barg, while the outlet of the first compression stage can be at least 1.3, at least 1.4, at least 1.5, or at least 1.6 barg and/or not more than 4, not more than 3.75, not more than 3.5, not more than 3.25, not more than 3, not more than 2.9, not more than 2.8 or not more than 2.7 barg.

The outlet of the second compression stage can be at least 3.8, at least 3.9, at least 4, at least 4.5, at least 5, or at least 5.5 barg and/or not more than 11, not more than 10.5, not more than 10, not more than 9, not more than 8.5, not more than 8, not more than 7, not more than 6.5, not more than 6.4, or not more than 6.3 barg, while the outlet of the third compression stage can be at least 8.7, at least 8.8, at least 8.9, at least 9, at least 10, at least 12, or at least 14 barg and/or not more than 30, not more than 27, not more than 25, not more than 20, not more than 15, not more than 13.5, not more than 13.4, or not more than 13.25 barg. The outlet of the fourth compression stage can be at least 14.2, at least 14.3, or a. 14.4 barg, and/or not more than 23.5, not more than 23.4, not more than 23.3, or not more than 23.2 barg. The outlet of the fifth compression stage, when present, can be at least 27.5, at least 27.7, or at least 27.9 barg and/or not more than 46, not more than 45.5, not more than 45.2 barg. When no fifth compression stage is present, the outlet pressure of the fourth compression stage can be at least 30, at least 32, at least 35, at least 37, or at least 40 barg and/or not more than 65, not more than 60, or not more than 57 barg.

The suction pressure of the first stage can be in the range of from 0.1 to 0.8 barg and the outlet pressure of the first stage can be from 1.6 to 2.7 barg. The outlet pressure of the second stage can be from 4 to 6 barg, while the outlet pressure of the third stage can be from 9 to 13 barg. The fourth stage can have an outlet pressure of 14 to 23 barg, and the fifth stage (when present) can have an outlet pressure of 28 to 45 barg. The suction pressure of the first stage can be in the range of from 0.1 to 1 barg, the outlet pressure of the first stage can be in the range of from 1.5 to 3.75 barg, and the outlet pressure of the second stage can be in the range of from 14.5 to 27 barg. The outlet pressure of the fourth stage, particularly when, for example, the fourth stage is the last stage, can be in the range of from 30 to 60 barg.

In one embodiment or in combination with any of the mentioned embodiments, after being compressed, the olefin-containing furnace effluent 119 may be introduced into at least one fractionation column within the separation zone. As used herein, the term "fractionation" refers to the general process of separating two or more materials having different boiling points. Examples of equipment and processes that utilize fractionation include, but are not limited to, distillation, rectification, stripping, and vapor-liquid separation (single stage).

In one embodiment or in combination with any of the mentioned embodiments, the separation section 644 of the cracker facility 70 may include one or more of any suitable type of fractionation columns. Examples include, but are not limited to, a demethanizer, a deethanizer, a depropanizer, an ethylene splitter, a propylene splitter, a debutanizer, and combinations thereof. As used herein, the term "demethanizer," refers to a column whose light key is methane. Similarly, "deethanizer," and "depropanizer," refer to columns with ethane and propane as the light key component, respectively. The term "ethylene splitter" refers to a column with ethylene as its light key, and similarly, a "propylene splitter" refers to a column with propylene as its light key.

Any suitable arrangement of columns may be used so that the fractionation section provides at least one olefin product stream 128 and at least one paraffin stream 140. In one embodiment or in combination with any of the mentioned embodiments, the separation zone 644 can provide at least two olefin streams, such as ethylene and propylene, and at least two paraffin streams, such as ethane and propane, as well as additional streams including, for example, methane and lighter components and butane and heavier components.

In one embodiment or in combination with any of the mentioned embodiments, the olefin stream 140 from the separation zone 644 can comprise at least 50, at least 55, at least 60, at least 65, at least 70, at least 75, at least 80, at least 85, at least 90, or at least 95 weight percent and/or not more than 100, not more than 99, not more than 97, not more than 95, not more than 90, not more than 85, or not more than 80 weight percent of olefins, based on the total weight of the olefin stream, or it can be in the range of from 50 to 99 weight percent, 55 to 97 weight percent, or 90 to 97 weight percent, based on the total weight of the stream.

The olefins can be predominantly ethylene or predominantly propylene. In one embodiment or in combination with any of the mentioned embodiments, the olefin stream can comprise at least 50, at least 55, at least 60, at least 65, at least 70, at least 75, at least 80, at least 85, at least 90, or at least 95 weight percent and/or not more than 99, not more than 97, not more than 95, not more than 90, not more than 85, not more than 80, not more than 75, not more than 70, or not more than 65 weight percent of ethylene, based on the total weight of olefins in the olefin stream, or it can be in the range of from 50 to 99 weight percent, 75 to 97 weight percent, or 80 to 95 weight percent, based on the total weight of olefins in the stream.

In one embodiment or in combination with any of the mentioned embodiments, the olefin stream may comprise at least 20, at least 25, at least 30, at least 35, at least 40, at least 45, at least 50, at least 55, or at least 60 weight percent and/or not more than 80, not more than 75, not more than 70, not more than 65, not more than 60, not more than 55, not more than 50, or not more than 45 weight percent of ethylene, based on the total weight of the olefin stream 128, or it can be in the range of from 20 to 80 weight percent, 30 to 70 weight percent, or 40 to 60 weight percent, based on the total weight of the stream.

Alternatively, or in addition, the olefin stream can comprise at least 50, at least 55, at least 60, at least 65, at least 70, at least 75, at least 80, at least 85, at least 90, or at least 95 weight percent and/or not more than 99, not more than 97, not more than 95, not more than 90, not more than 85, not more than 80, not more than 75, not more than 70, or not more than 65 weight percent of propylene, based on the total weight of olefins in the olefin stream, or it can be in the range of from 50 to 99 weight percent, 75 to 97 weight percent, or 80 to 95 weight percent, based on the total weight of olefins in the stream.

In one embodiment or in combination with any of the mentioned embodiments, the olefin stream may comprise at least 20, at least 25, at least 30, at least 35, at least 40, at least 45, at least 50, at least 55, or at least 60 weight percent and/or not more than 80, not more than 75, not more than 70, not more than 65, not more than 60, not more than 55, not more than 50, or not more than 45 weight percent of propylene, based on the total weight of the olefin stream 128, or it can be in the range of from 50 to 99 weight percent, 75 to 97 weight percent, or 80 to 95 weight percent, based on the total weight of olefins in the stream.

When present, the separation zone 644 may utilize a demethanizer column, wherein the methane and lighter (CO, $CO_2$, $H_2$) components are separated from the ethane and heavier components. The demethanizer can be operated at a temperature of at least −145, or at least −142, or at least −140, or at least −135, in each case ° C. and/or not more than −120, not more than −125, not more than −130, not more than −135° C., or it can be in the range of from −145 to −120° C., −142 to −125° C., or −140 to −130° C. The bottoms predominantly liquid stream from the demethanizer column includes at least 50, or at least 55, or at least 60, or at least 65, or at least 70, or at least 75, or at least 80, or at least 85, or at least 90, or at least 95 or at least 99, in each case percent of the total amount of ethane and heavier components.

When present, the separation zone 644 may utilize a deethanizer column, wherein the C2 and lighter components are separated from the C3 and heavier components by fractional distillation. The deethanizer can be operated with an overhead temperature of at least −35, or at least −30, or at least −25, or at least −20, in each case ° C. and/or not more than −5, not more than −10, not more than −15, not more than −20° C., or it can be in the range of from −35 to −5° C., −30 to −10° C., or −25 to −15° C., and an overhead pressure of at least 3, or at least 5, or at least 7, or at least 8, or at least 10, in each case barg and/or not more than 20, or not more than 18, or not more than 17, or not more than 15, or not more than 14, or not more than 13, in each case barg, or an overhead pressure in the range of from 3 to 20 barg, 5 to 18 barg, or 8 to 15 barg.

The deethanizer column recovers at least 60, or at least 65, or at least 70, or at least 75, or at least 80, or at least 85, or at least 90, or at least 95, or at least 97, or at least 99, in each case percent of the total amount of C2 and lighter components introduced into the column in the overhead stream. In one embodiment or in combination with any of the mentioned embodiments, the overhead stream removed from the deethanizer column comprises at least 50, or at least 55, or at least 60, or at least 65, or at least 70, or at least 75, or at least 80, or at least 85, or at least 90, or at least 95, in each case weight percent of ethane and ethylene, based on the total weight of the overhead stream.

In one embodiment or in combination with any of the mentioned embodiments, the C2 and lighter overhead stream from a deethanizer can be further separated in an ethane-ethylene fractionator column (ethylene fractionator or ethylene splitter). In the ethane-ethylene fractionator column, an ethylene and lighter component stream can be withdrawn from the overhead of the column or as a side stream from the top half of the column, while the ethane and any residual heavier components are removed in the bottoms stream.

The ethylene fractionator may be operated at an overhead temperature of at least −45, or at least −40, or at least −35, or at least −30, or at least −25, or at least −20, in each case ° C. and/or not more than −15, or not more than −20, or not more than −25, in each case ° C., or in the range of from −45 to −15° C., −40 to −20° C., or −35 to −25° C., and an overhead pressure of at least 10, or at least 12, or at least 15, in each case barg and/or not more than 25, not more than 22, not more than 20 barg, or an overhead pressure in the range of from 10 to 25 barg, 12 to 22 barg, or 15 to 20 barg. The overhead stream, which may be enriched in ethylene, can include at least 70, or at least 75, or at least 80, or at least 85, or at least 90, or at least 95, or at least 97, or at least 98, or at least 99, in each case weight percent ethylene, based on the total weight of the stream and may be sent to downstream processing unit for further processing, storage, or sale as shown by line 128.

The bottoms stream from the ethane-ethylene fractionator may include at least 40, or at least 45, or at least 50, or at least 55, or at least 60, or at least 65, or at least 70, or at least 75, or at least 80, or at least 85, or at least 90, or at least 95, or at least 98, in each case weight percent ethane, based on the total weight of the bottoms stream. All or a portion of the recovered ethane may be recycled to the inlet of the cracker furnace as additional feedstock, as shown by line 150, alone or in combination with the pyoil and/or pyrolysis gas, as discussed previously. Additionally, or in the alternative, all or a portion of the ethane can be withdrawn from the cracker facility 70 as a paraffin product stream 140.

When present, the separation zone 644 may utilize a depropanizer, wherein C3 and lighter components are removed as an overhead vapor stream, while C4 and heavier components exit the column in the liquid bottoms. The depropanizer can be operated with an overhead temperature of at least 20, or at least 35, or at least 40, in each case ° C. and/or not more than 70, not more than 65, not more than 60, not more than 55° C., or in the range of from 20 to 70° C., 35 to 65° C., or 40 to 60° C., and an overhead pressure of at least 10, or at least 12, or at least 15, in each case barg and/or not more than 20, or not more than 17, or not more than 15, in each case barg, or in the range of from 10 to 20 barg, 12 to 17 barg, or 12 to 15 barg. The depropanizer column recovers at least 60, or at least 65, or at least 70, or at least 75, or at least 80, or at least 85, or at least 90, or at least 95, or at least 97, or at least 99, in each case percent of the total amount of C3 and lighter components introduced into the column in the overhead stream.

In one embodiment or in combination with any of the mentioned embodiments, the overhead stream removed from the depropanizer column comprises at least or at least 50, or at least 55, or at least 60, or at least 65, or at least 70, or at least 75, or at least 80, or at least 85, or at least 90, or at least 95, or at least 98, in each case weight percent of propane and propylene, based on the total weight of the overhead stream.

In one embodiment or in combination with any of the mentioned embodiments, the overhead stream from the depropanizer may be introduced into a propane-propylene fractionator (propylene fractionator or propylene splitter), wherein the propylene and any lighter components are removed in the overhead stream and the propane and any heavier components exit the column in the bottoms stream. The propylene fractionator may be operated at an overhead temperature of at least 20, or at least 25, or at least 30, or at least 35, in each case ° C. and/or not more than 55, not more than 50, not more than 45, not more than 40° C., or in the range of from 20 to 55° C., 25 to 50° C., or 30 to 45° C., and an overhead pressure of at least 12, or at least 15, or at least 17, or at least 20, in each case barg and/or not more than 20, or not more than 17, or not more than 15, or not more than 12, in each case barg, or it can be in the range of 12 to 20 barg or 15 to 17 barg. The overhead stream, which is enriched in propylene, can include at least 70, or at least 75, or at least 80, or at least 85, or at least 90, or at least 95, or at least 97, or at least 98, or at least 99, in each case weight percent propylene, based on the total weight of the stream and may be sent to downstream processing unit for further processing, storage, or sale, as shown by line 128 in FIG. 6.

The bottoms stream from the propane-propylene fractionator may include at least 40, or at least 45, or at least 50, or at least 55, or at least 60, or at least 65, or at least 70, or at least 75, or at least 80, or at least 85, or at least 90, or at least 95, or at least 98, in each case weight percent propane, based on the total weight of the bottoms stream. All or a portion of the recovered propane may be recycled to the cracker furnace via line 150 as additional feedstock, alone or in combination with pyoil and/or pyrolysis gas, as discussed previously. Additionally, or in the alternative, all or a portion of the propane can be withdrawn from the cracker facility 70 as a paraffin product stream 140. The paraffin product stream 140 may comprise a recycle content paraffin product stream (r-paraffin) as discussed herein.

In one embodiment or in combination with any of the mentioned embodiments, at least a portion of the bottoms stream from the depropanizer may be sent to a debutanizer column for separating C4 and lighter components, including butenes, butanes and butadienes, from C5+ components. The debutanizer can be operated with an overhead temperature of at least 20, or at least 25, or at least 30, or at least 35, or at least 40, in each case ° C. and/or not more than 60, or not more than 65, or not more than 60, or not more than 55, or not more than 50, in each case ° C. and an overhead pressure of at least 2, or at least 3, or at least 4, or at least 5, in each case barg and/or not more than 8, or not more than 6, or not more than 4, or not more than 2, in each case barg. The debutanizer column may recover at least 60, or at least 65, or at least 70, or at least 75, or at least 80, or at least 85, or at least 90, or at least 95, or at least 97, or at least 99, in each case percent of the total amount of C4 and lighter components introduced into the column in the overhead stream.

In one embodiment or in combination with any of the mentioned embodiments, the overhead stream removed from the debutanizer column comprises at least 30, or at least 35, or at least 40, or at least 45, or at least 50, or at least 55, or at least 60, or at least 65, or at least 70, or at least 75, or at least 80, or at least 85, or at least 90, or at least 95, in each case weight percent of butane, butene, butadiene, isomers thereof, and combinations thereof, based on the total weight of the overhead stream. The bottoms stream from the debutanizer includes mainly C5 and heavier components, in an amount of at least 50, or at least 60, or at least 70, or at least 80, or at least 90, or at least 95 weight percent, based on the total weight of the stream. The debutanizer bottoms stream may be sent for further separation, processing, storage, sale or use. In one embodiment or in combination with any of the mentioned embodiments, the overhead stream from the debutanizer, or the C4s, can be subjected to any conventional separation methods such as extraction or distillation processes to recover a more concentrated stream of butadiene.

In one embodiment or in combination with any of the mentioned embodiments, at least one stream in the cracker facility 70 can have a recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of the stream.

Partial Oxidation (POX) Gasification Facility

In one embodiment or in combination with any of the mentioned embodiments, the chemical recycling facility may also comprise a partial oxidation (POX) gasification facility 50. As used herein, the term "partial oxidation" refers to high temperature conversion of a carbon-containing feed into syngas (carbon monoxide, hydrogen, and carbon dioxide), where the conversion is carried out in the presence of a less than stoichiometric amount of oxygen. The feed to POX gasification can include solids, liquids, and/or gases. A "partial oxidation gasification facility" is a facility that includes all equipment, lines, and controls necessary to carry out POX gasification of waste plastic and feedstocks derived therefrom.

Figure 8:
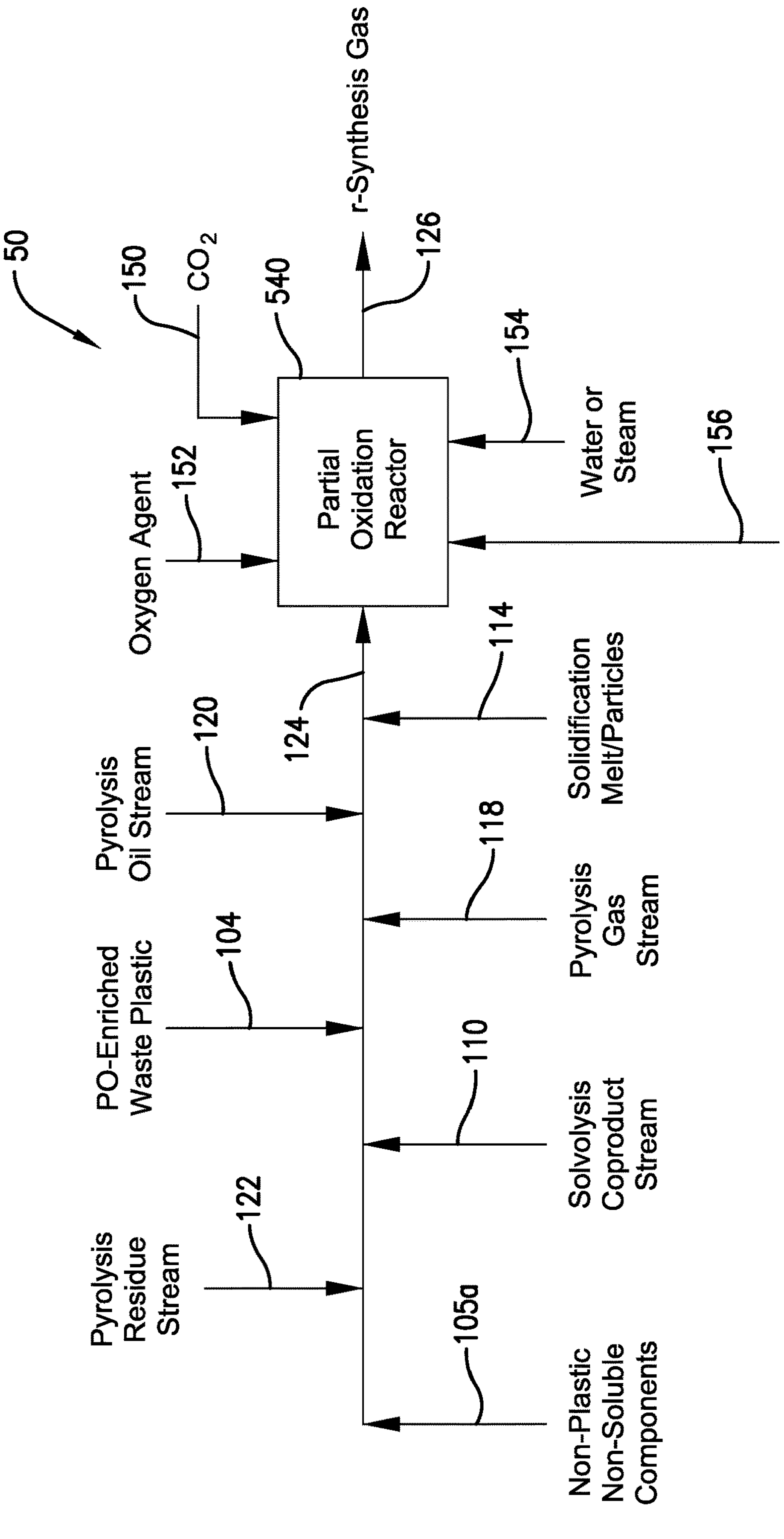
FIG. 8 is a schematic block flow diagram illustrating the main steps of a partial oxidation (POX) gasification facility according to embodiments of the present technology.

Turning now to FIG. 8, a schematic diagram of a POX gasification facility 50 suitable for use in a chemical recycling facility according one or more embodiments is provided. As shown in FIG. 8, a feed stream 124 may be introduced into a POX gasification facility 50, wherein at least a portion of the feed may be converted to syngas in the presence of less than a stoichiometric amount of oxygen. In one or more embodiments generally shown in FIG. 8, the feed stream to the POX gasification facility 50 may comprise one or more of (i) a PO-enriched waste plastic 104, (ii) a solidification particle-containing stream or melt 114, (iii) at least one solvolysis coproduct stream 110, (iv) a pyrolysis gas stream 118, (v) a pyrolysis oil stream 120, (vi) a pyrolysis residue stream 122, or (vii) a stream of non-plastic, non-soluble components. In one embodiment or in combination with any of the mentioned embodiments, one or more of these streams may be introduced into the POX gasification facility 50 continuously or one or more of these streams may be introduced intermittently. When multiple types of feed streams are present, each may be introduced separately, or all or a portion of the streams may be combined so that the combined stream 124 may be introduced into the POX gasification facility 50. The combining, when present, may take place in a continuous or batch manner.

In one embodiment or in combination with any of the mentioned embodiments, the feed stream 124 to the POX gasification facility 50 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of one or more solvolysis coproduct streams, based on the total weight of the feed stream introduced into the POX gasification facility 50.

Additionally, or in the alternative, the feed stream to the POX gasification facility 50 can comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of one or more solvolysis coproduct streams, based on the total weight of the feed stream introduced into the POX gasification facility 50, or it can include an amount in the range of from 1 to 95 weight percent, 5 to 90 weight percent, 20 to 80 weight percent, or 30 to 70 weight percent, based on the total weight of the stream.

The solvolysis coproduct stream 110 introduced into the POX gasification facility 50 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of solvolysis coproduct stream 110 introduced into the POX gasification facility 50.

In one embodiment or in combination with any of the mentioned embodiments, the feed stream 124 to the POX gasification facility 50 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of pyrolysis oil from the pyrolysis oil stream 120, based on the total weight of the feed stream 124 introduced into the POX gasification facility 50.

Additionally, or in the alternative, the feed stream 124 to the POX gasification facility 50 can comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of pyrolysis oil from stream 120, based on the total weight of the feed stream 124 introduced into the POX gasification facility 50, or it can include an amount in the range of from 1 to 95 weight percent, 5 to 90 weight percent, 20 to 80 weight percent, or 30 to 70 weight percent, based on the total weight of the stream.

The pyrolysis oil stream 120 introduced into the POX gasification facility 50 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of pyrolysis oil stream 120 introduced into the POX gasification facility 50.

In one embodiment or in combination with any of the mentioned embodiments, the feed stream 124 to the POX gasification facility 50 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of pyrolysis residue from the pyrolysis residue stream 122, based on the total weight of the feed stream 124 introduced into the POX gasification facility 50.

Additionally, or in the alternative, the feed stream 124 to the POX gasification facility 50 may comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of pyrolysis residue from stream 122, based on the total weight of the feed stream 124 introduced into the POX gasification facility 50, or it can include an amount in the range of from 1 to 95 weight percent, 5 to 90 weight percent, 20 to 80 weight percent, or 30 to 70 weight percent, based on the total weight of the stream.

The pyrolysis residue stream 124 introduced into the POX gasification facility 50 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of pyrolysis residue stream 124 introduced into the POX gasification facility 50. The pyrolysis residue may be in the form of solids, a melt, or a slurry.

As also shown in FIG. 8, In one embodiment or in combination with any of the mentioned embodiments, the feed stream 124 to the POX gasification facility 50 can comprise at least 0.25, at least 0.5, at least 1, at least 5, at least 10, at least 15, at least 20, at least 25, at least 30, at least 35, at least 40, at least 45, and/or not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, or not more than 3 weight percent of a stream **105*a* of non-plastic, non-soluble components withdrawn from the pre-processing facility 20 shown in FIG. 1, based on the total weight of the feed stream 124 introduced into the POX gasification facility 50**, or it can include an amount in the range of from 1 to 80 weight percent, 5 to 75 weight percent, or 5 to 25 weight percent, based on the total weight of the stream.

Additionally, or in the alternative, the feed stream 124 to the POX gasification facility 50 may comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of non-plastic, non-soluble components, based on the total weight of the feed stream 124 introduced into the POX gasification facility 50.

The stream **105*a* of non-plastic, non-soluble components 105*a* introduced into the POX gasification facility 50 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of pyrolysis residue stream 124 introduced into the POX gasification facility 50**. The pyrolysis residue may be in the form of solids, a melt, or a slurry.

In one embodiment or in combination with any of the mentioned embodiments, the feed stream 124 to the POX gasification facility 50 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of PO-enriched waste plastic from stream 104, based on the total weight of the feed stream 124 introduced into the POX gasification facility 50.

Additionally, or in the alternative, the feed stream 124 to the POX gasification facility 50 may comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of PO-enriched waste plastic, based on the total weight of the feed stream 124 introduced into the POX gasification facility 50, or it can include an amount in the range of from 1 to 95 weight percent, 5 to 90 weight percent, 20 to 80 weight percent, or 30 to 70 weight percent, based on the total weight of the stream.

The PO-enriched waste plastic stream 104 introduced into the POX gasification facility 50 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of PO-enriched waste plastic introduced into the POX gasification facility 50. The PO-enriched plastic stream may originate from the pre-processing facility 20 of the chemical recycling facility 10 as shown in FIG. 1 and/or from another source (not shown). The stream may be in the form of a plastic melt, or in the form of particles, or a slurry.

In one embodiment or in combination with any of the mentioned embodiments, the feed stream 124 to the POX gasification facility 50 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of solids—containing stream and/or melt stream 114 from a solidification facility 40, based on the total weight of the feed stream 124 introduced into the POX gasification facility 50.

Additionally, or in the alternative, the feed stream to the POX gasification facility 50 may comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of solids-containing stream and/or melt from a solidification facility 40, based on the total weight of the feed stream 124 introduced into the POX gasification facility 50, or it can include an amount in the range of from 1 to 95 weight percent, 5 to 90 weight percent, 20 to 80 weight percent, or 30 to 70 weight percent, based on the total weight of the stream.

The solids-containing and/or melt stream introduced into the POX gasification facility 50 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of solids or melt stream 114 introduced into the POX gasification facility 50. The solids-containing stream or melt may originate from the solidification facility 40 as shown in FIG. 1 and/or from another source (not shown). In one embodiment or in combination with any of the mentioned embodiments, the solids-containing stream 114 may be in the form of a slurry or solid particles.

In one embodiment or in combination with any of the mentioned embodiments, a stream of PO-enriched waste plastic 104 can be combined with one or more of the other streams including, for example, a coproduct stream 110 from a solvolysis facility 30, a solids-containing 114 stream from a solidification facility 40, and/or at least one stream (e.g., pyrolysis gas 118, pyrolysis oil 120, and pyrolysis residue 122 from a pyrolysis facility 60 to form a combined stream 124.

The combined stream may include at least 5, at least 10, at least 15, at least 20, at least 25, at least 30, at least 35, at least 40, at least 45, at least 50, at least 55, at least 60, at least 65, at least 70, at least 75, at least 80 weight percent and/or not more than 99, not more than 90, not more than 95, not more than 90, not more than 85, not more than 80, not more than 75, not more than 70, not more than 65, not more than 60, not more than 55, not more than 50, not more than 45, or not more than 40 weight percent of PO or the PO-enriched stream 104, based on the total weight of the combined stream, or it can include an amount in the range of from 5 to 99 weight percent, 10 to 90 weight percent, 15 to 85 weight percent, or 20 to 70 weight percent, based on the total weight of the stream.

Additionally, or in the alternatively, the combined stream of PO-enriched waste plastic 104 and at least one other process stream from a portion of the chemical recycling facility 10 can comprises at least 1, at least 2, at least 5, at least 10, at least 15, at least 20, at least 25, at least 30 weight percent and/or not more than 50, not more than 45, not more than 40, not more than 35, not more than 30, not more than 25, not more than 20, not more than 15, not more than 10, not more than 5, not more than 2, not more than 1 weight percent of components other than polyolefin, based on the total weight of the feed stream, or it can include an amount in the range of from 1 to 50 weight percent, 2 to 40 weight percent, or 5 to 20 weight percent, based on the total weight of the stream.

In one embodiment or in combination with any of the mentioned embodiments, the weight ratio of any one of the streams to another in the combined stream can be at least 1:10, at least 1:9, at least 1:8, at least 1:7, at least 1:6, at least 1:5, at least 1:4, at least 1:3, at least 1:2, at least 1:1.5, or at least 1:1 and/or not more than 10:1, not more than 9:1, not more than 8:1, not more than 7:1, not more than 6:1, not more than 5:1, not more than 4:1, not more than 3:1, not more than 2:1, not more than 1.5:1, or not more than 1:1, or in the range of from 1:10 to 10:1, 1:5 to 5:1, or 1:2 to 2:1.

As generally shown in FIG. 8, the POX gasification facility 50 includes a POX gasification reactor (or gasifier) 540. In one embodiment or in combination with any of the mentioned embodiments, the POX gasification unit may comprise a gas-fed gasifier, a liquid-fed gasifier, or a solid-fed gasifier. More particularly, In one embodiment or in combination with any of the mentioned embodiments, the POX gasification unit may conduct liquid-fed POX gasification. As used herein, "liquid-fed POX gasification" refers to a POX gasification process where the feed to the process comprises predominately (by weight) components that are liquid at 25° C. and 1 atm.

Additionally or alternatively, in one embodiment or in combination with any of the mentioned embodiments, POX gasification unit may conduct gas-fed POX gasification. As used herein, "gas-fed POX gasification" refers to a POX gasification process where the feed to the process comprises predominately (by weight) components that are gaseous at 25° C. and 1 atm.

Additionally or alternatively, in one embodiment or in combination with any of the mentioned embodiments, POX gasification unit may conduct solid-fed POX gasification. As used herein, "solid-fed POX gasification" refers to a POX gasification process where the feed to the process comprises predominately (by weight) components that are solid at 25° C. and 1 atm.

Gas-fed, liquid-fed, and solid-fed POX gasification processes can be co-fed with lesser amounts of other components having a different phase at 25° C. and 1 atm. Thus, gas-fed POX gasifiers can be co-fed with liquids and/or solids, but only in amounts that are less (by weight) than the amount of gasses fed to the gas-phase POX gasifier; liquid-fed POX gasifiers can be co-fed with gasses and/or solids, but only in amounts (by weight) less than the amount of liquids fed to the liquid-fed POX gasifier; and solid-fed POX gasifiers can be co-fed with gasses and/or liquids, but only in amounts (by weight) less than the amount of solids fed to the solid-fed POX gasifier.

In certain embodiments, the total feed to a gas-fed POX gasifier can comprise at least 60, at least 70, at least 80, at least 90, or at least 95 weight percent of components that are gaseous at 25° C. and 1 atm; the total feed to a liquid-fed POX gasifier can comprise at least 60, at least 70, at least 80, at least 90, or at least 95 weight percent of components that are liquid at 25° C. and 1 atm; and the total feed to a solid-fed POX gasifier can comprise at least 60, at least 70, at least 80, at least 90, or at least 95 weight percent of components that are solids at 25° C. and 1 atm.

The particle size of any solid particles introduced into the POX gasification facility is desirably not larger than the maximum size the gasifier in use can accept. Many coal fed gasifiers can grind or mill the coal to a desired size before feeding them to the gasification zone. Relying upon such grinding or milling operations to achieve the desired solid particle size that are densified by a heat treatment process may or may not be suitable since, in one or more embodiments and depending on the feedstock, the elasticity or variability of elasticity of the solids derived from waste plastics can lead to pancaking, platelet formation, or smearing during co-granulation or co-grinding with the more hard and brittle carbonaceous fuel sources like coal or petroleum coke.

However, in one embodiment or in combination with any of the mentioned embodiments, one or more of the above discussed streams comprising solids can be fed to a solid fossil fuel milling or grinding operation along with a solid fossil fuel to reduce the size of the particles. In one embodiment or in combination with any of the mentioned embodiments, the size of the particles fed to the mill or grinder can be larger than the maximum size the gasifier in use can accept or are larger than the average particle size of the solid fossil fuel after milling or grinding or as fed to the gasifier, in each case as measured in the largest dimensions and as an average median particle size. If desired, however, due to the variability in thermoplastic content and types of polymers present in the solid particles, the particles can be of a size not to exceed the maximum size the gasifier in use can accept, or not to exceed or be smaller than the average target particle size of the solid fossil fuel after milling or grinding or as fed to the gasifier, in each case as measured in the largest dimensions and as an average median particle size.

The actual particle size of the solid particles introduced to the gasifier 540 can vary with the type of gasifier used. For example, particles having an average particle size of ¼ inch or greater in their largest dimension cannot be processed through an entrained flow coal gasifier. However, fixed bed or moving bed gasifiers can accept larger particle sizes. Examples of suitable sizes of particles fed to a fixed bed or moving bed gasifier can be no more than 12 inches, or not more than 8 inches, or not more than 6 inches, or not more than 5 inches, or not more than 4 inches, or not more than 3.75 inches, or not more than 3.5 inches, or not more than 3.25 inches, or not more than 3 inches, or not more than 2.75 inches, or not more than 2.5 inches, or not more than 2.25 inches, or not more than 2 inches, or not more than 1.75 inches, or not more than 1.5 inches, or not more than 1.25 inches.

In one embodiment or in combination with any of the mentioned embodiments, the size can be at least 2 mm, or at least ⅛ inches, or at least ¼ inches, or at least ½ inches, or at least 1 inch, or at least 1.5 inches, or at least 1.75 inches, or at least 2 inches, or at least 2.5 inches, or at least 3 inches, or at least 3.5 inches, or at least 4 inches, or at least 4.5 inches, or at least 5 inches, or at least 5.5 inches. Such relatively large particles may be better suited for use in fixed or moving bed gasifiers, especially those that are updraft fixed or moving bed gasifiers.

With many gasifier designs, the fossil fuel (coal or pet-coke) and the solids are size reduced for multiple purposes. The particles are of a small size as is the fossil fuel source to (i) allow for faster reaction once inside the gasifier due to mass transfer limitations, (ii) to create a slurry that is stable, fluid and flowable at high concentrations of solids to water in slurry fed gasifiers, (iii) to pass through processing equipment such as high-pressure pumps, valves, and feed injectors that have tight clearances, (iv) to flow through screens between the mills or grinders and the gasifier, or (v) to be conveyed with gases used for conveying solid fossil fuels to dry fed gasifiers.

In one embodiment or in combination with any of the mentioned embodiments, the size of the particles introduced into the gasifier are desirably not more than 5 inches, or not more than 4 inches, or not more than 1 inch, or not more than ¼ inch, or not more than 2 mm. The larger sizes are useful for addition to a fixed bed or moving bed gasifier, particularly in updraft gasifiers to provide sufficient density to allow them to contact the bed as a solid that has not fully charred or be converted to ash.

In one embodiment or in combination with any of the mentioned embodiments, the solids in the gasifier feedstock can have a particle size of 2 mm or smaller. This embodiment is particularly attractive to entrained flow gasifiers, including dry feed and slurry fed gasifiers, and to fluidized bed gasifiers. As used throughout, unless a different basis is expressed (e.g. a mean), a stated size means that at least 90 weight percent of the particles have a largest dimension in the stated size, or alternatively that 90 weight percent pass through sieve designated for that particle size. Either condition satisfies the particle size designation. Solid particles sized larger than 2 mm for an entrained flow gasifier have the potential for being blown through the gasification zone of entrained flow gasifiers without completely gasifying, particularly when the gasification conditions are established to gasify solid fossil fuel having a particle dimension of 2 mm or smaller.

In one embodiment or in combination with any of the mentioned embodiments, the size of the solid particles as such or as combined with a fossil fuel, or in the gasifier feed, or injected into the gasification zone, is 2 mm or smaller or constitute those particles passing through a 10 mesh, or 1.7 mm or smaller (those particles passing through a 12 mesh), or 1.4 mm or smaller (those particles passing through a 14 mesh), or 1.2 mm or smaller (those particles passing through a 16 mesh), or 1 mm or smaller (those particles passing through a 18 mesh), or 0.85 mm or smaller (those particles passing through a 20 mesh), or 0.7 mm or smaller (those particles passing through a 25 mesh) or 0.6 mm or smaller (those particles passing through a 30 mesh), or 0.5 mm or smaller (those particles passing through a 35 mesh), or 0.4 mm or smaller (those particles passing through a 40 mesh), or 0.35 mm or smaller (those particles passing through a 45 mesh), or 0.3 mm or smaller (those particles passing through a 50 mesh), or 0.25 mm or smaller (those particles passing through a 60 mesh), or 0.15 mm or smaller (those particles passing through a 100 mesh), or 0.1 mm or smaller (those particles passing through a 140 mesh), or 0.07 mm or smaller (those particles passing through a 200 mesh), or 0.044 mm or smaller (those particles passing through a 325 mesh), or 0.037 mm or smaller (those particles passing through a 400 mesh). In another embodiment, the size of the densified textile aggregates particles is at least 0.037 mm (or 90 percent retained on a 400 mesh).

In one embodiment or in combination with any of the mentioned embodiments, the solid particles introduced into the POX gasification facility 50 have a particle size that, after optional sieving, is acceptable for gasifying within the design parameters of the type of gasifier used. The particle sizes of the particles and the solid fossil fuels can be sufficiently matched to retain the stability of the slurry and avoid separation at high solids concentrations prior to entering the gasification zone in the gasifier. A feedstock composition that phase separates, whether between solids/liquid or solid/solids in a slurry, or solids/solids in a dry feed, or solid/liquid in a liquid feedstock, can plug lines, created localized zones of gasified densified textile aggregates, create inconsistent ratios of fossil fuel/densified textile aggregates, and can impact the consistency of the syngas composition. Variables to consider for determining the stability of the feedstock composition include setting an optimal particle size of the particles, and variables for determining the optimal particle sizes include the bulk density of the ground coal, the concentration of all solids in the slurry if a slurry is used or the solid/solid concentration in a dry feed, the effectiveness of any additives employed such as surfactants/stabilizers/viscosity modifiers, and the velocity and turbulence of the feedstock composition to the gasifier and through the injector nozzles.

In one embodiment or in combination with any of the mentioned embodiments, the maximum particle size of the solid particles derived from mixed plastic waste can be selected to be similar (below or above) to the maximum particle size of the ground solid fossil fuel. The maximum particle size of the solid particles derived from mixed plastic waste used in the gasifier feedstock can be no more than 50 percent larger than the maximum solid fossil fuel size in the gasifier feedstock, or not more than 45 percent, or not more than 40 percent, or not more than 35 percent, or not more than 30 percent, or not more than 25 percent, or not more than 20 percent, or not more than 15 percent, or not more than 10 percent, or not more than 5 percent, or not more than 3 percent, or not more than 2 percent, or not more than 1 percent larger than the maximum solid fossil fuel size in the gasifier feedstock, or not larger than, or smaller than the maximum solid fossil fuel size in the gasifier feedstock. Optionally, the maximum particle size of the solid particles derived from mixed plastic waste used in the gasifier feedstock as stated above can be within (meaning not larger than and not smaller than) the stated values. The maximum particle size is not determined as the maximum size of the particle distribution but rather by sieving through meshes. The maximum particle size is determined as the first mesh which allows at least 90 volume percent of a sample of the particles to pass. For example, if less than 90 volume percent of a sample passes through a 300 mesh, then a 100 mesh, a 50 mesh, a 30 mesh, a 16 mesh, but succeeds at a 14 mesh, then the maximum particle size of that sample is deemed to correspond to the first mesh size that allowed at least 90 volume percent to pass through, and in this case, a 14 mesh corresponding to a maximum particle size of 1.4 mm.

In one embodiment or in combination with any of the mentioned embodiments, the feed stream to the gasifier 540 can include polyolefin flake or particles having a particle size of at least 0.01, at least 0.025, at least 0.05, at least 0.075, at least 0.10, at least 0.25, at least 0.50 inches and/or not more than 1, not more than 0.75, not more than 0.60, not more than 0.50 inches, measured in the longest dimension, or it can be at least 0.01 to 1 inch, 0.025 to 0.75 inches, or 0.05 to 0.6 inches. The shape of the particles can be flakes, pellets, micropellets, and the shapes may be uniform or non-uniform.

The solid particles derived from mixed plastic waste can be isolated as a solid feed for ultimate destination to be fed to a gasifier. In one embodiment or in combination with any of the mentioned embodiments, at least 80 weight percent, or at least 85 weight percent, or at least 90 weight percent, or at least 95 weight percent, or at least 96 weight percent, or at least 97 weight percent, or at least 98 weight percent, or at least 99 weight percent, or at least 99.5 weight percent, or 100 weight percent of all solid feedstock other than solid fossil fuels and sand fed to the gasifier can comprise solid particles derived from mixed plastic waste, based on the cumulative weight of all streams containing solids fed to the gasifier.

The solid particles derived from mixed plastic waste can be combined with one or more fossil fuel components of the feedstock stream at any location prior to introducing the feedstock stream into gasification zone within the gasifier. Solid fossil fuel grinding equipment can provide a source of energy for mixing solid particles derived from mixed plastic waste with the solid fossil fuel while reducing the size of the solid fossil fuel particles. Therefore, one of the desirable locations for combining solid particles derived from mixed plastic waste having a target size for feeding into the gasifier is into the equipment used for grinding the other solid fossil fuel sources (e.g. coal, pet-coke). This location is particularly attractive in a slurry fed gasifier because it is desirable to use a feed having the highest stable solids concentration possible, and at higher solids concentration, the viscosity of the slurry is also high. The torque and shear forces employed in fossil fuel grinding equipment is high, and coupled with the shear thinning behavior of a solid fossil fuel (e.g. coal) slurry, good mixing of the solid particles derived from mixed plastic waste with the ground fossil fuel can be obtained in the fossil fuel grinding equipment.

Other locations for combining solid particles derived from mixed plastic waste with fossil fuel sources can be onto the fossil fuel loaded on the main fossil fuel belt feeding a mill or grinder, or onto the main fossil fuel before the fossil fuel is loaded onto the belt to the mill or grinder, or into a fossil fuel slurry storage tank containing a slurry of fossil fuel ground to the final size, particularly if the storage tank is agitated.

In one embodiment or in combination with any of the mentioned embodiments, when the gasification feed stream 124 comprises a liquid or a slurry, it may include one or more liquids, including water, in the feedstock stream in an amount of at least 10, or at least 15, or at least 20, or at least 25, or at least 27, or at least 30 weight percent, based on the weight of the feedstock stream. In one embodiment or in combination with any of the mentioned embodiments, the liquids present in the feedstock stream may contain at least 95, at least 96, at least 97, at least 98, or at least 99 weight percent water, based on the weight of all liquids fed to the gasifier. In another embodiment, other than chemical additives that are chemically synthesized and contain oxygen or sulfur or nitrogen atoms, the liquid content of the feedstock stream can be at least 96, at least 97, at least 98, or at least 99 weight percent water, based on the weight of all liquids fed to the gasifier 540.

In one embodiment or in combination with any of the mentioned embodiments, the water present in the feedstock stream 124 is not wastewater, or in other words, the water fed to the solids to make the feedstock stream is not wastewater. Desirably, the water employed has not been industrially discharged from any process for synthesizing chemicals, or it not municipal wastewater. The water used to form the feed stream 124 may be fresh water, or potable water.

The feedstock stream 124 may also comprise at least ground coal and one or more other types of solids originating from one or more locations within chemical recycling facility 10 as discussed previously. Desirably, the feedstock stream 124 also comprises water. The amount of water in the feedstock stream can range from 0 weight percent up to 50 weight percent, or from 10 weight percent to 40 weight percent, or from 20 weight percent to 35 weight percent. The feedstock stream may comprise a slurry containing water.

In addition to coal, water, and plastics, other additives can be added to and contained in the feedstock stream 124, such as viscosity modifiers and pH modifiers. The total quantity of additives in feed stream 124 can range from 0.01 weight percent to 5 weight percent, or from 0.05 weight percent to 5 weight percent, or from 0.05 to 3 weight percent, or from 0.5 to 2.5 weight percent, based on the weight of the feedstock stream. The quantity of any individual additive can also be within these stated ranges.

The viscosity modifiers (which includes surfactants) can improve the solids concentration in the slurry. Examples of viscosity modifiers include alkyl-substituted amine-based surfactant such as alkyl-substituted aminobutyric acid, alkyl-substituted polyethoxylated amide, and alkyl-substituted polyethoxylated quaternary ammonium salt; and sulfates such as salts of organic sulfonic acids including ammonium, calcium and sodium sulfonates, particularly those with lignin and sulfo-alkylated lignites; phosphate salts; and polyoxyalkylene anionic or nonionic surfactants, and combinations thereof.

More specific examples of alkyl-substituted aminobutyric acid surfactants include N-coco-beta-aminobutyric acid, N-tallow-beta-aminobutyric acid, N-lauryl-beta-aminobutyric acid, and N-oleyl-beta-aminobutyric acid. N-coco-beta-aminobutyric acid.

More specific examples of alkyl-substituted polyethoxylated amide surfactant include polyoxyethylene oleamide, polyoxyethylene tallowamide, polyoxyethylene laurylamide, and polyoxyethylene cocoamide, with 5-50 polyoxyethylene moieties being present.

More specific examples of the alkyl-substituted polyethoxylated quaternary ammonium salt surfactant include methylbis (2-hydroxyethyl) cocoammonium chloride, methylpolyoxyethylene cocoammonium chloride, methylbis (2-hydroxyethyl) oleylammonium chloride, methylpolyoxyethylene oleylammonium chloride, methylbis (2-hydroxyethyl) octadecylammonium chloride, and methylpolyoxyethylene octadecylammonium chloride.

More specific examples of sulfonates include sulfonated formaldehyde condensates, naphthalene sulfonate formaldehyde condensates, benzene sulfonate-phenol-formaldehyde condensates, and lingosulfonates.

More specific examples of phosphate salts include trisodium phosphate, potassium phosphate, ammonium phosphate, sodium tripolyphosphate or potassium tripolyphosphate.

Examples of polyoxyalkylene anionic or nonionic surfactants have 1 or more repeating units derived from ethylene oxide or propylene oxide, or 1-200 oxyalkylene units.

Desirably, the surfactant is an anionic surfactant, such as salts of an organic sulfonic acid. Examples are calcium, sodium and ammonium salts of organic sulfonic acids such as 2,6-dihydroxy naphthalene sulfonic acid, lignite sulfonic acid, and ammonium lignosulfonate.

Examples of pH modifiers include aqueous alkali metal and alkaline earth hydroxides such as sodium hydroxide, and ammonium compounds such as 20 to 50 weight percent aqueous ammonium hydroxide solutions. The aqueous ammonium hydroxide solution can be added directly to the feedstock composition prior to entry into the gasifier, such as in the coal grinding equipment or any downstream vessels containing the slurry.

The concentration of solids (e.g. fossil fuel and plastic or solids derived from plastic, when present) in the feedstock stream 124 should not exceed the stability limits of the slurry, or the ability to pump or feed the feedstock at the target solids concentration to the gasifier. Desirably, the solids content of the slurry should be at least 50 weight percent, or at least 55 weight percent, or at least weight percent, or at least 62 weight percent, or at least 65 weight percent, or at least 68 weight percent, or at least 69 weight percent, or at least 70 weight percent, or at least 75 weight percent, the remainder being a liquid phase that can include water and liquid additives. The upper limit is not particularly limited because it is dependent upon the gasifier design. However, given the practical pumpability limits of a solid fossil fuels feed and maintaining a homogeneous distribution of solids in the slurry, the solids content for a solid fossil slurry fed slagging gasifier desirably should not exceed 75 weight percent, or 73 weight percent, the remainder being a liquid phase that can include water and liquid additives (as noted above, gases are not included in the calculation of weight percentages).

The feedstock stream 124 to the POX gasifier is desirably stable at 5 minutes, or even 10 minutes, or even 15 minutes, or even 20 minutes, or even ½ hour, or even 1 hour, or even two hours, when it is in the form of a slurry.

A feedstock slurry may be considered stable if its initial viscosity is 100,000 cP or less. The initial viscosity can be obtained by the following method. A 500-600 g of a well-mixed sample is allowed to stand still in a 600 mL liter glass beaker at ambient conditions (e.g. 25° C. and about 1 atm). A Brookfield R/S Rheometer equipped with V80-40 vane operating at a shear rate of 1.83/s is submerged into the slurry to the bottom of the beaker after the slurry is well mixed (e.g. a homogeneous distribution of solids was formed). After a designated period of time, a viscosity reading is obtained at the start of rotation, which is the initial viscosity reading.

The slurry is considered to be stable if the initial reading on starting a viscosity measurement is not more than 100,000 cP at the designated period of time. Alternatively, the same procedure can be used with a Brookfield viscometer with an LV-2 spindle rotating at a rate of 0.5 rpm. Since different viscosity value will be obtained using the different equipment, the type of equipment used should be reported. However, regardless of the differences, the slurry is considered stable under either method only if its viscosity is not more than 100,000 cP at the reported time.

The quantity of solids in the feedstock stream 124 and their particle size are adjusted to maximize the solids content while maintaining a stable and pumpable slurry. A pumpable slurry is one which has a viscosity under 30,000 cP, or not more than 25,000 cP, or not more than 23,000 cP, and desirably not more than 20,000 cP, or not more than 18,000 cP, or not more than 15,000 cP, or not more than 13,000 cP, in each case at ambient conditions (e.g. 25° C. and 1 atm). In one embodiment or in combination with any of the mentioned embodiments, the feedstock stream 124 has a viscosity of at least 1000, at least 2000, at least 3000, at least 4000, at least 5000, at least 6000, at least 7000, at least 8000, at least 9000, or at least 10,000 cP. Alternatively, or in addition, the feedstock stream 124 has a viscosity of not more than 10,000, not more than 7500, not more than 5000, or not more than 4500 cP, or it can be in the range of 1000 to 10,000 cP, or 2000 to 7500 cP, or 3000 to 5000 cP.

At higher viscosities, the slurry becomes too thick to practically pump. The viscosity measurement to determine the pumpability of the slurry is taken by mixing a sample of the slurry until a homogeneous distribution of particles is obtained, thereafter immediately submerging a Brookfield viscometer with an LV-2 spindle rotating at a rate of 0.5 rpm into the well mixed slurry and taking a reading without delay. Alternatively, a Brookfield R/S rheometer with V80-40 vane spindle operating at a shear rate of 1.83/s can be used. The method of measurement is reported since the measured values between the two rheometers at their difference shear rates will generate different values. However, the cP values stated above apply to either of the rheometer devices and procedures.

In one embodiment or in combination with any of the mentioned embodiments, the gasification feedstock stream 124 may have a density of at least 58.5, at least 59, at least 59.5 pounds per cubic foot ($lb/ft^3$) and/or not more than 64, not more than 63.5, not more than 63, not more than 62.5, not more than 62, not more than 61.5, not more than 61, or not more than 60.5 $lb/ft^3$, or it can be 58.5 to 64 $lb/ft^3$, 59 to 63.5 $lb/ft^3$, or 59.5 to 63 $lb/ft^3$.

In one embodiment or in combination with any of the mentioned embodiments, the gasification feedstock stream 124 may have a density of at least 72, at least 72.5, at least 73, at least 73.5, at least 74 pounds per cubic foot ($Ib/ft^3$) and/or not more than 76, not more than 75.5, not more than 75, or not more than 74.5 $lb/ft^3$, or it can be 72 to 76 $lb/ft^3$, 72.5 to 75.5 $lb/ft^3$, or 73 to 75 $lb/ft^3$.

In one embodiment or in combination with any of the mentioned embodiments, the gasification feedstock stream 124 may be introduced into a gasification reactor 540 along with the oxygen agent stream 152. In one embodiment or in combination with any of the mentioned embodiments, the feedstock stream 124 and the oxygen agent stream 152 may be sprayed through an injector into a pressurized gasification zone having, for example, a pressure, typically at least 500, at least 600, at least 800, or at least 1,000 psig, (at least 35, at least 40, at least 55, or at least 70 barg).

In one embodiment or in combination with any of the mentioned embodiments, the oxygen agent stream 152 comprises an oxidizing gas that can include air. More particularly, In one embodiment or in combination with any of the mentioned embodiments, the oxygen agent stream 152 comprises a gas enriched in oxygen at quantities greater than that found in air. In one embodiment or in combination with any of the mentioned embodiments, the oxygen agent stream 152 comprises at least 25, at least 35, at least 40, at least 50, at least 60, at least 70, at least 80, at least 90, at least 95, at least 97, at least 99, or at least 99.5 mole percent of oxygen based on all moles in the oxygen agent stream 152 injected into the reaction (combustion) zone of the gasifier 540. The particular amount of oxygen supplied to the reaction zone can be sufficient to obtain near or maximum yields of carbon monoxide and hydrogen in the syngas obtained from the gasification reaction relative to the components in the feedstock stream, considering the amount relative to the feedstock stream, and the amount of feedstock charged, the process conditions, and the reactor design.

In one embodiment or in combination with any of the mentioned embodiments, steam (and/or water) is not supplied to the gasification zone. Alternatively, In one embodiment or in combination with any of the mentioned embodiments, steam and/or water may be supplied to the gasification zone, as shown by stream 154 in FIG. 8.

Other reducible oxygen-containing gases in addition to the oxygen agent stream 152 may be supplied to the reaction zone, for example, carbon dioxide, nitrogen, or air. In one embodiment or in combination with any of the mentioned embodiments, no gas stream enriched in carbon dioxide or nitrogen (e.g., no gas stream having an amount of carbon dioxide or nitrogen greater than the molar quantity found in air, or at least 2, at least 5, at least 10, or at least 40 mole percent) is charged into the gasifier. When present, these gases may serve as carrier gases to propel a feedstock to a gasification zone. Due to the pressure within the gasification zone, these carrier gases may be compressed to provide the motive force for introduction into the gasification zone.

In one or more embodiments, a gas stream comprising at least 5, at least 10, at least 15, at least 20, at least 25 weight percent and/or not more than 50, not more than 45, not more than 40, not more than 35, or not more than 30 weight percent of carrier gas, based on the total weight of the stream, or it can be in the range of from 5 to 50 weight percent, 10 to 45 weight percent, or 15 to 40 weight percent, based on the total weight of the stream.

In one embodiment or in combination with any of the mentioned embodiments, no gas stream containing more than 0.01 or 0.02 mole percent of carbon dioxide is charged to the gasifier or gasification zone 540. Additionally, or alternatively, in one embodiment or in combination with any of the mentioned embodiments, no gas stream containing more than 77, not more than 70, not more than 50, not more than 30, not more than 10, not more than 5, or not more than 3 mole percent nitrogen is charged to the gasifier or gasification zone. Furthermore, In one embodiment or in combination with any of the mentioned embodiments, a gaseous hydrogen-containing stream having more than 0.1, not more than 0.5, not more than 1, or not more than 5 mole percent hydrogen is not charged to the gasifier or to the gasification zone. Moreover, In one embodiment or in combination with any of the mentioned embodiments, a stream of methane gas containing more than 0.1, not more than 0.5, not more than 1, or not more than 5 mole percent methane is not charged to the gasifier or to the gasification zone. In certain embodiments, the only gaseous stream introduced to the gasification zone is the oxygen agent stream 152, which is an oxygen-rich gas stream as described above.

As shown in FIG. 8, a stream of fossil fuel 156 may also be introduced into the gasifier in addition to one or more of the other process streams discussed herein. The fossil fuel stream may include one or more carbon-based materials, including, but not limited to, natural gas, coal, petroleum coke, petroleum oil, biomass, and combinations thereof. In one embodiment or in combination with any of the mentioned embodiments, the fossil fuel stream in line 156 can make up at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent and/or not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, or not more than 5 weight percent of the total feed introduced into the gasifier. This may be the case whether the gasifier is a gas-fed, liquid-fed, or solids-fed gasifier.

The gasification process can be a partial oxidation gasification reaction, as described previously. Generally, to enhance the production of hydrogen and carbon monoxide, the oxidation process involves partial, rather than complete, oxidization of the gasification feedstock and, therefore, may be operated in an oxygen-lean environment, relative to the amount needed to completely oxidize 100 percent of the carbon and hydrogen bonds. In one embodiment or in combination with any of the mentioned embodiments, the total oxygen requirements for the gasifier may be at least 5, at least 10, at least 15, or at least 20 percent in excess of the amount theoretically required to convert the carbon content of the gasification feedstock to carbon monoxide. In general, satisfactory operation may be obtained with a total oxygen supply of 10 to 80 percent in excess of the theoretical requirements. For example, examples of suitable amounts of oxygen per pound of carbon may be in the range of 0.4 to 3.0 free oxygen per pound of carbon, 0.6 to 2.5 free oxygen per pound of carbon, 0.9 to 2.5 free oxygen per pound of carbon, or 1.2 to 2.5 pounds free oxygen per pound of carbon.

Mixing of the feedstock stream 124 and the oxygen agent stream 152 may be accomplished entirely within the reaction zone by introducing the separate streams of feedstock and oxygen agent so that they impinge upon each other within the reaction zone. In one embodiment or in combination with any of the mentioned embodiments, the oxygen agent stream 152 is introduced into the reaction zone of the gasifier 540 at a high velocity to both exceed the rate of flame propagation and to improve mixing with the feedstock stream 124. In one embodiment or in combination with any of the mentioned embodiments, the oxygen agent stream 126 may be injected into the gasification zone of the reactor 540 at a velocity in the range of 25 to 500 feet per second, 50 to 400 feet per second, or 100 to 400 feet per second. These values would be the velocity of the gaseous oxygen agent stream 152 at the injector-gasification zone interface, or the injector tip velocity.

In one embodiment or in combination with any of the mentioned embodiments, one or both of the gasification feedstock stream 124 and the oxygen agent stream 152 can optionally be preheated to a temperature of at least 200° C., at least 300° C., or at least 400° C. However, the gasification process employed does not require preheating the feedstock stream 124 to efficiently gasify the feedstock and a pre-heat treatment step may result in lowering the energy efficiency of the process.

In one embodiment or in combination with any of the mentioned embodiments, the type of gasification technology employed may be a partial oxidation entrained flow gasifier that generates syngas. This technology is distinct from fixed bed (alternatively called moving bed) gasifiers and from fluidized bed gasifiers. An exemplary gasifier that may be used in depicted in U.S. Pat. No. 3,544,291, the entire disclosure of which is incorporated herein by reference to the extent not inconsistent with the present disclosure.

In one embodiment or in combination with any of the mentioned embodiments, the gasifier 540 can be non-catalytic, meaning that the gasifier 540 does not contain a catalyst bed and the gasification process is non-catalytic, meaning that a catalyst is not introduced into the gasification zone as a discrete unbound catalyst. Furthermore, In one embodiment or in combination with any of the mentioned embodiments, the gasification process may not be a slagging gasification process; that is, it is not operated under slagging conditions (well above the fusion temperature of ash) such that a molten slag is formed in the gasification zone and runs along and down the refractory walls.

In one embodiment or in combination with any of the mentioned embodiments, the gasification zone, and optionally all reaction zones in the gasifier 540, may be operated at a temperature of at least 1000° C., at least 1100° C., at least 1200° C., at least 1250° C., or at least 1300° C. and/or not more than 2500° C., not more than 2000° C., not more than 1800° C., or not more than 1600° C., or it can be in the range of from 1000 to 2500° C., or 1200 to 2000° C., or 1250 to 1600° C. In one embodiment or in combination with any of the mentioned embodiments, the reaction temperature may be autogenous. Advantageously, in one embodiment or in combination with any of the mentioned embodiments, the gasifier operating in steady state mode may be at an autogenous temperature and does not require application of external energy sources to heat the gasification zone.

In one embodiment or in combination with any of the mentioned embodiments, the gasifier 540 is a predominately gas fed gasifier.

In one embodiment or in combination with any of the mentioned embodiments, the gasifier 540 is a non-slagging gasifier or operated under conditions not to form a slag.

In one embodiment or in combination with any of the mentioned embodiments, the gasifier 540 may not be under negative pressure during operations, but rather can be under positive pressure during operation. As used herein, "negative pressure" refers to a pressure less than atmospheric, and "positive pressure" refers to a pressure above atmospheric.

In one embodiment or in combination with any of the mentioned embodiments, the gasifier may be operated at a pressure within the gasification zone (or combustion chamber) of at least 200 psig (1.38 MPa), at least 300 psig (2.06 MPa), at least 350 psig (2.41 MPa), at least 400 psig (2.76 MPa), at least 420 psig (2.89 MPa), at least 450 psig (3.10 MPa), at least 475 psig (3.27 MPa), at least 500 psig (3.44 MPa), at least 550 psig (3.79 MPa), at least 600 psig (4.13 MPa), at least 650 psig (4.48 MPa), at least 700 psig (4.82 MPa), at least 750 psig (5.17 MPa), at least 800 psig (5.51 MPa), at least 900 psig (6.2 MPa), at least 1000 psig (6.89 MPa), at least 1100 psig (7.58 MPa), or at least 1200 psig (8.2 MPa).

Additionally or alternatively, in one embodiment or in combination with any of the mentioned embodiments, the gasifier may be operated at a pressure within the gasification zone (or combustion chamber) of not more than 1300 psig (8.96 MPa), not more than 1250 psig (8.61 MPa), not more than 1200 psig (8.27 MPa), not more than 1150 psig (7.92 MPa), not more than 1100 psig (7.58 MPa), not more than 1050 psig (7.23 MPa), not more than 1000 psig (6.89 MPa), not more than 900 psig (6.2 MPa), not more than 800 psig (5.51 MPa), or not more than 750 psig (5.17 MPa). Examples of suitable pressure ranges include 400 to 1000 psig, 425 to 900 psig, 450 to 900 psig, 475 to 900 psig, 500 to 900 psig, 550 to 900 psig, 600 to 900 psig, 650 to 900 psig, 400 to 800 psig, 425 to 800 psig, 450 to 800 psig, 475 to 800 psig, 500 to 800 psig, 550 to 800 psig, 600 to 800 psig, 650 to 800 psig, 400 to 750 psig, 425 to 750 psig, 450 to 750 psig, 475 to 750 psig, 500 to 750 psig, or 550 to 750 psig.

Generally, the average residence time of gases in the gasifier reactor 540 can be very short to increase throughput. Since the gasifier may be operated at high temperature and pressure, substantially complete conversion of the feedstock to gases can occur in a very short time frame. In one embodiment or in combination with any of the mentioned embodiments, the average residence time of the gases in the gasifier can be no more than 30, not more than 25, not more than 20, not more than 15, not more than 10, or not more than 7 seconds.

To avoid fouling downstream equipment from the gasifier 540, and the piping in-between, the resulting syngas stream 126 may have a low or no tar content. In one embodiment or in combination with any of the mentioned embodiments, the syngas stream 126 discharged from the gasifier 540 may comprise not more than 4, not more than 3, not more than 2, not more than 1, not more than 0.5, not more than 0.2, not more than 0.1, or not more than 0.01 weight percent of tar based on the weight of all condensable solids in the syngas stream. For purposes of measurement, condensable solids are those compounds and elements that condense at a temperature of 15° C. and 1 atm. Examples of tar products include naphthalenes, cresols, xylenols, anthracenes, phenanthrenes, phenols, benzene, toluene, pyridine, catechols, biphenyls, benzofurans, benzaldehydes, acenaphthylenes, fluorenes, naphthofurans, benzanthracenes, pyrenes, acephenanthrylenes, benzopyrenes, and other high molecular weight aromatic polynuclear compounds. The tar content can be determined by GC-MSD.

Generally, the raw syngas stream 126 discharged from the gasification vessel includes such gases as hydrogen, carbon monoxide, and carbon dioxide and can include other gases such as methane, hydrogen sulfide, and nitrogen depending on the fuel source and reaction conditions.

In one embodiment or in combination with any of the mentioned embodiments, the raw syngas stream 126 (the stream discharged from the gasifier and before any further treatment by way of scrubbing, shift, or acid gas removal) can have the following composition in mole percent on a dry basis and based on the moles of all gases (elements or compounds in gaseous state at 25° C. and 1 atm) in the raw syngas stream 126:

- a hydrogen content in the range of 15 to 60 mole percent, 18 to 50 mole percent, 18 to 45 mole percent, 18 to 40 mole percent, 23 to 40 mole percent, 25 to 40 mole percent, 23 to 38 mole percent, 29 to 40 mole percent, 31 to 40 mole percent;

a carbon monoxide content of 20 to 75 mole percent, 20 to 65 mole percent, 30 to 70 mole percent, 35 to 68 mole percent, 40 to 68 mole percent, 40 to 60 mole percent, 35 to 55 mole percent, or 40 to 52 mole percent;

a carbon dioxide content of 1.0 to 30 mole percent, 2 to 25 mole percent, 2 to 21 mole percent, 10 to 25 mole percent, or 10 to 20 mole percent;

a water content of 2.0 to 40 mole percent, 5 to 35 mole percent, 5 to 30 mole percent, or 10 to 30 mole percent;

a methane content of 0.0 to 30 mole percent, 0.01 to 15 mole percent, 0.01 to 10 mole percent, 0.01 to 8 mole percent, 0.01 to 7 mole percent, 0.01 to 5 mole percent, 0.01 to 3 mole percent, 0.1 to 1.5 mole percent, or 0.1 to 1 mole percent;

a $H_2S$ content of 0.01 to 2.0 mole percent, 0.05 to 1.5 mole percent, 0.1 to 1 mole percent, or 0.1 to 0.5 mole percent;

a COS content of 0.05 to 1.0 mole percent, 0.05 to 0.7 mole percent, or 0.05 to 0.3 mole percent;

a sulfur content of 0.015 to 3.0 mole percent, 0.02 to 2 mole percent, 0.05 to 1.5 mole percent, or 0.1 to 1 mole percent; and/or a nitrogen content of 0.0 to 5 mole percent, 0.005 to 3 mole percent, 0.01 to 2 mole percent, 0.005 to 1 mole percent, 0.005 to 0.5 mole percent, or 0.005 to 0.3 mole percent.

In one embodiment or in combination with any of the mentioned embodiments, the syngas stream 126 comprises a molar hydrogen/carbon monoxide ratio of at least 0.65, at least 0.68, at least 0.70, at least 0.73, at least 0.75, at least 0.78, at least 0.80, at least 0.85, at least 0.88, at least 0.90, at least 0.93, at least 0.95, at least 0.98, or at least 1. The gas components can be determined by FID-GC and TCD-GC or any other method recognized for analyzing the components of a gas stream.

In one embodiment or in combination with any of the mentioned embodiments, the syngas stream 126 can be a recycle content syngas (r-syngas) and can have a recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent, based on the total weight of the syngas stream.

Energy Generation/Production Facility

Turning again to FIG. 1, In one embodiment or in combination with any of the mentioned embodiments, the chemical recycling facility 10 may also comprise an energy generation/production facility 80. As used herein, an "energy generation/production facility 80" is a facility that generates energy (i.e., thermal energy) from a feedstock 132 via chemical conversion (e.g., combustion) of the feedstock.

Figure 9:
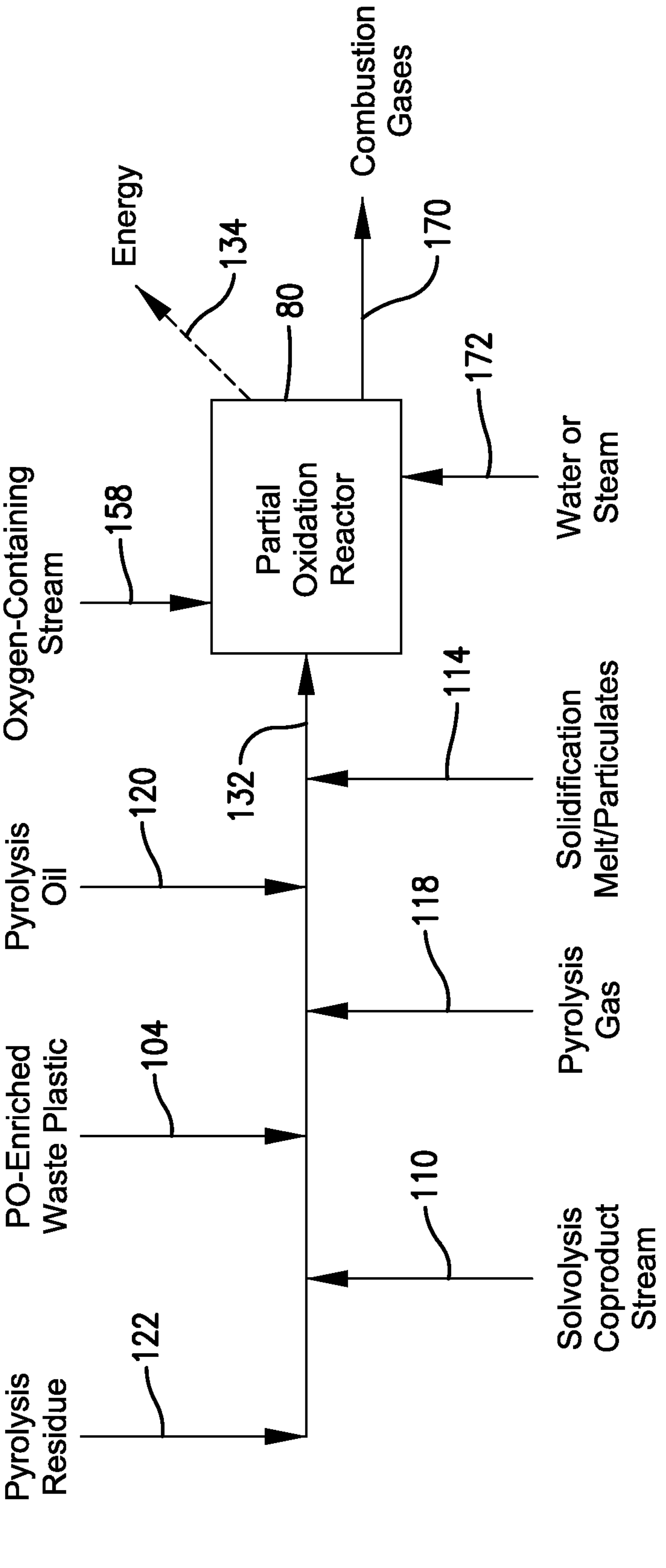
FIG. 9 is a schematic block flow diagram illustrating the main steps of an energy generation/production facility according to embodiments of the present technology.

Turning now to FIG. 9, a schematic diagram of an energy generation/production facility 80 suitable for use in a chemical recycling facility according to one or more embodiments is provided. As shown in FIG. 9, the feed stream introduced into the energy generation/production facility 80 may comprise one or more of (i) a PO-enriched waste plastic stream 104, (ii) a solids-containing particle or melt stream 114, (iii) at least one solvolysis coproduct stream 110, (iv) a stream of pyrolysis gas 118, (v) a stream of pyrolysis oil 120, (vi) a stream of pyrolysis residue 122; and (vii) a stream of heavies (e.g., C5+) from the cracker facility 70. In one embodiment or in combination with any of the mentioned embodiments, one or more of these streams (i) through (vii) may be introduced into the energy generation/production facility 80 continuously or one or more of these streams may be introduced intermittently. When multiple types of feed streams are present, each may be introduced separately, or all or a portion of the streams may be combined so that the combined stream may be introduced into the energy generation/production facility 80. The combining, when present, may take place in a continuous or batch manner.

In one embodiment or in combination with any of the mentioned embodiments, the feed stream 132 to the energy generation/production facility 80 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of at least one solvolysis coproduct stream 110, based on the total weight of the feed stream introduced into the energy generation/production facility 80.

Additionally, or in the alternative, the feed stream to the energy generation/production facility 80 can comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of at least one solvolysis coproduct stream 110, based on the total weight of the feed stream introduced into the energy generation/production facility 80, or it can be in the range of from 1 to 95 weight percent, 5 to 90 weight percent, 10 to 85 weight percent, 20 to 70 weight percent, or 30 to 60 weight percent, based on the total weight of the stream.

The solvolysis coproduct stream 110 introduced into the energy generation/production facility 80 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of solvolysis coproduct stream 110 introduced into the energy generation/production facility 80. As discussed previously, the solvolysis coproduct stream 110, when present, can include one or more of the solvolysis coproducts withdrawn from the solvolysis facility 30.

In one embodiment or in combination with any of the mentioned embodiments, the feed stream 132 to the energy generation/production facility 80 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of pyrolysis oil from a pyrolysis oil stream 120, based on the total weight of the feed stream introduced into the energy generation/production facility 80.

Additionally, or in the alternative, the feed stream 132 to the energy generation/production facility 80 can comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of pyrolysis oil, based on the total weight of the feed stream 132 introduced into the energy generation/production facility 80, or it can be present in the range of from 1 to 95 weight percent, 5 to 90 weight percent, 10 to 85 weight percent, 20 to 70 weight percent, or 30 to 60 weight percent, based on the total weight of the stream.

The pyrolysis oil stream 120 introduced into the energy generation/production facility 80 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of pyrolysis oil stream 120 introduced into the energy generation/production facility 80.

In one embodiment or in combination with any of the mentioned embodiments, the feed stream 134 to the energy generation/production facility 80 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of pyrolysis residue from a pyrolysis residue stream 122, based on the total weight of the feed stream 132 introduced into the energy generation/production facility 80.

Additionally, or in the alternative, the feed stream 132 to the energy generation/production facility 80 may comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of pyrolysis residue, based on the total weight of the feed stream 132 introduced into the energy generation/production facility 80, or it can be in the range of from 1 to 95 weight percent, 5 to 90 weight percent, 10 to 85 weight percent, 20 to 70 weight percent, or 30 to 60 weight percent, based on the total weight of the stream.

The pyrolysis residue stream 122 introduced into the energy generation/production facility 80 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of pyrolysis residue stream 122 introduced into the energy generation/production facility 80. The pyrolysis residue may be in the form of solids, a melt, or a slurry.

In one embodiment or in combination with any of the mentioned embodiments, the feed stream 132 to the energy generation/production facility 80 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of PO-enriched waste plastic from a PO-enriched waste plastic stream 104, based on the total weight of the feed stream 132 introduced into the energy generation/production facility 80.

Additionally, or in the alternative, the feed stream 132 to the energy generation/production facility 80 may comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of PO-enriched waste plastic, based on the total weight of the feed stream 132 introduced into the energy generation/production facility 80, or it can be in the range of from 1 to 95 weight percent, 5 to 90 weight percent, 10 to 85 weight percent, 20 to 70 weight percent, or 30 to 60 weight percent, based on the total weight of the stream.

The PO-enriched waste plastic stream 104 introduced into the energy generation/production facility 80 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of PO-enriched waste plastic stream 104 introduced into the energy generation/production facility 80. The PO-enriched plastic stream 104 may originate from the pre-processing facility 20 as shown in FIG. 1 or from another source (not shown). The stream 104 may be in the form of a plastic melt, or in the form of particles or slurry.

In one embodiment or in combination with any of the mentioned embodiments, the feed stream 132 to the energy generation/production facility 80 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of a solids-containing stream 114 comprising solids or a melt from a solidification facility 40, based on the total weight of the feed stream 132 introduced into the energy generation/production facility 80.

Additionally, or in the alternative, the feed stream 132 to the energy generation/production facility 80 may comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of a solids-containing stream 114 including solids or melt from a solidification facility 40, based on the total weight of the feed stream 132 introduced into the energy generation/production facility 80, or it can be in the range of from 1 to 95 weight percent, 5 to 90 weight percent, 10 to 85 weight percent, 20 to 70 weight percent, or 30 to 60 weight percent, based on the total weight of the stream.

The solids-containing stream 114 introduced into the energy generation/production facility 80 may have a total recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of solids or melt from a solidification facility 40 introduced into the energy generation/production facility 80. The solids-containing stream 114 may originate from the solidification facility 40 as shown in FIG. 1 or from another source (not shown). In one embodiment or in combination with any of the mentioned embodiments, the solids-containing stream 114 may be in the form of a slurry.

In one embodiment or in combination with any of the mentioned embodiments, the weight ratio of any one of the streams to another in the combined stream can be at least 1:10, at least 1:9, at least 1:8, at least 1:7, at least 1:6, at least 1:5, at least 1:4, at least 1:3, at least 1:2, at least 1:1.5, or at least 1:1 and/or not more than 10:1, not more than 9:1, not more than 8:1, not more than 7:1, not more than 6:1, not more than 5:1, not more than 4:1, not more than 3:1, not more than 2:1, not more than 1.5:1, or not more than 1:1, or it can be in the range of 1:10 to 10:1, 1:5 to 5:1, or 1:2 or 2:1.

Any type of energy generation/production facility 80 may be used. In one embodiment or in combination with any of the mentioned embodiments, the energy generation/production facility 80 may comprise at least one furnace or incinerator. The incinerator may be gas-fed, liquid-fed, or solid-fed, or may be configured to accept a gas, liquid, or solid. In one embodiment or in combination with any of the mentioned embodiments, the incinerator may be configured or may accept combinations of solids, gases, and liquids. Specific examples of incinerators or furnaces can include, but are not limited to, rotary kilns and liquid chemical destructors. Temperatures of combustion within the furnace or incinerator can be at least 800, at least 825, at least 850, at least 875, or 900° C. and/or not more than 1200, not more than 1175, not more than 1150, or not more than 1125° C., or from 800 to 1200° C., 850 to about 1150° C., or 900 to 1125° C.

The incinerator or furnace may be configured to thermally combust at least a portion of the hydrocarbon components in the feed stream 132 with an oxygen agent stream 158. In one embodiment or in combination with any of the mentioned embodiments, the oxygen agent stream 158 comprises at least 5, at least 10, at least 15, at least 20, or at least 25 and/or not more than 70, not more than 65, not more than 60, not more than 55, not more than 50, not more than 45, not more than 40, not more than 35, not more than 30, or not more than 25 mole percent oxygen, based on the total moles of oxygen agent stream 158, or it can include an amount in the range of from 5 to 70 mole percent, 10 to 55 mole percent, or 10 to 25 mole percent, based on the total moles of the stream. Other components of the oxygen agent stream 158 can include, for example, nitrogen, or carbon dioxide. In other embodiments, the oxygen agent stream 158 comprises air.

In the energy generation/production zone, at least 50, at least 60, at least 70, at least 80, at least 90, or at least 95 weight percent of the feed stream 132 introduced therein can be combusted to form energy and a stream 170 of combustion gases such as water, carbon monoxide, carbon dioxide, and combinations thereof. In one embodiment or in combination with any of the mentioned embodiments, at least a portion of the feed stream 132 may be treated to remove compounds such as sulfur and/or nitrogen-containing compounds, to minimize the amount of nitrogen and sulfur oxides in the combustion gas stream 170.

In one embodiment or in combination with any of the mentioned embodiments, at least a portion of the energy 134 generated by the energy production/generation facility may be used to directly or indirectly heat a process stream. For example, In one embodiment or in combination with any of the mentioned embodiments, at least a portion of the energy 134 may be used to heat water in stream 172 to form steam, and/or to heat steam in stream 172 and form superheated steam. In one embodiment or in combination with any of the mentioned embodiments, at least a portion of the energy generated may be used to heat a stream of heat transfer medium (such as, for example, THERMINOL®), which itself, when warmed, may be used to transfer heat to one or more process streams. In one embodiment or in combination with any of the mentioned embodiments, at least a portion of the energy may be used to directly heat a process stream.

In one embodiment or in combination with any of the mentioned embodiments, the process stream heated with at least a portion of the energy from the energy generation/production facility 80 may be a process stream from one or more of the facilities discussed herein, including, for example, at least one of a solvolysis facility 30, a pyrolysis facility 60, a cracker facility 70, a POX gasification facility 50, a solidification facility 40. In one embodiment or in combination with any of the mentioned embodiments, the energy generation/production facility 80 may be in a separate geographical area, while, in one or more other embodiments, at least a portion of the energy generation/production facility 80 may be located in or near one of the other facilities. For example, In one embodiment or in combination with any of the mentioned embodiments, an energy generation/production facility 80 within a chemical recycling facility as shown in FIG. 1 may include an energy generation/production furnace in the solvolysis facility 30 and another energy generation/production furnace in a POX gasification facility 50.

Reuse/Recycle Facility

In one embodiment or in combination with any of the mentioned embodiments, one or more streams from the chemical recycling facility 10 shown in FIG. 1 may also be directed to further reuse and/or recycling at another, typically offsite facility 90. In one embodiment or in combination with any of the mentioned embodiments, the streams directed to the reuse/recycle facility may be sold to another party, while, In one embodiment or in combination with any of the mentioned embodiments, the operator of the chemical facility 10 may have to pay the receiving party.

As shown in FIG. 1, In one embodiment or in combination with any of the mentioned embodiments, at least a portion of the solids-containing stream from the solidification facility 40 may be further reused and/or recycled in an off-site facility. In one embodiment or in combination with any of the mentioned embodiments, at least a portion of the PO-enriched stream 104 may also be used in a reuse/recycle facility 90. Such a PO-enriched stream 104 may have been subjected to earlier processing steps (e.g., washing, size reduction, drying, separation of undesired components) and the resulting stream from pre-processing facility 20 may then be further sold and used.

In cases where the feed stream 100 to the chemical processing facility 10 may have not more than 20, not more than 15, not more than 10, not more than 5, or not more than 2 weight percent of non-PET materials, based on the total weight of the feed stream 100 and, reuse and/or recycle of at least a portion of these non-PET components may be more economical or beneficial, as compared with further processing all or a portion of the stream within chemical recycling facility 10.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

As used herein, the term "predominantly" means more than 50 percent by weight. For example, a predominantly propane stream, composition, feedstock, or product is a stream, composition, feedstock, or product that contains more than 50 weight percent propane.

As used herein, the term "enriched" refers to having a concentration (on a dry weight basis) of a specific component that is greater than the concentration of that component in a reference material or stream.

CLAIMS NOT LIMITED TO DISCLOSED EMBODIMENTS

The forms of the technology described above are to be used as illustration only, and should not be used in a limiting sense to interpret the scope of the present technology. Modifications to the exemplary embodiments, set forth above, could be readily made by those skilled in the art without departing from the spirit of the present technology.

The inventors hereby state their intent to rely on the Doctrine of Equivalents to determine and assess the reasonably fair scope of the present technology as it pertains to any apparatus not materially departing from but outside the literal scope of the technology as set forth in the following claims.

What is claimed is:

1. A method for processing waste plastic, said method comprising:

(a) withdrawing a terephthalyl column bottoms coproduct stream from a solvolysis facility used to process PET-containing waste plastic; and (b) introducing at least a portion of said coproduct stream into at least one of the following: (i) a partial oxidation (POX) gasification facility; (ii) a pyrolysis facility; (iii) a cracker facility; and (iv) an energy generation/energy production facility.

2. The method of claim 1, wherein said withdrawing is performed in a continuous manner.

3. The method of claim 1, wherein said solvolysis facility produces a principal terephthalyl and wherein said terephthalyl column bottoms coproduct stream has a mid-range boiling point higher than the boiling point of said principal terephthalyl.

4. The method of claim 1, further comprising introducing another coproduct stream from said solvolysis facility into at least one of the following: (i) a partial oxidation (POX) facility; (ii) a pyrolysis facility; (iii) a solidification facility; (iv) a cracker facility; and (v) an energy generation/energy production facility.

5. The method of claim 4, wherein said terephthalyl column bottoms coproduct stream and said another coproduct stream are introduced into different ones of (i) through (v).

6. The method of claim 4, wherein said terephthalyl column bottoms coproduct stream and said another coproduct stream are introduced into the same ones of (i) through (v).

7. The method of claim 1, wherein at least a portion of said terephthalyl column bottoms coproduct stream is introduced into a POX gasification facility.

8. The method of claim 7, wherein said POX gasification facility includes a liquid-fed gasifier.

9. The method of claim 7, wherein said POX gasification facility includes a solid-fed gasifier.

10. A method for processing waste plastic, said method comprising:

(a) separating a stream of mixed plastic waste (MPW) into a polyethylene terephthalate-enriched (PET-enriched) stream and a polyolefin-enriched stream (PO-enriched) stream;

(b) subjecting at least a portion of said PET-enriched stream to solvolysis in a solvolysis facility to form a principal glycol product, a principal terephthalyl product, and at least one coproduct stream, wherein said coproduct stream comprises a terephthalyl column bottoms coproduct stream; and (c) introducing at least a portion of said terephthalyl column bottoms coproduct stream from said solvolysis facility into at least one of the following: (i) a partial oxidation (POX) gasification facility; (ii) a pyrolysis facility; (iii) a solidification facility; (iv) a cracker facility; and (v) an energy generation/energy production facility.

11. The method of claim 10, wherein said PET-enriched stream comprises at least 60 weight percent PET and not more than 40 weight percent of polyolefins, based on the total weight of the PET-enriched stream, wherein said PO-enriched stream comprises at least 60 weight percent polyolefins and not more than 40 weight percent of PET, based on the total weight of the PO-enriched stream, and wherein said PET-enriched stream comprises not more than 10 weight percent of halogens, based on the total weight of the PET-enriched stream.

12. The method of claim 10, wherein said terephthalyl column bottoms coproduct stream has a temperature in the range of from 130 to 290° C. when withdrawn from said solvolysis facility.

13. The method of claim 10, wherein said introducing is performed in a batch manner.

14. The method of claim 10, further comprising introducing at least a portion of said PO-enriched stream into at least one of the following: (i) a partial oxidation (POX) gasification facility; (ii) a pyrolysis facility; (iii) a solidification facility; and (iv) an energy generation/energy production facility.

15. The method of claim 10, wherein said solvolysis facility comprises a methanolysis facility.

16. The method of claim 10, further comprising introducing said terephthalyl column bottoms coproduct stream into at least two of facilities (i) through (v).

17. A solvolysis coproduct composition formed within a solvolysis facility for processing polyester terephthalate-containing waste plastic to form a principal glycol product and a principal terephthalyl product using a solvent, said composition comprising:

at least 70 weight percent of oligomers comprising polyester moieties; and at least 1 part per billion (ppb) by weight and not more than 25 weight percent of substituted terephthalyl components, based on the total weight of the composition, wherein said composition has a mid-range boiling point higher than the boiling point of said terephthalyl.

18. The composition of claim 7 wherein said oligomers comprise moieties of at least one ester other than dimethyl terephthalate, at least one carboxylic acid other than terephthalic acid, and/or at least one glycol other than ethylene glycol.

19. The composition of claim 7, wherein said oligomers have an average chain length of 2 to 25 and wherein said oligomers further comprise residues of 1,4-cyclohexanedimethanol (CHDM), neopentyl glycol, isophthalic acid, and combinations thereof.

20. The composition of claim 7, wherein said solvolysis coproduct composition has a viscosity of at least 0.01 poise (P), measured using a Brookfield R/S rheometer with V80-40 vane spindle operating at a shear rate of 10 rad/s and a temperature of 250° C., and wherein said solvolysis comprises methanolysis, said principal glycol comprises ethylene glycol, and wherein said principal terephthalyl product comprises dimethyl terephthalate (DMT).

* * * * *